(12) United States Patent
Nishi et al.

(10) Patent No.: US 6,842,554 B2
(45) Date of Patent: Jan. 11, 2005

(54) OPTICAL CROSS-CONNECT DEVICE AND OPTICAL NETWORK

(75) Inventors: Tetsuya Nishi, Kawasaki (JP); Satoshi Kuroyanagi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 90 days.

(21) Appl. No.: 10/419,952

(22) Filed: Apr. 22, 2003

(65) Prior Publication Data

US 2003/0206684 A1 Nov. 6, 2003

Related U.S. Application Data

(63) Continuation-in-part of application No. 10/108,649, filed on Mar. 29, 2002, now abandoned.

(30) Foreign Application Priority Data

Nov. 19, 2002 (JP) ........................................ 2002-334484

(51) Int. Cl.[7] ............................................... G02B 6/26
(52) U.S. Cl. ............................................ 385/17; 398/50
(58) Field of Search ........................ 385/17, 24; 398/47, 398/49, 50, 51; 359/127

(56) References Cited

U.S. PATENT DOCUMENTS 6,512,612 B1 * 1/2003 Fatehi et al. .................. 398/49
6,519,060 B1 * 2/2003 Liu ............................... 398/49
6,522,803 B1 * 2/2003 Nakajima et al. ............. 385/24
6,594,412 B2 * 7/2003 Maeda et al. ................. 385/17
6,741,811 B2 * 5/2004 Nishi et al. ................... 398/50
6,748,174 B2 * 6/2004 Milton et al. ................. 398/79

FOREIGN PATENT DOCUMENTS

JP            9-51560          2/1997

* cited by examiner

Primary Examiner—Daniel Stcyr
Assistant Examiner—Daniel A. Hess
(74) Attorney, Agent, or Firm—Staas & Halsey LLP

(57) ABSTRACT

In an optical cross-connect device for constructing a large scale optical network that supports an increase in the number of wavelengths, and an optical network using this optical cross-connect device, the optical cross-connect device comprises: a combination of any two of "a" units of wave multiplexers for multiplexing "n" waves of light signals directly received from an intra-office device to be transferred to a same destination, "L–a" threads of transmission lines each for transmitting an n-wave-multiplexed light signal, and "a" units of wave demultiplexers for demultiplexing the n-wave-multiplexed light signals bound for the same destination; and an L*L light switch for selecting the combination for transmitting the light signals to the same destination. Furthermore, a protective transmission line is provided, and a protective-signal light switch for selecting a combination of the protective transmission line, the wave multiplexer, and the wave demultiplexer is provided.

32 Claims, 44 Drawing Sheets

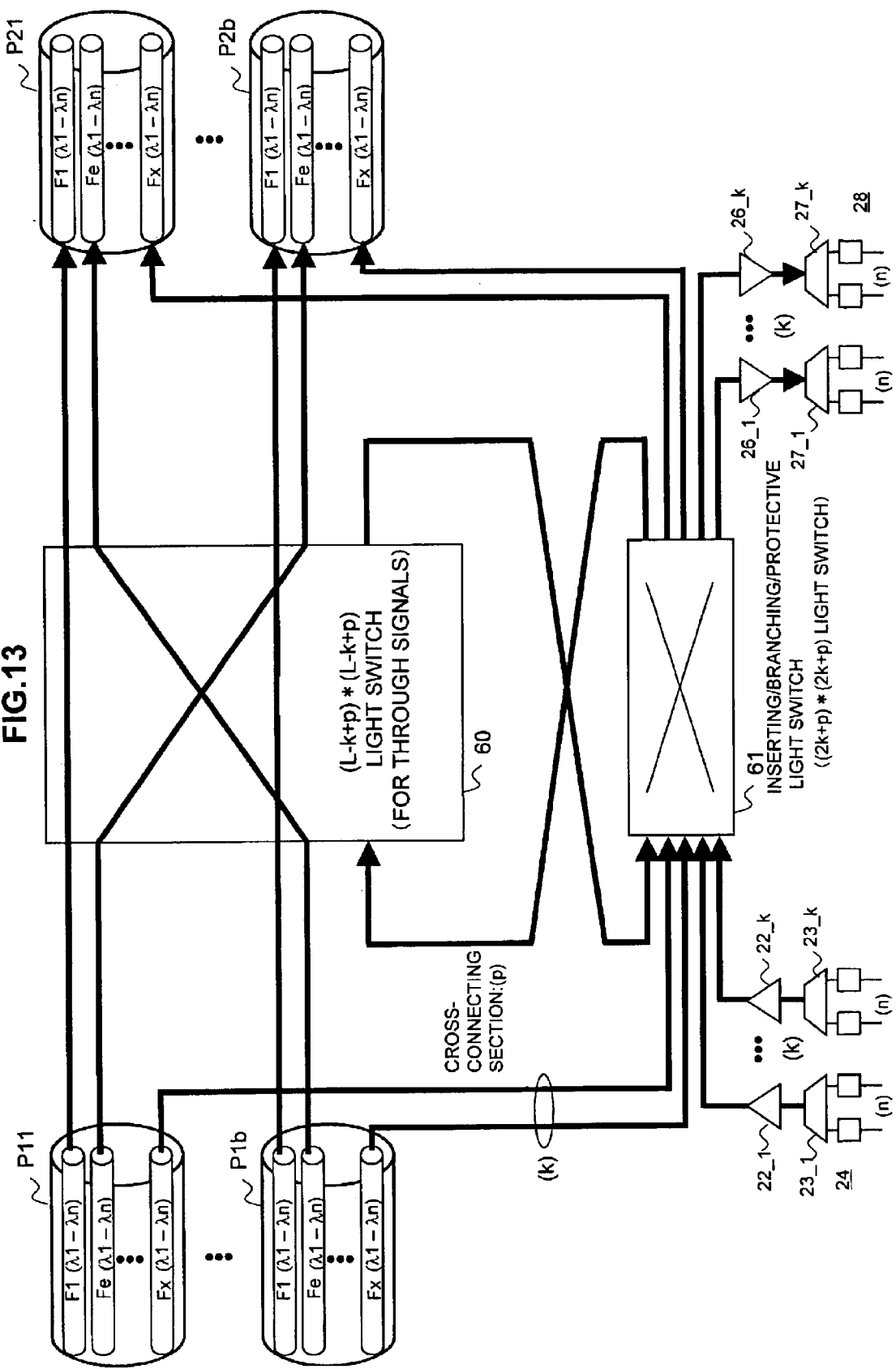

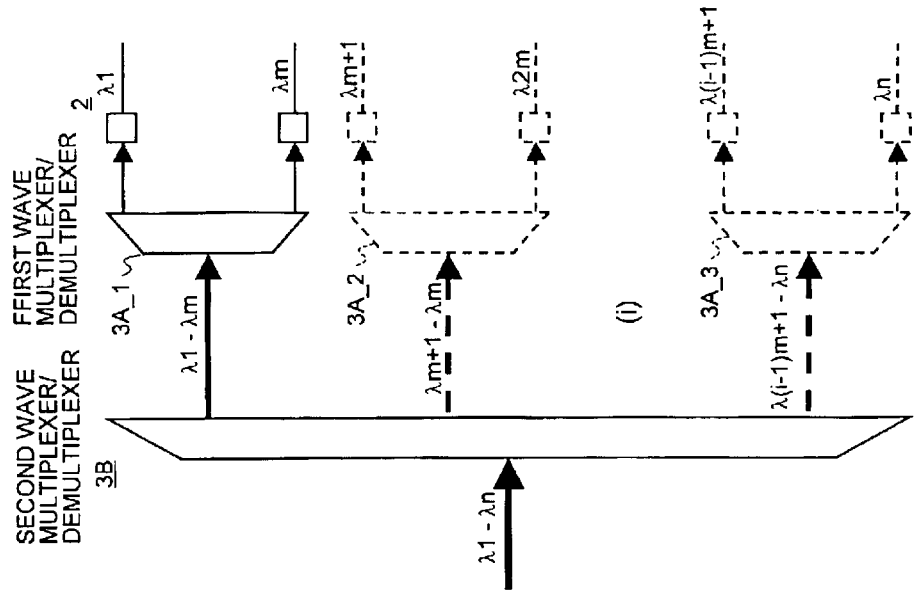
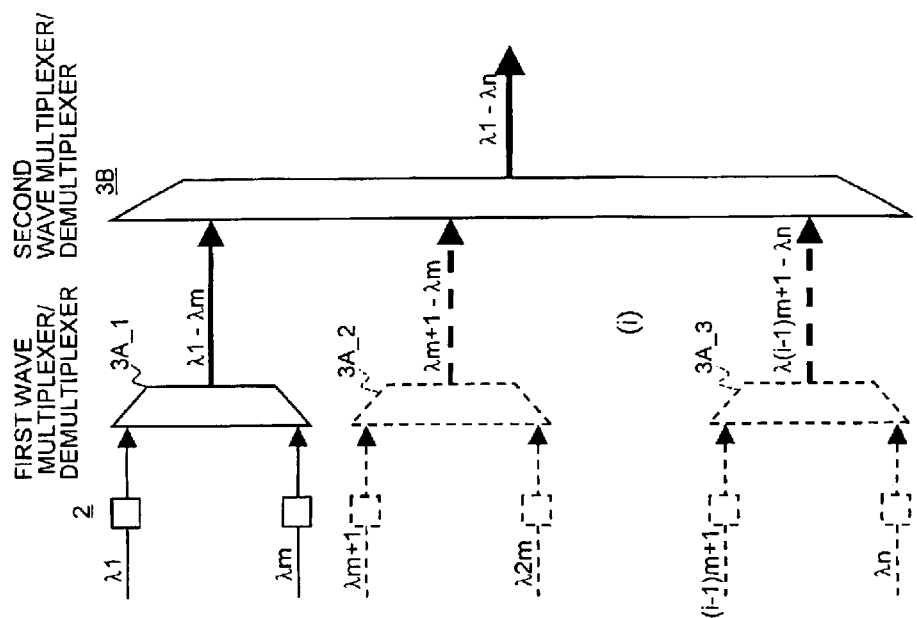

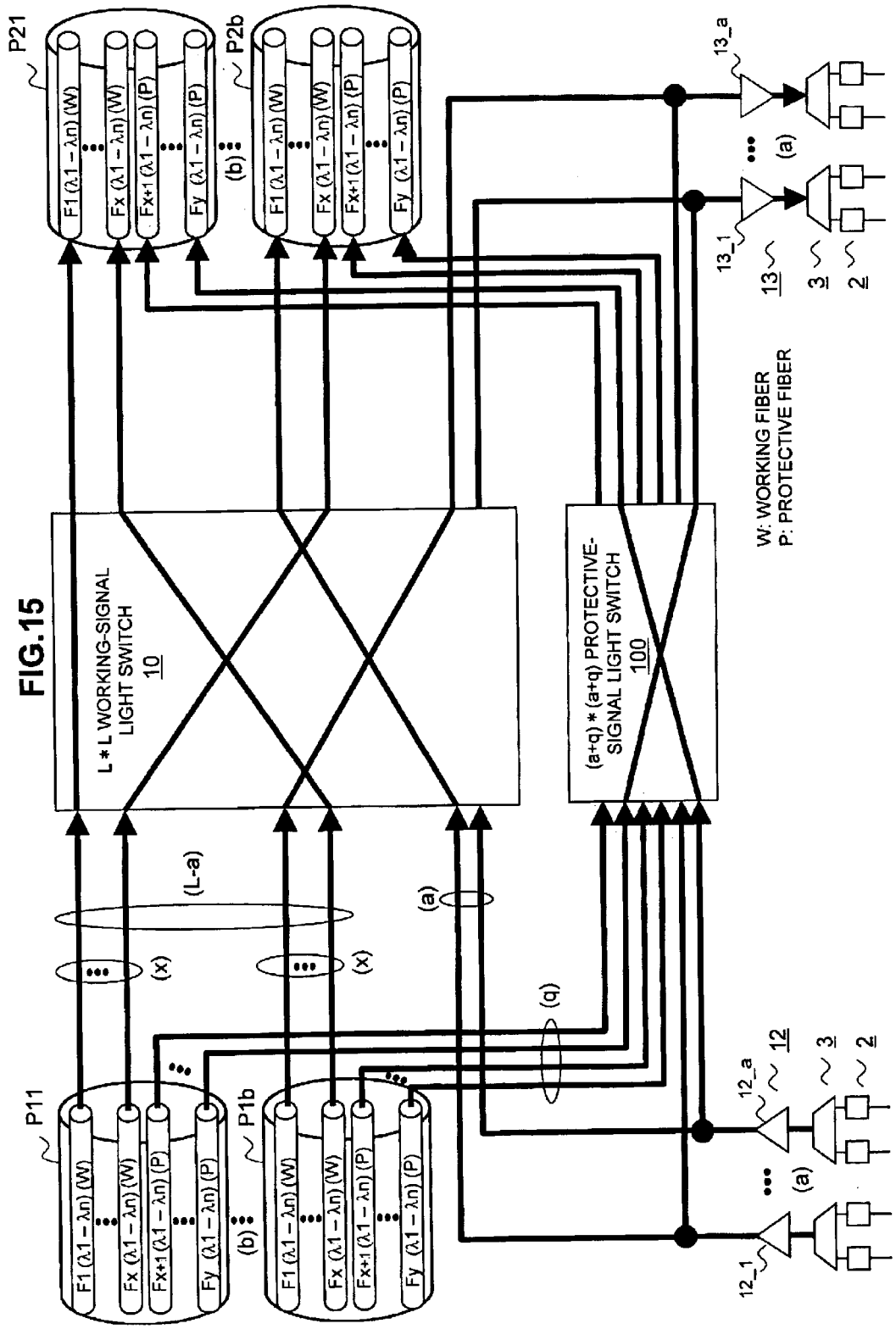

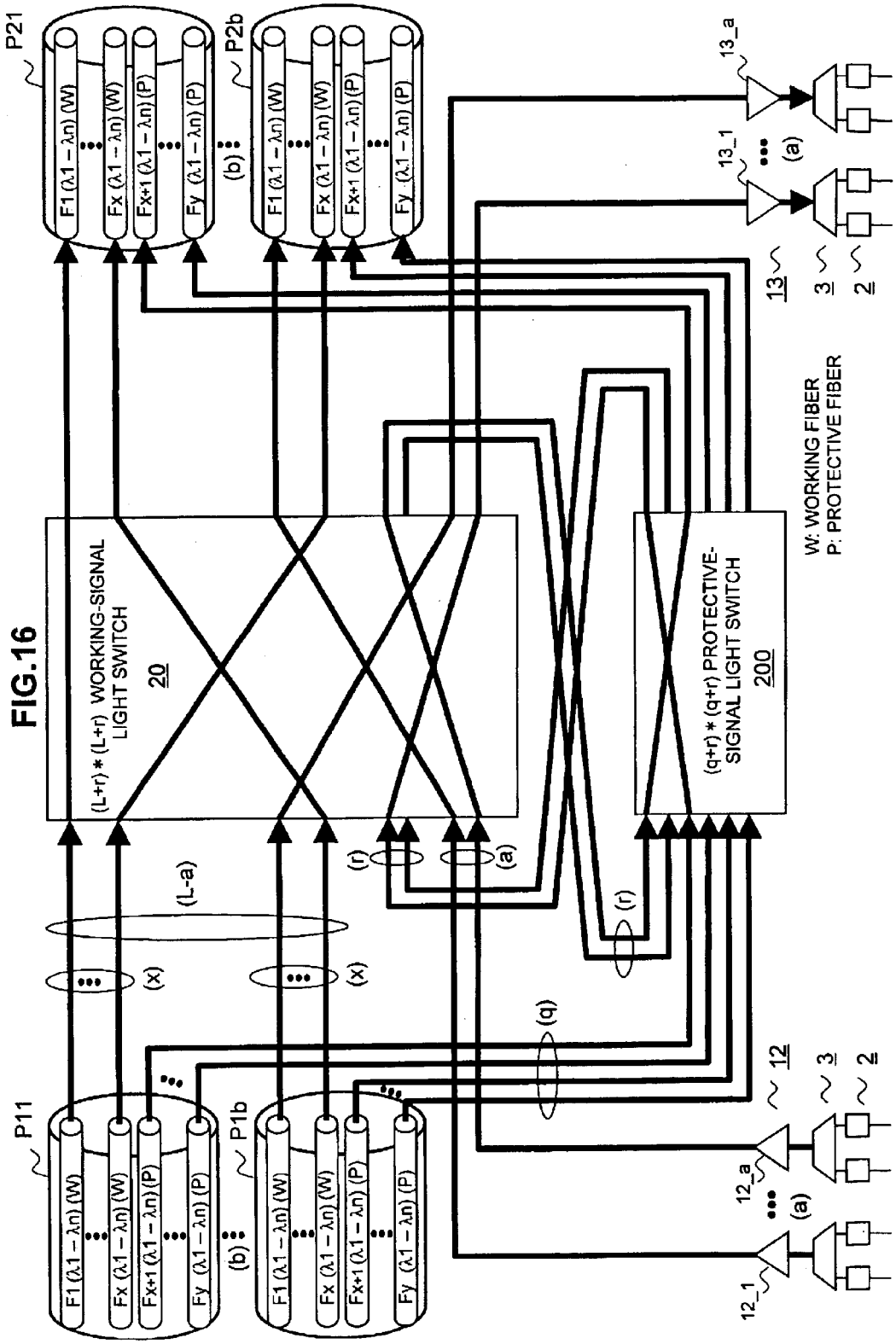

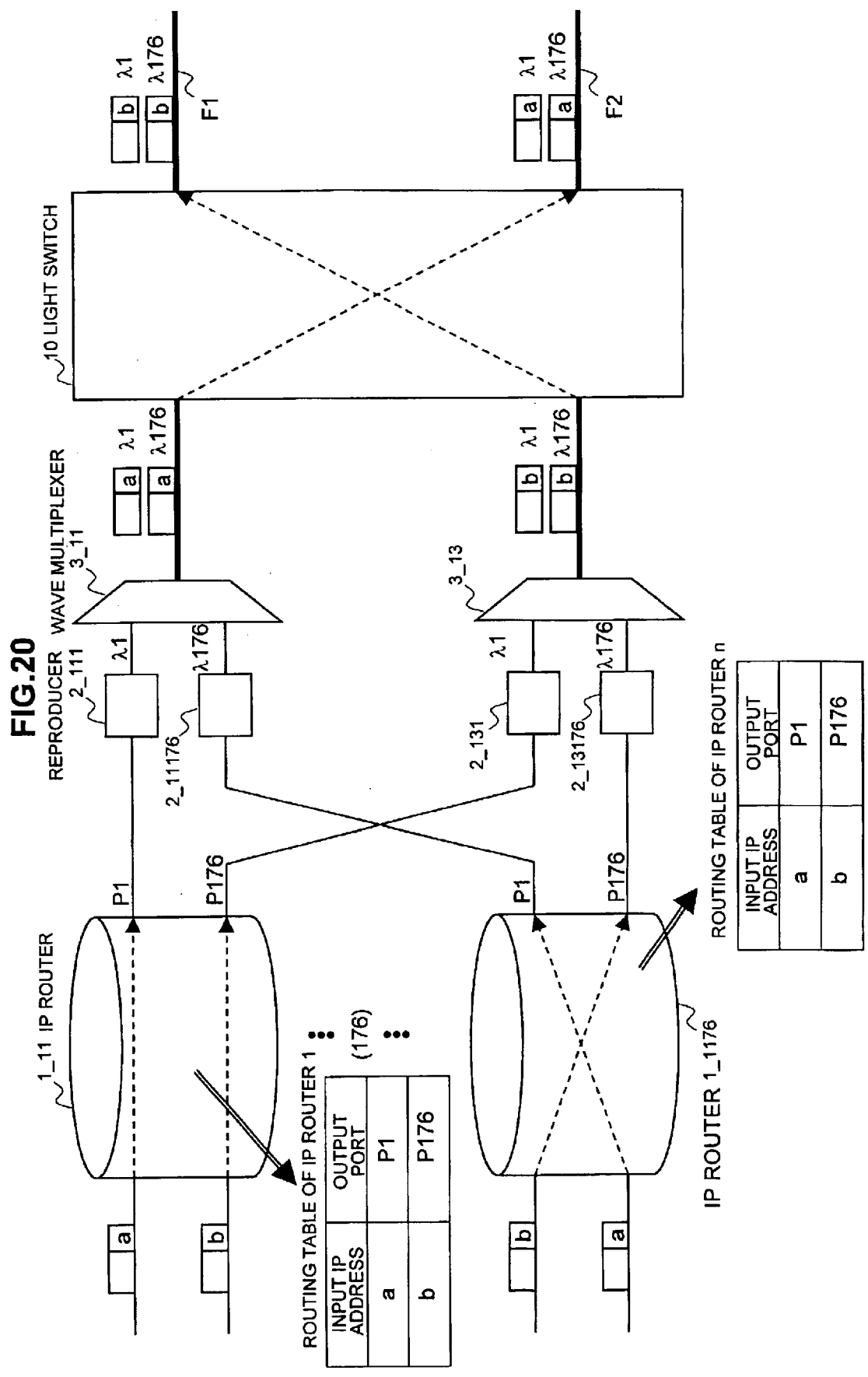

| PATH SETTING TABLE | | | |
|---|---|---|---|
| PATH DURING SETTING | INPUT SIDE OPTICAL FIBER | OUTPUT SIDE OPTICAL FIBER | MOVABLE MIRROR |
| 1 | F11 | F21 | M11:ON |
| 2 | F12 | F23 | M23:ON |
| 3 | F13 | F24 | M34:ON |

| PATH SETTING TABLE | | |
|---|---|---|
| PATH DURING SETTING | INPUT SIDE OPTICAL FIBER | OUTPUT SIDE OPTICAL FIBER |
| 1 | F13 | F215 |
| | DIRECT MIRROR 1-3 TO MIRROR 2-15 & MIRROR 2-15 TO OUTPUT FIBER F215 | |
| 2 | F16 | F216 |
| | DIRECT MIRROR 1-6 TO MIRROR 2-16 & MIRROR 2-16 TO OUTPUT FIBER F216 | |
| 3 | F112 | F21 |
| | DIRECT MIRROR 1-12 TO MIRROR 2-1 & MIRROR 2-1 TO OTPUT FIBER F21 | |
| 4 | F113 | F22 |
| | DIRECT MIRROR 1-13 TO MIRROR 2-2 & MIRROR 2-2 TO OUTPUT FIBER F22 | |

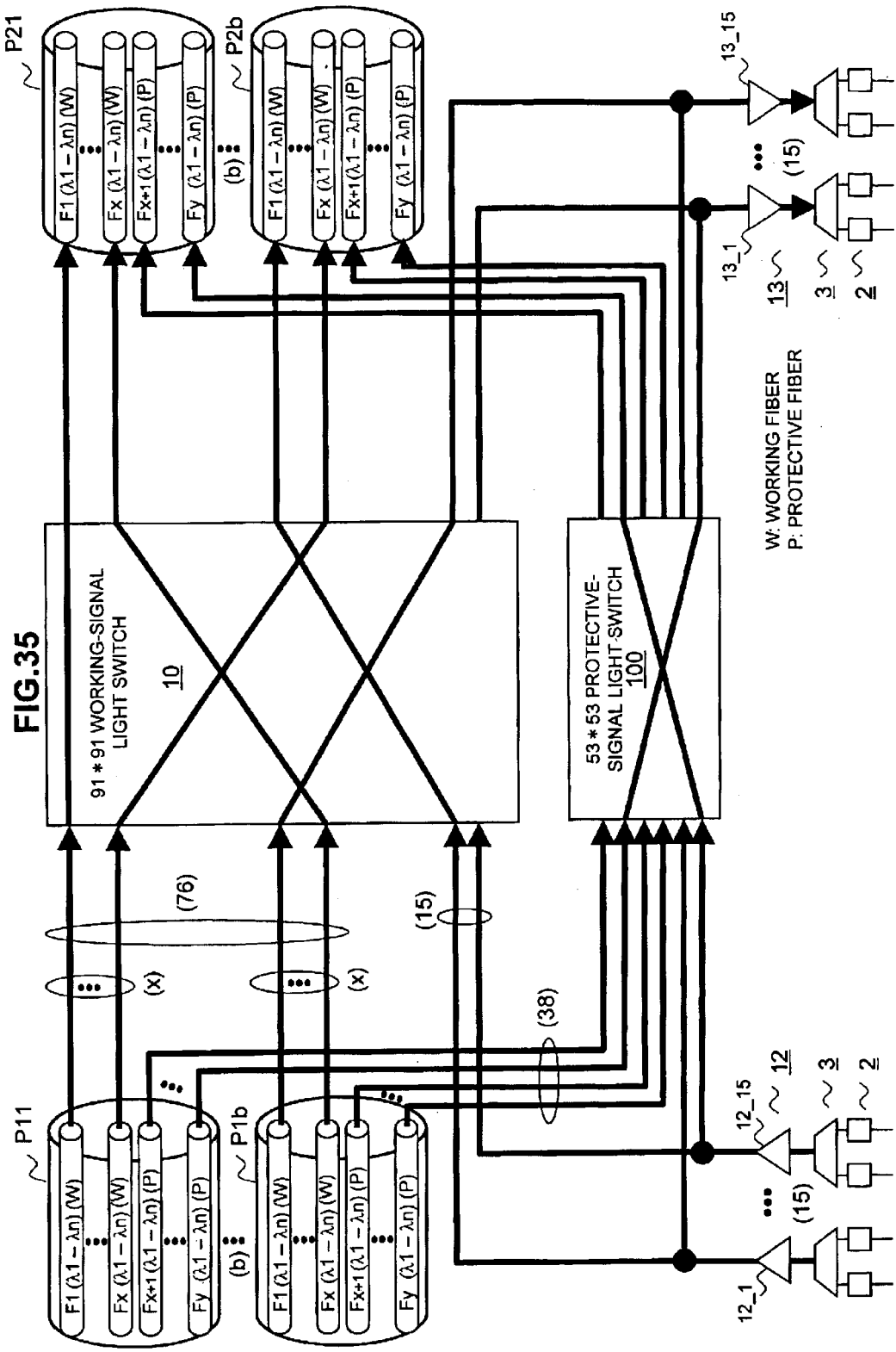

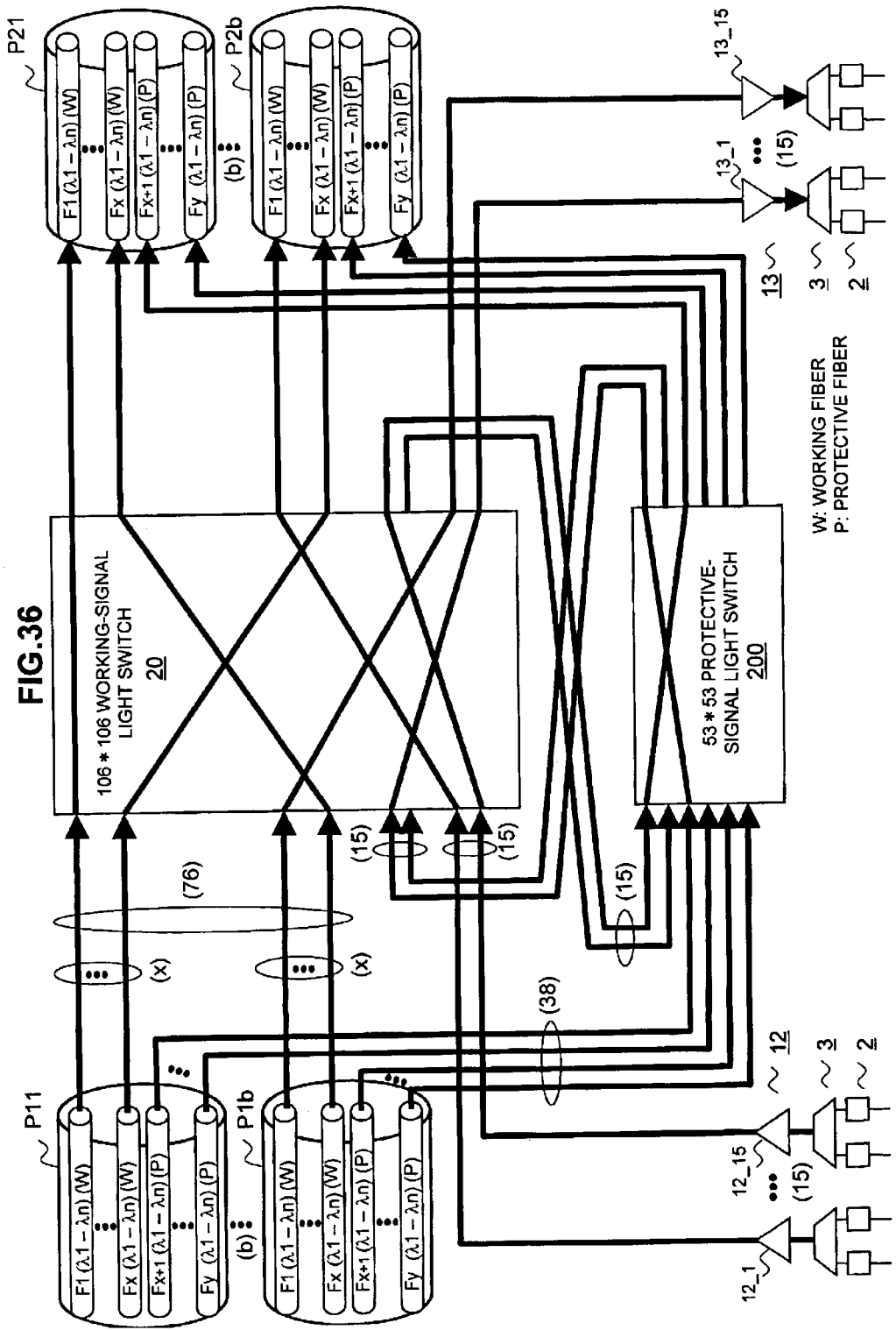

FIG.39

|  | SWITCH SIZE ||
|---|---|---|
|  | WAVELENGTH XC | FIBER XC |
| PRIOR ART (WAVELENGTH XC) | 13376 | 0 |
| PRIOR ART (WAVELENGTH XC + FIBER XC) | 2640 | 76 |
| PRESENT INVENTION (FIG. 3, FIG. 4) | 0 | 76 |
| PRESENT INVENTION (FIG. 5) | 0 | 90 |
| PRESENT INVENTION (FIG. 6) | 0 | THROUGH:65 A/D:15(2 UNITS) |
| PRESENT INVENTION (FIG.7) | 0 | 38 (2 UNITS) |
| PRESENT INVENTION (FIG. 8, FIG. 9) | 0 | 8 (19 UNITS) |
| PRESENT INVENTION (FIG. 10) | 0 | 9 (19 UNITS) |
| PRESENT INVENTION (FIG. 11) | 0 | THROUGH:8(19 UNITS) A/D:15(2 UNITS) |
| PRESENT INVENTION (FIG. 12) | 0 | 8 (38 UNITS) |
| PRESENT INVENTION (FIG. 13) | 0 | THROUGH:114 A/D:45 |

FIBER NUMBER OF WORKING PATH
FIBER NUMBER DURING FAULT
(=NUMBER OF WORKING & PROTECTIVE FIBERS)

OPTICAL CROSS-CONNECT DEVICE AND OPTICAL NETWORK

This is a continuation-in-part application of U.S. patent application Ser. No. 10/108,649, filed on Mar. 29, 2002 now abandoned.

BACKGROUND OF THE INVENTION

1. Field of the Invention

The present invention relates to an optical cross-connect device and an optical network, and in particular to an optical cross-connect device and an optical network utilizing a wavelength division multiplexing (WDM) system.

As speeds and volumes of information increase, broader bandwidths and larger capacities are demanded for networks and transmission systems. One of the means to implement this is an optical network based on wavelength division multiplexing technology, and an optical cross-connect device to be the core in constructing this optical network.

2. Description of the Related Art

FIG. 40 shows a general arrangement of an optical cross-connect device and an optical network including the same. An optical cross-connect device (optical XC) 100 accommodates a plurality of input/output light transmission lines (optical fibers) L2 and L3, and routes light signals which are wavelength division multiplexed and inputted from the input side light transmission line L2 to the desired output side light transmission line L3 for each wavelength or for each transmission line.

When inter-office links of the optical cross-connect device 100 are long distance transmission lines including light transmission lines L1 and L4 as shown, light amplifiers A1–A4 are inserted, as shown. The optical cross-connect device 100 is also connected to other communication devices, such as an electrical cross-connect device (electrical XC) 200 through a light transmission line L5, which is an intra-office link (link within office). These devices are controlled by an operation system OPS, which manages the entire network.

FIG. 41 shows an arrangement of the optical cross-connect device 100 shown in FIG. 40, where the optical cross-connect device is a wavelength switching-type.

In other words, light signals which are wavelength division multiplexed at wavelengths λ1–λn and inputted from the inter-office (in between offices) input side light transmission line L2 are demultiplexed into each wavelength by a wavelength demultiplexer WD1, and are provided to the first reproducing portion (opto/electro/opto conversion) RP1. The first reproducing portion RP1 once converts the light signals inputted from the inter-office light transmission line L2 into electric signals, reproduces the signals, and then converts the reproduced electric signals into light signals again to be transferred to an Ln*Ln light switch 150.

The light switch 150 routes light signals of input ports to desired output ports for each wavelength. The routed light signals are reproduced by a second reproducing portion RP2, and are further wavelength division multiplexed by a wavelength multiplexer WD2 to be outputted to the output side light transmission line L3.

When an optical network is constructed using such an optical cross-connect device that switches by the wavelength, large scale light switches with several thousands to ten thousand ports are required to accommodate enormous Internet traffic. For this, a technology to construct an optical network by combining the optical cross-connect devices for switching by the wavelength and fiber (transmission line) switching-type optical cross-connect devices for switching by the light transmission line has been used.

FIG. 42 shows such an optical network where the optical cross-connect devices for switching by the wavelength and the optical cross-connect devices for switching by the transmission line are combined. As shown, when a path is connected from an intra-office device (device within office) 1 to an intra-office device 1 in another office (another node), optical cross-connect devices (wavelength XC) 301–304 for switching by the wavelength are provided.

Output signals of the wavelength switching-type cross-connect devices 301–304 are connected to optical cross-connect devices XC#1–XC#4, which switch by the fiber respectively through a reproducer 2 and a wave multiplexer/demultiplexer (hereinafter, occasionally referred to simply as "multiplexer" or "demultiplexer") 3 having a dual function of a wave multiplexer and a wave demultiplexer.

Moreover, the optical cross-connect devices XC#1–XC#4 are interconnected with inter-office transmission lines. In the example shown in FIG. 42, the optical cross-connect devices XC#1 and XC#2 are interconnected with an optical fiber F21, the optical cross-connect devices XC#1 and XC#3 are interconnected with an optical fiber F11, the optical cross-connect devices XC#2 and XC#4 are interconnected with an optical fiber F32, and the optical cross-connect devices XC#3 and XC#4 are interconnected with an optical fiber F53, respectively.

Portions drawn by dotted lines in FIG. 42 are shown as removed therefrom assuming a case where traffic is low, so that the number of transmission lines is minimized.

Therefore, when a path is established from an intra-office device 1_11, such as a router, to an intra-office device 1_21 in another office, for example, as shown, a path ① with the wavelength λ1 connected to the intra-office device 1_21 of another office is formed through the wavelength switching-type optical cross-connect device 301, the reproducer 2, the wave multiplexer 3, the fiber switching-type optical cross-connect device XC#1, and optical fiber F21, further through the fiber switching-type optical cross-connect device XC#2, the wave demultiplexer 3, and the reproducer 2 as well as the wavelength switching-type optical cross-connect device 302.

Also, in the case of the illustrated optical network, the number of optical fibers is minimized and the light signals with different destinations are routed by the fiber switching-type optical cross-connect devices XC#1–XC#4, so when signals are transmitted from the intra-office device 1_11 to intra-office devices in other offices (hereinafter, occasionally referred to simply as "intra-office device" or "device in another office") 1_21, 1_31 and 1_41, the light signals with the wavelengths λ1 and λ2 pass through the optical cross-connect device XC#1, the optical fiber F11, and the optical cross-connect device XC#3, then pass through the wave demultiplexer 3 and the reproducer 2, and then light signal components with the wavelength λ1 are transferred from the optical cross-connect device 303 to the intra-office device 1_31.

On the other hand, the light signal components with the wavelength λ2 are looped back by the optical cross-connect device 303 and returned to the optical cross-connect device XC#3 with the wavelength converted into the wavelength λ3 transmitted along with light signals with the wavelengths λ1 and λ2 from the intra-office device 1_31 through the optical fiber F53, the optical cross-connect device XC#4, the wave demultiplexer 3, and the reproducer 2. Only light signal components with the wavelengths λ1 and λ2 are transferred from the optical cross-connect device 304 to the intra-office device 1_41.

Along with the light signal components with the wavelength λ1 from the intra-office device 1_41, the light signal component with the wavelength λ3 are passed through the optical cross-connect device 304, further converted again into wavelength λ2 by the reproducer 2, and a path ② for transferring the light signals from the optical cross-connect device 302 to the intra-office device 1_21 in another office through the wave demultiplexer 3, the optical cross-connect device XC#4, the optical fiber F32, the optical cross-connect device XC#2, the wave demultiplexer 3, and the reproducer 2, is formed.

In this way, insufficiency of the optical fibers is compensated for by the optical cross-connect devices 301–304 switched by the wavelength.

FIG. 43 shows the case when traffic is increased in the optical network shown in FIG. 42, where the intra-office device 1, the reproducer 2, the wave multiplexer/demultiplexer 3, and the optical fibers F12, F31, F51 and F52 are added, and paths are edited using the wavelength switching-type optical cross-connect devices 301–304 so that traffic (light signals) for each destination is accommodated in one transmission line when traffic for each destination increases to the extent of the number of wavelengths of the optical fiber.

In the example of FIG. 43, a total of 8 optical fibers are sufficient to be provided. FIG. 44 shows the number of required optical fibers assuming a case of 16 optical cross-connect devices. Numerals inside the parentheses show numbers of working fibers when no fault occurs, and numerals outside the parentheses show fiber numbers, including numbers of protective fibers required during a fault.

In the case of a conventional optical cross-connect device and optical network, as traffic increases, the device scale of the wavelength switching-type optical cross-connect device which routes the light signals of the intra-office device becomes large, and paths must be re-edited by the wavelength switching-type optical cross-connect device as necessary, so the paths in use must be switched, which causes an instantaneous disconnection of the paths.

SUMMARY OF THE INVENTION

It is accordingly an object of the present invention to provide an optical cross-connect device for constructing a large scale optical network that supports an increase in the number of wavelengths, and an optical network using this optical cross-connect device.

FIG. 1 is a conceptual diagram showing an arrangement of an optical network according to the present invention in order to achieve the above object. The difference between the arrangement of this optical network and those of the conventional optical networks shown in FIGS. 42 and 43 is that the optical cross-connect device for switching by the wavelength is not used between the reproducer 2 and the intra-office device 1 or the intra-office device 1 of another office.

In other words, when light signals with "n" waves are transmitted to the optical cross-connect devices XC#1–XC#i ("i" is the total number of optical cross-connect devices), which are the desired destinations, the wave multiplexer 3, that is, the optical cross-connect devices XC#1–XC#i, to which the light signals bound for the same destination are transmitted, is set in advance. Thus, light signals are directly transmitted from the intra-office device 1_11 thereof to the optical cross-connect device XC#1, for example.

By this, light signals bound for the same destination are collected at the same wave multiplexer 3 to be multiplexed and transmitted to the optical cross-connect devices XC#1–XC#i. Since the optical cross-connect devices XC#1–XC#i know the optical fiber to which the light signals bound for the same destination are transmitted, the light signals are transmitted to the intra-office device 1 in another office through a predetermined optical fiber, as described for the prior art in FIG. 42.

However, unlike the prior art in FIG. 42, it is unnecessary to edit the paths using the wavelength switching-type optical cross-connect device, but the light signals are directly transmitted to the intra-office device 1 in another office from the optical cross-connect device through the wave demultiplexer 3 and the reproducer 2.

It is to be noted that in the conceptual diagram of FIG. 1, the optical cross-connect devices XC#1–XC#i shown include the reproducer 2 and the wave multiplexer/demultiplexer 3. For the sake of simplifying the description, the wave multiplexer/demultiplexer 3 and the reproducer 2 are shown excluded from the optical cross-connect device.

Also, each of the optical cross-connect devices XC#1–XC#i is connected to another with inter-office optical fibers. For example: the optical cross-connect devices XC#1 and XC#k are interconnected with optical fibers F21 . . . F2x; the optical cross-connect devices XC#1 and XC#j are interconnected with optical fibers F11, F41 . . . F1x, and F4x; the optical cross-connect devices XC#k and XC#i are interconnected with optical fibers F31, F61 . . . F3x, and F6x; and the optical cross-connect devices XC#i and XC#j are interconnected with optical fibers F51 . . . F5x.

FIG. 2 is a conceptual diagram showing an arrangement and an operation of the optical network when traffic is increased. The relationship between FIGS. 1 and 2 is the same as that between FIGS. 42 and 43 showing the prior art.

In other words, considering an increase in traffic, "n" units of intra-office devices 1_11–1_1n are provided together with respective intra-office devices 1_j1–1_jn, 1-k1–1_kn, 1_i1–1_in in other offices. Respectively corresponding thereto, reproducers 2_111–2_11n . . . 2_1(i-1)1–2_1(i-1)n and wave multiplexer/demultiplexers 3_11–3_1(i-1); wave multiplexer/demultiplexers 3_j1–3_j(i-1) and reproducers 2_j11–2_j1n . . . 2_j(i-1)1–2_j(i-1)n; wave multiplexer/demultiplexers 3_k1–3_k(i-1) and reproducers 2_k11–2_k1n . . . 2_k(i-1)1–2_k(i-1)n; and wave multiplexer/demultiplexers 3_i1–3_i(i-1) and reproducers 2_i11–2_i1n . . . 2_i(i-1)1–2_i(i-1)n, are provided.

Hereafter, "1_ . . . " is generally referred to by a reference numeral "1", "2_ . . . " by "2", and "3_ . . . " by "3", respectively.

Each of the optical cross-connect devices XC#1–XC#i preliminarily knows the optical cross-connect device, that is, the optical fiber to which the light signals inputted from the wave multiplexer/demultiplexer 3 are transmitted respectively, so that when the light signals are transmitted from the intra-office devices 1_11–1_1n to the devices 1_j1–1_jn in the other offices as the same destination, for example, the light signals are transmitted along a path A which passes through the reproducers 2_111–2_11n, the wave multiplexer/demultiplexer 3_11, the optical cross-connect device XC#1, the optical fibers F11 and F41, the optical cross-connect device XC#j, the wave demultiplexer 3_j1, and the reproducers 2_j112_j1n.

When the light signals are transmitted from the intra office devices 1_11–1_1n to the devices 1_i1–1_in in the other office as the same destination, a path B is selected. When the light signals are transmitted from the intra-office devices 1_k1–1_kn to the devices 1_j1–1_jn in the other office as the same destination, a path C is selected. When the light signals are transmitted from the intra-office devices 1_k1–1_kn to the devices 1_i1–1_in in the other office, a path D is selected as the path for the same destination.

In this way, it is possible to construct an optical network only with fiber switching-type optical cross-connect devices, without using wavelength optical cross-connect devices which switch by the wavelength, so that a device can be downsized. Also it becomes unnecessary to switch paths during operation.

FIG. 3 shows a conceptual arrangement (1) of the optical cross-connect devices XC#1–XC#i of the present invention, to be used for the optical network shown in FIGS. 1 and 2.

The optical cross-connect device according to the present invention comprises: a combination of any two of "a" units of wave multiplexers for multiplexing "n" waves of light signals directly received from an intra-office device to be transferred to a same destination, "L–a" threads of transmission lines each for transmitting an n-wave-multiplexed light signal, and "a" units of wave demultiplexers for demultiplexing the n-wave-multiplexed light signals bound for the same destination; and an L*L light switch for selecting the combination for transmitting the light signals to the same destination.

In other words, in the example shown in FIG. 3, "b" lines of paths P11–P1b accommodating "x" pieces of optical fiber F1–Fx for transferring n-wave-multiplexed light signals, and series circuits respectively composed of the reproducers 2_111–2_11n . . . 2_1a1–2_1an, the wave multiplexers 3_11–3_1a as the wave multiplexer/demultiplexer 3, and light amplifiers 12_1–12_a are connected to an input side of an L*L light switch 10.

To an output side of the light switch 10, are connected "b" lines of paths P21–P2b respectively accommodating the optical fibers F1–Fx for respectively transmitting n-wave-multiplexed light signals, and series circuits composed of the light amplifiers 13_1–13_a, wave demultiplexers 3_21–3_2a which also function as wave demultiplexers, and reproducers 2_211–2_21n . . . 2_2a1–2_2an.

In the example shown in FIG. 3, the light switch 10 performs routing so that intra-office light signals of the wave multiplexers 3_11–3_1a are transmitted to the optical fibers in the paths P21–P2b, and the optical fibers F1–Fx in the paths P11–P1b are routed to the wave demultiplexers 3_21–3_2a through the light amplifiers 13_1–13_a in the office on the output side. Moreover, the light switch 10 also performs routing so that the optical fibers F1–Fx in the paths P11–P1b and the optical fibers F1–Fx in the paths P21–P2b are connected to each other.

It is to be noted that "a" units of series circuits of the light amplifiers 12, the wave multiplexers 3, and the reproducers 2 are provided. Likewise, "a" units of the light amplifiers 13, the wave demultiplexers 3, and the reproducers 2 are respectively provided. This corresponds to the number "i−1" of the wave multiplexer/demultiplexers 3 in FIGS. 1 and 2. As a result, the number of input/output ports for the optical fibers F1–Fx connected to the light switch 10 assumes "L–a".

In this way, the light signals bound for the same destination are routed from the wave multiplexer to the light transmission line, from the light transmission line to the wave demultiplexer, or between the light transmission lines, furthermore from the wave multiplexer to the wave demultiplexer by the light switch 10, so that the light switch can be downsized. If a non-blocking type shown in FIG. 3 is used for the light switch 10, an arbitrary input side transmission line can be switched to an arbitrary output side transmission line.

FIG. 4 shows a conceptual arrangement (2) where the conceptual arrangement (1) of the optical cross-connect device shown in FIG. 3 is modified. Namely, in this arrangement, means for reproducing the light signals are provided not only on the input side of the wave multiplexer or the output side of the wave demultiplexer, but also provided between the light switch 10 and the output side transmission line. Although not shown in FIG. 4, the means for reproducing light signals may also be provided between the input side light transmission line and the light switch 10, or between the light switch and both of these transmission lines.

For the means of reproducing the light signals, the "L–a" units of light amplifiers 15_11–15_1x . . . 15_b1–15_bx, and the "L–a" units of reproducing portions (composed of the wave demultiplexer, reproducer, and wave multiplexers) 16_11–16_1x . . . 16_b1–16_bx can be provided except for the above-mentioned reproducers.

Deteriorated light signals are reproduced in this way.

FIG. 5 shows a conceptual arrangement (3) where the conceptual arrangement (1) of the optical cross-connect device shown in FIG. 3 is modified in another way. In other words, a light switch 20 in this case has (L+r)*(L+r) input/output ports, and among these, "r" ports are externally installed as routing paths (loop paths), so that among the input side light transmission lines and the output side light transmission lines of the light switch, only the transmission lines requiring a light signal reproduction of pass through the routing paths.

In this routing path, "r" units of series circuits composed of light amplifiers 17_1–17_r, reproducing portions 18_1–18_r, and light amplifiers 19_1–19_r are inserted respectively. In the arrangement shown in FIG. 5, light signals of the optical fiber F1 in the path P1b are reproduced, and are transmitted to the same destination through the light switch 20 again and the optical fiber F1 in the path P2b at the output side.

In this way, only through signals of the light switch 20 requiring a signal reproduction are reproduced by passing through the reproducing portion, so that the number of the reproducing portions shown in FIG. 4 can be decreased.

FIG. 6 shows a conceptual arrangement (4) of the optical cross-connect device according to the present invention, wherein supposing that the light switch is a first light switch, a second light switch for branching a part of input light signals bound for the same destination transferred from the light transmission line and a third light switch for inserting light signals into a part of output light signals bound for the same destination to be transferred to the transmission line are provided, and the first light switch allows the input light signals bound for the same destination other than the branched light signals to pass therethrough as the output light signals.

In other words, in this arrangement, an (L−k)*(L−k) light switch 30 is used for through signals, and a k*k light switch 21 for accommodating transmission lines for branching (dropping) "k" threads of light signal out of the light signals in the paths P11–P1b into the office, light amplifiers 22_1–22_k for amplifying "k" threads of light signal outputted from the light switch 21, wave demultiplexers 23_1–23_k, and a reproducer 24 are connected to the input side.

To the output side of the light switch 30, on the other hand, "k" threads of light signal to be inserted (added) from the office are inserted to inter-office optical fibers of the paths P21–P2b on the output side through the serial circuits of a reproducer 28, multiplexers 27_1–27_k, and light amplifiers 26_1–26_k, and a k*k light switch 25.

In this way, the light switch 30 for the through signals can be downsized compared with the light switch 10 or 20 shown in FIGS. 3–5.

FIG. 7 shows a conceptual arrangement (5) of the optical cross-connect device according to the present invention. In this arrangement, "w" units of light switches are provided for each wavelength band, and the device further comprises: a wave demultiplexer for demultiplexing input light signals bound for the same destination transferred from the transmission line into "n/w" waves to be inputted to the light switches; and a wave multiplexer for multiplexing output light signals bound for the same destination to be transferred from the light switches to the transmission line; the respective "a" units of the wave demultiplexers and the wave multiplexers being connected to the light switches.

Briefly, this conceptual arrangement (5) is the conceptual arrangement (1) shown in FIG. 3 with the light switch 10 divided into "w" units of light switches 10_1–10_w depending on the wavelength band. Correspondingly, wave demultiplexers 31_11–31_1x . . . 31_b1–31_bx are provided in the optical fibers F1–Fx in the paths P11–P1b on input sides of the light switches 10_1–10_w, and each one of these wave demultiplexers demultiplexes the wavelengths λ1–λn into "n/w" waves to be respectively inputted to the light switches 10_1–10_w.

The light signals multiplexed by "a" units of wave multiplexers 3_11–3_1a are also demultiplexed into "n/w" waves by "a" units of wave demultiplexers 34_1–34_a (not shown), and are input to the light switches 10_1–10_w respectively.

On the output side corresponding to the input side, the wave multiplexers 32_11–32_1x . . . 32_b1–32_bx are provided, and the output signals of the light switches 10_1–10_w are multiplexed, and are inputted to the optical fibers F1–Fx in the paths P21–P2b, respectively.

Also, just like the input side, "a" units of wave multiplexers 35_1 . . . are provided to multiplex the output signals of the light switches 10_1–10_w, and the multiplexed output signals are branched to the intra-office device 1 by the wave demultiplexer 3 and the reproducer 2 through the light amplifiers 13_1 . . .

In this way, the light power to be inputted to the entire light switch can be dispersed and decreased.

In each of the above-mentioned conceptual arrangements, a non-blocking type, where the light switch switches over an arbitrary input side transmission line to an arbitrary output side transmission line, is used, but a light transmission line switching-type can also be used, as follows.

FIG. 8 shows a conceptual arrangement (6) of the optical cross-connect device according to the present invention, wherein supposing that "x" units of the light switches are provided, a number of paths connecting to another office or another node accommodating the transmission lines is "b" and a number of the wave multiplexers is "a", a number is assigned to a transmission line of each path, and the transmission lines with a same number are branched and routed to "x" units of (a+b)*(a+b) light switches.

In other words, in the case of this conceptual arrangement, "x" units of light switches 40_1–40_x are installed for each optical fiber F1–Fx of each path, so as to realize a fiber switching-type light switch, while in FIG. 7, light switches are divided for each wavelength band.

Therefore, the optical fibers F1–Fx in the path P11, for example, are connected to the light switches 40_1–40_x respectively, and through these light switches, the light signals are transferred to the optical fibers F1–Fx in the path P21 on the output side. This is the same for all of the "b" lines of paths on the input side, and for the "b" number of paths at the output side.

The "a" threads of light signal from the intra-office device are also divided into the light switches 40_1–40_x, but in this case, the light signals are divided into the number of light switches "x", and are inputted to the respective light switch as an a/x light signal component. The light signals outputted from the light switches 40_1–40_x are branched to the intra-office devices through the light amplifier 13, the wave demultiplexer 3, and the reproducer 2.

In this way, the light signals are routed by "x" units of light switches for each optical fiber in each path, so as to downsize the light switch.

FIG. 9 shows a conceptual arrangement (7) where the conceptual arrangement (6) of the optical cross-connect device according to the present invention in FIG. 8 is modified. In other words, just like the conceptual arrangement (2) in FIG. 4, reproducing portion 41 (41_11–41_1b . . . 41_x1–41_xb), which is composed of the wave demultiplexer, reproducer, and wave multiplexer, and light amplifiers 42_11–42_1b . . . 42_x1–42_xb, are provided on the input side (not illustrated) or on the output side of the light switches 40_1–40_x, or on both sides thereof (not illustrated).

This enables the deteriorated light signals to be reproduced, just like the case of the conceptual arrangement (2) or the like.

FIG. 10 shows a conceptual arrangement (8) of the optical cross-connect device according to the present invention, which has the conceptual arrangement (6) shown in FIG. 8, wherein "r" installations of input/output ports are added to the light switches 40_1–40_x, and at these "r" ports, light signal reproducing means composed of light amplifiers 43, reproducers 44 and light amplifiers 45, just like the conceptual arrangement (3) shown in FIG. 5, are inserted and connected to the routing paths (loop paths).

Therefore, only the through signals, which must be reproduced, once pass through the reproducing portion 44 at each of the light switches 40_1–40_x, so that the number of reproducing portions can be decreased.

FIG. 11 shows a conceptual arrangement (9) of the optical cross-connect device according to the present invention. This has the conceptual arrangement (4) shown in FIG. 6, wherein the light switch 30 is divided into "x" units of light switches 40_1–40_x, just as described above, and the optical fibers F1–Fx in each path are distributively connected to the light switches 40_1–40_x, and "k" pieces of optical fiber (optical fibers Fs) in each path are connected to a branching light switch 21 and an inserting light switch 25, just like the conceptual arrangement (4) in FIG. 6, so as to realize branching and inserting of the light signals.

Therefore in this conceptual arrangement (9), the respective "k" installations of the input/output ports are allocated to the branching light switch 21 and to the inserting light switch 25 so as to be decreased in the light switches 40_1–40_x.

In this way, the light switches 40_1–40_x for handling the through signals can be downsized.

FIG. 12 shows a conceptual arrangement (10) of the optical cross-connect device according to the present invention which has the conceptual arrangement (6) shown in FIG. 8, wherein each of the light switches 40_1–40_x is divided into the wavelength bands ("w" bands) respectively, just like the conceptual arrangement (5) in FIG. 7.

Therefore, the light switches 40_1–40_x shown in FIG. 8 are divided into 40_11–40_1w . . . 40_x1–40_xw in the conceptual arrangement (10) in FIG. 12.

Accordingly, on the input side of the light switches 40_1–40_x, wave demultiplexers 50_11–50_1b . . . 50_x1–50_xb for demultiplexing the light signals of the optical fibers F1–Fx in each path into "n/w" waves of light signals are provided, thereby demultiplexing the light signals into "n/w" waves of the light signals and on the output side as well, wave multiplexers 51_11–51_1b . . . 51_x1–51_xb are provided so as to multiplex the "n/w" waves of light signals to be inputted to the optical fibers F1–Fx in each path respectively.

In this way, the light signals which are inputted from the input side optical fibers are once demultiplexed into "n/w" waves of wavelength bands, are inputted to each light switch for the respective wavelength band, are routed, then are wavelength-multiplexed by the wave multiplexer, and are outputted to the optical fibers on the output side, so the light power to be inputted to the light switches can be decreased.

FIG. 13 shows a conceptual arrangement (11) of the optical cross-connect device according to the present invention. This optical cross-connect device comprises a (L−k+p)*(L−k+p) light switch 60 accommodating light signals which pass through from inter-office input side optical fibers to inter-office output side optical fibers and optical fibers for cross-connecting, protective transmission lines to the inserting/branching/protective switch, and a (2k+p)*(2k+p) light switch 61 for inserting/branching the light signals to the intra-office device, and for connecting the protective transmission lines to the through switch 60.

In other words, normally the input side optical fibers F1–Fx are connected through to the output side optical fibers F1–Fx by the light switch 60, or "k" threads of light signal, out of the light signals are branched by the light switch 61, or "k" threads of light signal are inserted to the optical fibers on the output side by the light switch 61.

If a transmission line fault occurs outside the office, the light switch 60 is controlled by the operation system (see FIG. 40), for example, so that the optical fibers F1–Fx of the paths are connected to the light switch 61 through the "p" threads of transmission lines for cross-connection, and are branched to the intra-office device from the light switch 61 which is also controlled, or the light signals from the intra-office device are inputted to the "p" threads of transmission lines for cross-connection through the light switch 61, and are transmitted therefrom to the optical fibers F1–Fx in the paths on the output side.

In this way, the light switches of the light signals of through signals can be downsized, and a protective transmission line can be shared with the intra-office device by through signals.

FIGS. 14A and 14B are expanded conceptual diagrams showing the above-mentioned wave multiplexer/demultiplexers to be used for the present invention, wherein FIG. 14A specifically shows a wave multiplexer, and FIG. 14B shows a wave demultiplexer. In any case, a wave multiplexer/demultiplexer is composed of the first wave multiplexer/demultiplexers 3A_1–3A_3 for multiplexing each wave into "m" waves or demultiplexing the "m" waves into each wave, and the second wave multiplexer/demultiplexer 3B for multiplexing/demultiplexing waves by "m" waves, and the reproducer 2 is added if necessary.

In other words, only the wave multiplexer/demultiplexers 3A_1 and 3B are preliminarily provided, and the wave multiplexer/demultiplexers 3A_2–3A_3 are added, as shown, subject to an increase of traffic, so that the traffic can be expanded in a flexible way.

In the above-mentioned conceptual arrangements, all of the optical fibers connected to the light switch are working fibers while protective ones are not considered. Therefore, the states for the conceptual arrangements (1)–(3), (5)–(8), and (10) which specifically require considering protective optical fibers will now be described as conceptual arrangements (12) and (13).

Firstly, as shown in FIG. 15, in a conceptual arrangement (12) of the optical cross-connect device according to the present invention, protective optical fibers are provided and a protective light switch corresponding thereto is also provided.

Namely, the L*L light switch 10 is made a working-signal light switch, the optical fibers F1–Fx in the path P11 connected to the input side of the light switch 10 are made working optical fibers. Furthermore, protective optical fibers Fx+1–Fy are provided. Similarly, protective optical fibers Fx+1–Fy are provided in the path P1b. Also, on the output side of the light switch 10, protective optical fibers Fx+1–Fy are respectively provided in the paths P21–P2b.

As for the working optical fibers F1–Fx in the paths P11–P2b, (L−a) pieces of fiber in total exist on each of the input and the output sides of the light switch 10 in the same way as e.g. the conceptual arrangement (1) shown in FIG. 3. The protective optical fibers Fx+1–Fy newly provided in the paths P11–P2b are connected to a protective-signal light switch 100.

By the routing operation of the light switch 100, the optical fibers Fx+1–Fy in the paths P11–P1b on the input side are switched over and connected to the protective optical fibers Fx+1–Fy in the paths P21–P2b on the output side. The protective optical fibers Fx+1–Fy on the input and the output sides of the light switch 100 are respectively "q" pieces of fiber in total.

Also, "a" threads of light insertion signal from the light amplifier 12 are transmitted to both of the light switch 10 and the light switch 100 in parallel, and light branch signals are provided to the light amplifier 13 from both of the light switch 10 and the light switch 100.

By receiving a control signal from a network management side when a fault occurs in a certain optical fiber, the light switch 100 transmits the light insertion signal of the light amplifier 12 to the designated optical fiber in the paths P21–P21b on the output side, and transmits the light branch signal to the light amplifier 13 from the optical fibers in the paths P11–P1b on the input side.

Namely, when a fault occurs on a certain optical fiber, while in the example of FIG. 15, the light signal of the protective optical fiber Fy in the path P11 on the input side is transmitted to the light amplifier 13_1 as a light branch signal through the light switch 100, and the light insertion signal of the light amplifier 12_a is transmitted to the protective light switch Fy in the path P21 through the light switch 100, it is possible to connect the light signal of the protective optical fiber Fy in the path P11 to e.g. the protective optical fiber Fy in the path P2b on the output side by the routing operation of the light switch 100.

Thus, the light transmission line formed through the light switch 10 is relieved from the fault.

In the above-mentioned conceptual arrangement (12), the light insertion signal from the light amplifier 12 or the light branch signal to the light amplifier 13 is commonly connected to the working-signal light switch 10 and the protective-signal light switch 100. However, a conceptual arrangement (13) of the optical cross-connect device according to the present invention shown in FIG. 16 is different from the conceptual arrangement (12) in that the light signals are only connected to the working-signal light switch 20 and a protective-signal light switch 200 is provided in order to switch over and connect to only "r" threads of light insertion/branch signal of "a" threads of light insertion/branch signal.

Namely, an (L+r)*(L+r) light switch 20, in the same way as the conceptual arrangement (12), inputs the light signals from the working optical fibers F1–Fx, which are (L–a) pieces of fiber in total, in the paths P11–P1b on the input side, and outputs the light signals, corresponding thereto, to the working optical fibers F1–Fx, which are (L–a) pieces of fiber in total, in the paths P21–P2b on the output side.

Also, the light switch 20 inputs "a" threads of light insertion signal from the light amplifier 12, and outputs "a" threads of light branch signal. Furthermore, the switches 20 and 200 are connected so that "r" threads of light insertion/branch signal are taken out from the light switch 20 to be provided to the protective-signal light switch 200 as a light input signal, and "r" threads of light signal are returned to the light switch 20 from the light switch 200.

As a result, in the example of FIG. 16, the light signal of the working optical fiber F1 in the path P11 is transmitted to the working optical fiber F1 in the path P21 on the output side through the light switch 20. Also, the light signal of the working optical fiber Fx in the path P11 on the input side is transmitted to the working optical fiber Fx in the path P2b on the output side through the light switch 20.

Furthermore, the light signal of the working optical fiber F1 in the path P1b on the input side is transmitted to the light amplifier 13 through the light switch 20, and the light signal of the working optical fiber Fx in the path P1b on the input side is transmitted from the light switch 20 to the working optical fiber Fx in the path P21 on the output side.

Furthermore, while the light insertion signal of the light amplifier 12_1 from the light amplifier 12 is transmitted through the light switch 20 to the working optical fiber F1 in the path P2b on the output side, the light insertion signal from the light amplifier 12_a is inputted to the protective-signal light switch 200 after having been outputted from the light switch 20, and transmitted to the protective optical fiber Fx+1 in the path P21 on the output side by the routing operation (controlled by the network management side) of the light switch 200.

Moreover, the light output signal of the protective optical fiber Fx+1 in the path P11 on the input side is transmitted to the light switch 200, and outputted therefrom based on the routing operation of the light switch 200 to be returned to the light switch 20. The light switch 20 passes this light signal to the light amplifier 13_1, thereby accommodating to external light transmission line faults.

The optical network can be composed of the above-mentioned optical cross-connect devices.

FIG. 17 shows a recovery concept when a fault occurs in the optical network according to the present invention.

Namely, when a transmission line fault occurs in the present invention, each of the optical cross-connect devices receives a fault notification. Then, the line is switched over to a protective transmission line predetermined to take the shortest line, different from the working transmission line, thereby enabling a fault recovery.

Namely, supposing that a fault FLT occurs on the optical fiber F51 forming the path B, and when the optical cross-connect device XC#1 of the optical network exemplified by four optical cross-connect devices XC#1–XC#4 receives the fault notification by a conventional method, the optical fiber F12 is changed to the optical fiber F22 which is the shortest route. Similarly in the optical cross-connect device XC#2, the optical fiber F32 is connected to the optical fiber F22. Furthermore in the optical cross-connect device XC#4, switchover is similarly performed so that the optical fiber F32 is connected to the demultiplexer 3 on the intra-office device side.

In this way, the path is changed from the path B to the path G shown by the dotted line, wherein the fault can be recovered. Compared with the conventional case where a recovery path is established by optical fibers F12→F13→F22→F32 when a fault FLT occurs, the portion of optical fiber F13 becomes unnecessary, therefore a protective transmission line can be effectively used and the light switch can be downsized.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIG. 13 is a block diagram showing a conceptual arrangement (11) of an optical cross-connect device according to the present invention;

FIGS. 14A and 14B are block diagrams showing the expanded concept of the wave multiplexer/demultiplexer used for the present invention;

FIG. 15 is a block diagram showing a conceptual arrangement (12) of an optical cross-connect device according to the present invention;

FIG. 16 is a block diagram showing a conceptual arrangement (13) of an optical cross-connect device according to the present invention;

FIG. 20 is a block diagram showing an embodiment of an IP router as an intra-office device used for the present invention;

FIG. 35 is a block diagram showing an embodiment (12) of an optical cross-connect device according to the present invention;

FIG. 36 is a block diagram showing an embodiment (13) of an optical cross-connect device according to the present invention;

FIG. 39 is a diagram showing an effect of the present invention regarding switch size;

DESCRIPTION OF THE EMBODIMENTS

Figure 17:
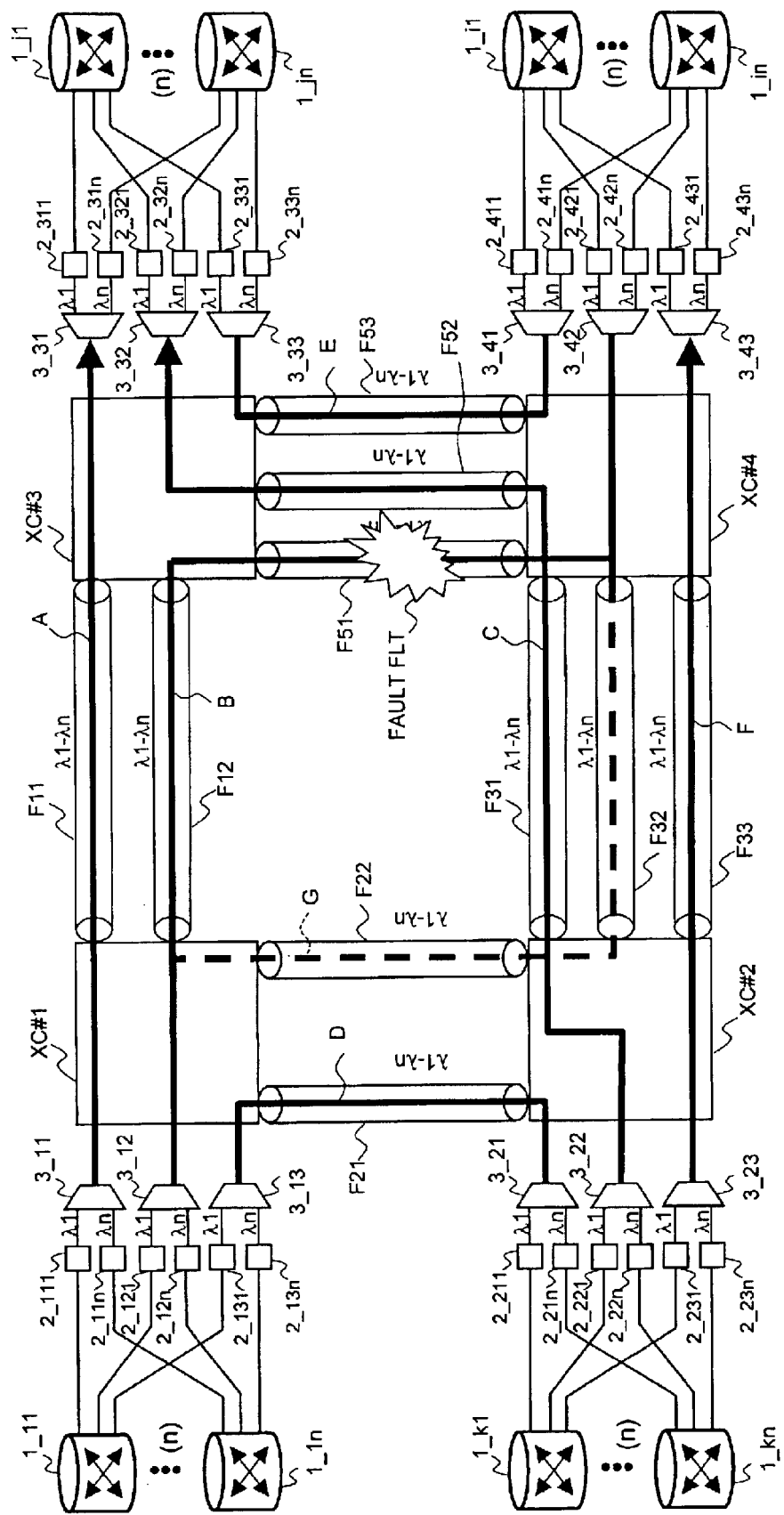
FIG. 17 is a block diagram showing an operation concept for fault recovery of an optical network according to the present invention.
Figure 18:
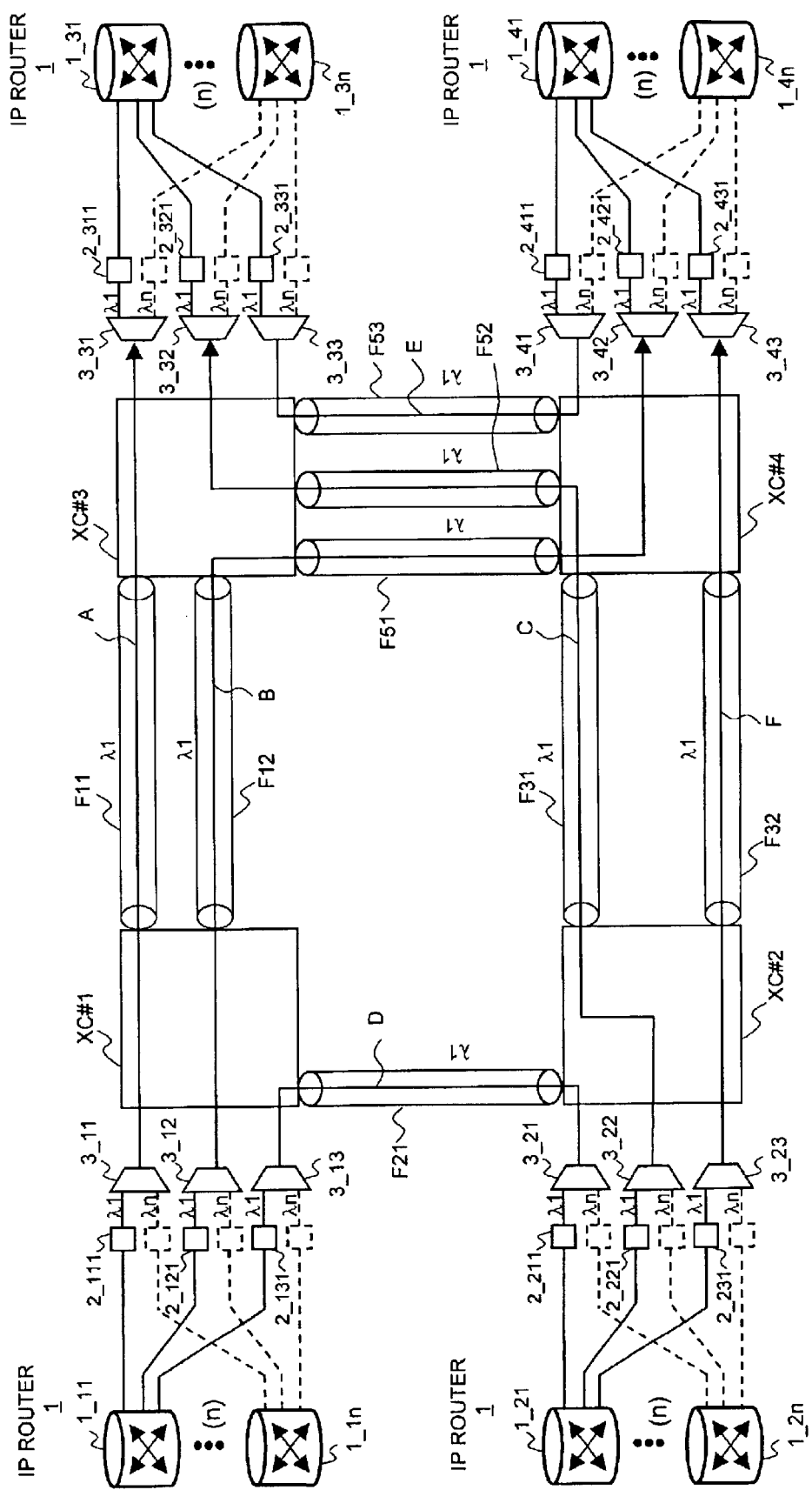
FIG. 18 is a block diagram showing an embodiment of an optical network according to the present invention.

FIG. 18 shows an embodiment of the optical network according to the present invention, and this embodiment is composed of 4 optical cross-connect devices XC#1–XC#4, just like the conceptual arrangement in FIG. 17.

In such an optical network, all paths can be transmitted if there are 8 pieces of optical fiber in total (actually 8 pieces of fiber each in both directions) to accommodate the light signals bound for the same destination in the same optical fiber and to be transferred.

For this, only one optical fiber F21 is installed between the optical cross-connect devices XC#1 and XC#2, 2 pieces of optical fiber F11 and F12 are installed between the optical cross-connect devices XC#1 and XC#3, 2 pieces of optical fiber F31 and F32 are installed between the optical cross-connect devices XC#2 and XC#4, and 3 pieces of optical fiber F51-F53 are installed between the optical cross-connect devices XC#3 and XC#4.

Figure 1:
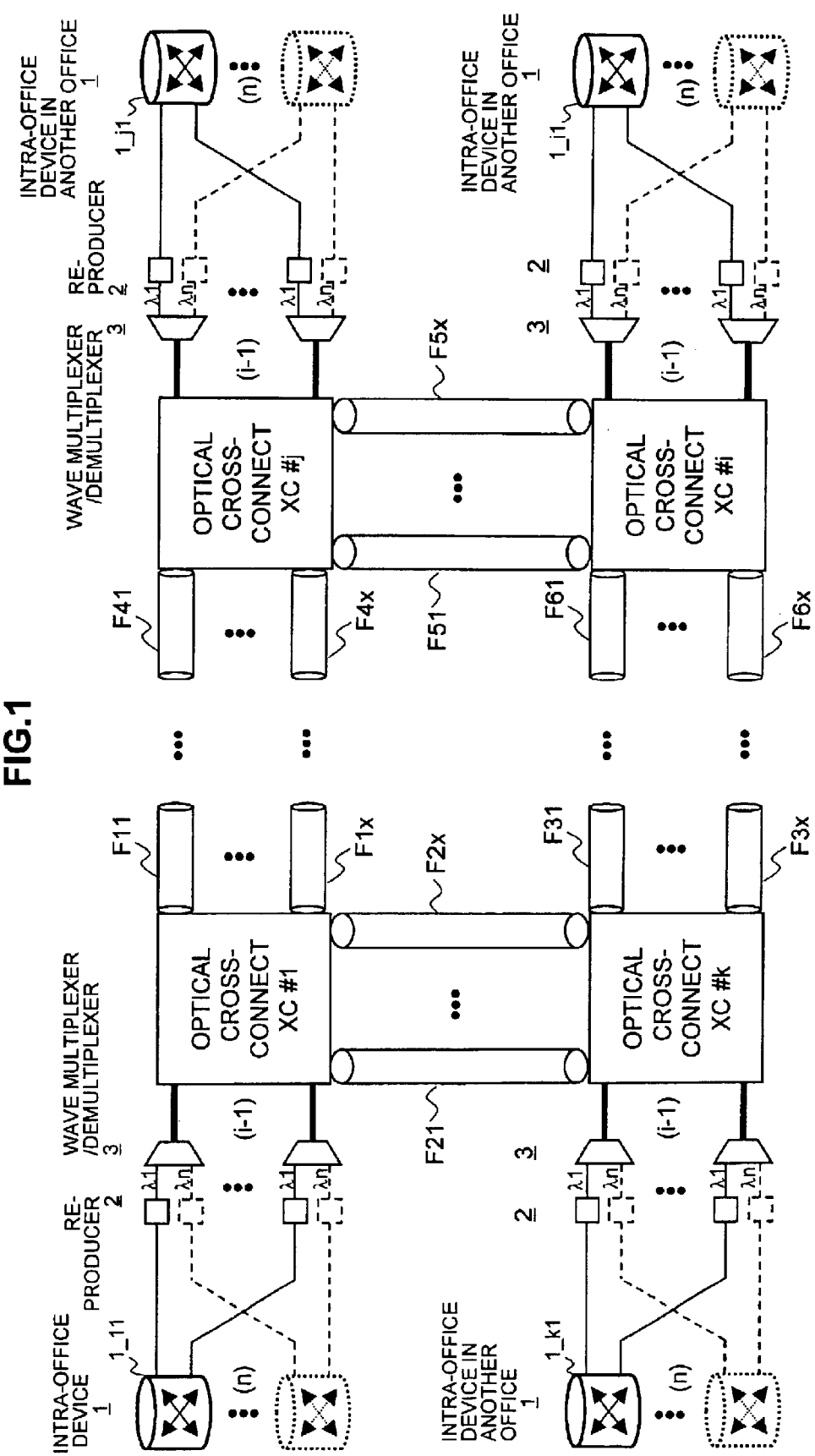
FIG. 1 is a block diagram showing a conceptual arrangement of an optical network according to the present invention.
Figure 2:
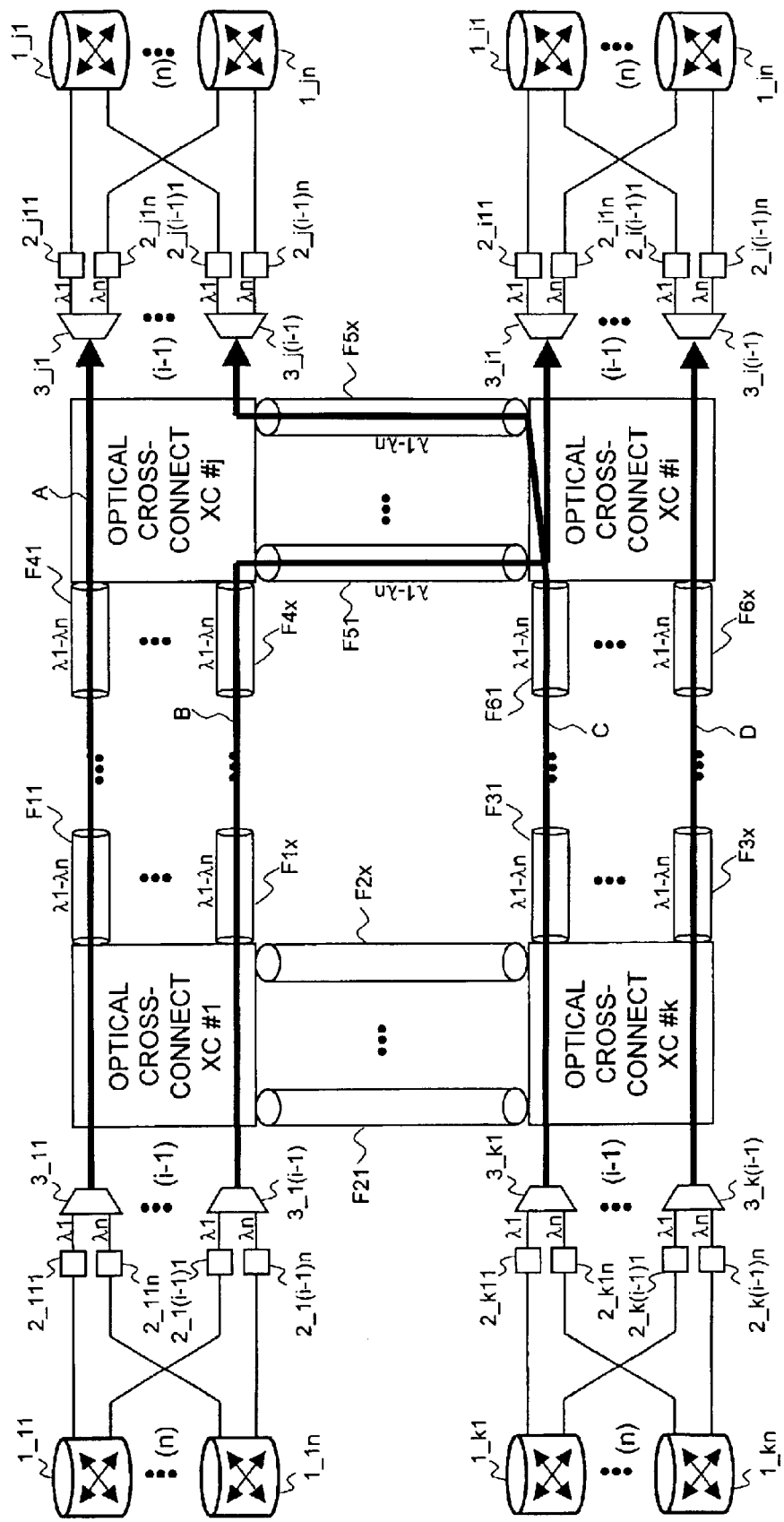
FIG. 2 is a block diagram showing a conceptual arrangement of an optical network according to the present invention (for expanded traffic)
Figure 19:
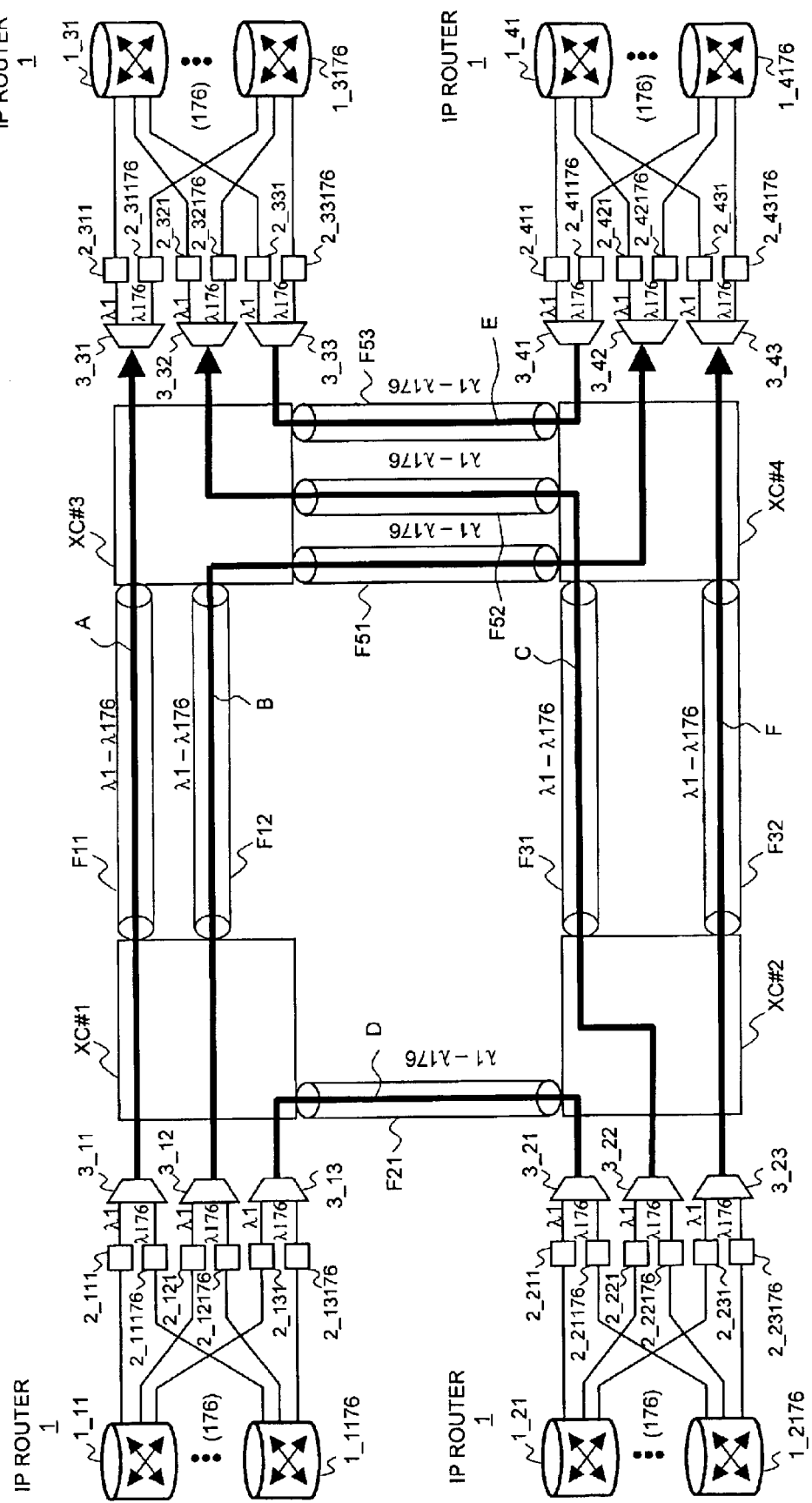
FIG. 19 is a block diagram showing an embodiment of an optical network according to the present invention (for expanded traffic)

FIG. 19 shows an embodiment when traffic increases in such an optical network, where IP routers as intra-office devices to be connected to all the other nodes are increased in number up to 1–176 units, and up to 176 waves of traffic bound for the same destination are accommodated in each transmission line, just like the relationship between FIG. 1 and FIG. 2.

In other words, it is sufficient if the optical fiber F11 for forming the path A exists between the optical cross-connect devices XC#1 and XC#3, it is sufficient if the optical fibers F12 and F51 for forming the path B exist between the optical cross-connect devices XC#1 and XC#4, it is sufficient if the optical fibers F31 and F52 for forming the path C exist between the optical cross-connect devices XC#2 and XC#3, it is sufficient if the optical fiber F21 for forming the path D exists between the optical cross-connect devices XC#1 and XC#2, and it is sufficient if the optical fiber F32 for forming the path F exists between the optical cross-connect devices XC#2 and XC#4.

In this way, the light signals to be transmitted to the IP router 1__41 from the IP router 1__11 and light signals to the IP router 1\_4176 from the IP router 1\_1176, are multiplexed by the wave multiplexer 3\_12 through the reproducers 2\_121 and 2\_12176 respectively, and are transferred from the wave multiplexer 3\_42 to the IP router 1\_41 through the reproducer 2\_421 by the abovementioned path B, and to the IP router 1\_4176 through the reproducer 2\_42176.

FIG. 20 shows an embodiment of an IP router which is an intra-office device. In the case of this embodiment, n=176 of office IP routers are installed. When a light signal "a" is inputted to the IP router 1\_11, for example, the routing table set for this IP router 1\_11 is referred to. If the input IP address is "a", then the output port P1 is selected, so this light signal is transmitted to the light switch 10 through the reproducer 2\_111 and the wave multiplexer 3\_11, and is output from this light switch 10 to the optical fiber F2 at the lower side.

For a light signal with an IP address "b" to be inputted to the IP router 1\_11, the routing table is also referred to, since there is an output port P176, the light signal is transmitted from this output port P176 to the reproducer 2\_131, is inputted to the light switch 10 through the wave multiplexer 3\_13, and is outputted from the light switch 10 to the optical fiber F1 at the uppermost side.

In the IP router 1\_1176, on the other hand, the light signal with the IP address "a" is outputted to the output port P1 based on the routing table, is transmitted from the output port P1 to the light switch 10 through the reproducer 2\_11176 and the wave multiplexer 3\_11, and is outputted therefrom to the optical fiber F2 at the lower side.

The light signal with the IP address "b" inputted to the IP router 1\_1176 is outputted therefrom to the output port P176 based on the routing table, is input to the light switch 10 through the reproducer 2\_13176 and the wave multiplexer 3\_13, and is outputted therefrom here to the optical fiber F1 at the upper side.

Therefore when the input IP address is "a", as shown in FIG. 20, the light signals are outputted to the optical fiber F2 at the lower side, and when the input IP address is "b", the light signals are outputted from the optical fiber F1 at the upper side, where lights signals bound for the same destination are transferred to the same optical fiber.

Figures 21A, 21B:
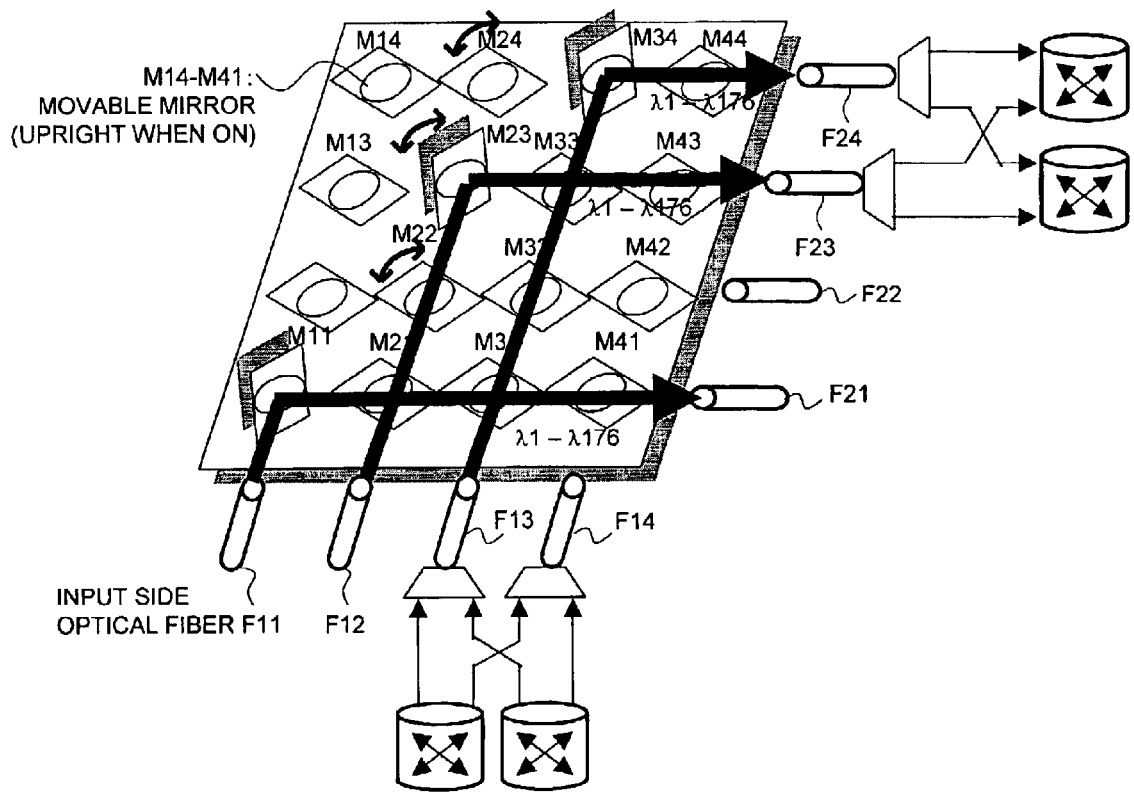
FIGS. 21A and 21B are diagrams showing an embodiment of a light switch used for the present invention (2-dimensional MEMS)

FIGS. 21A and 21B show an embodiment of the light switch (2-dimensional MEMS light switch) used for each of the above-mentioned conceptual arrangements and embodiments.

In other words, in this light switch, a path setting table as shown in FIG. 21B is preliminarily provided, and paths are set according to this path setting table.

In the case of the path 1, the light signals from the input side optical fiber F11 are outputted to the output side optical fiber F21, as shown in FIG. 21A, since the movable mirror M11 is ON. The light signals of the input side optical fiber F12 are outputted to the output side optical fiber F23 through the movable mirror M23. And the light signals to the input side optical fiber F13 are outputted from the output side optical fiber F24 by the movable mirror M34.

The path 1, in this case, is an inter-office transmission line for transfers, the path 2 is a path from the transmission line to the wave demultiplexer, and the path 3 connects the wave multiplexer to the wave demultiplexer.

Figures 22A, 22B:
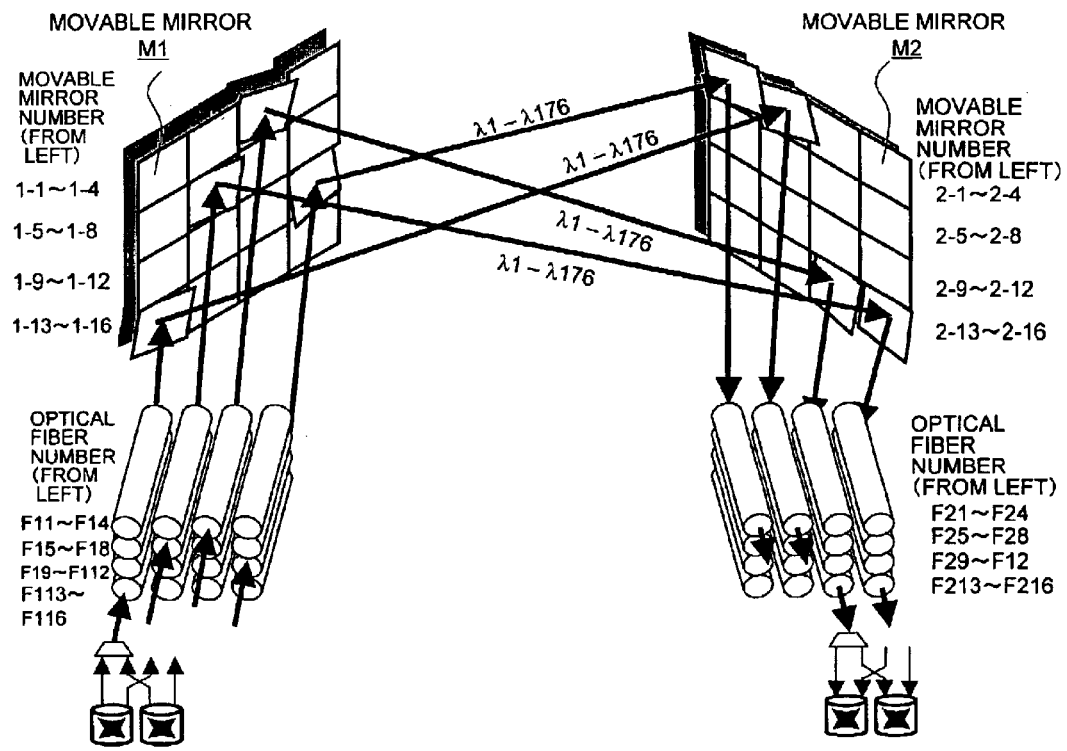
FIGS. 22A and 22B are diagrams showing another embodiment of a light switch used for the present invention (3-dimensional MEMS)

FIGS. 22A and 22B show another embodiment of the light switch (3-dimensional MEMS light switch).

In the case of this light switch as well, the path setting table, as shown in FIG. 22B, is preliminarily provided, and paths are set based thereon.

For the path 1, the light signals from the optical fiber F13 on the input side are outputted to the optical fiber F215 at the output side, since the movable mirror 1-3 is directed to the mirror 2-15, and the mirror 2-15 is directed to the output fiber F215.

Similarly, in the case of the path 2, the mirror 1-6 is directed to the mirror 2-16, and the mirror 2-16 is directed to the output fiber F216.

The path 3 is set by directing the mirror 1-12 to the mirror 2-1 and the mirror 2-1 to the output fiber F21 for the light signals from the optical fiber F112 at the input side. The path 4 is set by directing the mirror 1-13 to the mirror 2-2, and the mirror 2-2 to the output fiber F22.

Figure 23:
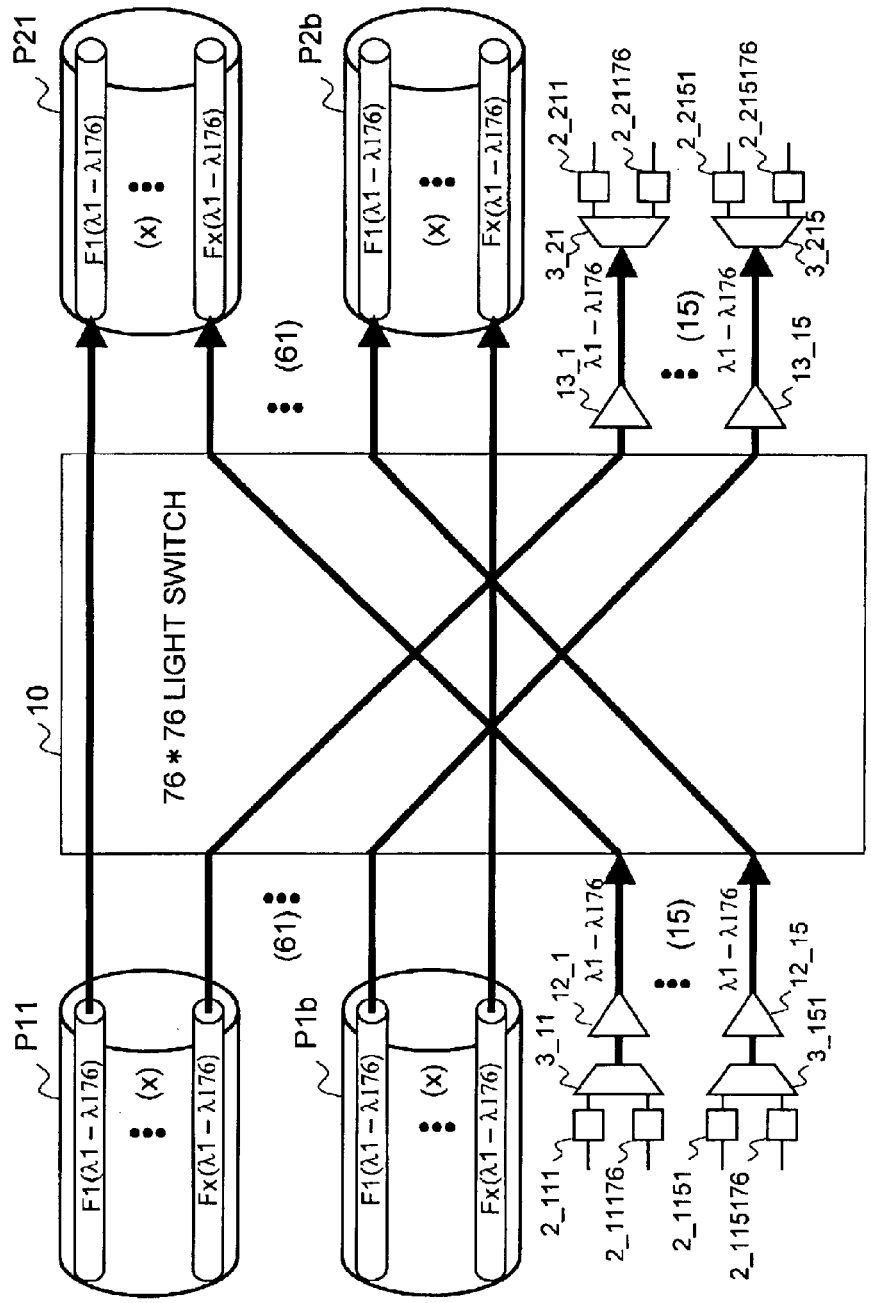
FIG. 23 is a block diagram showing an embodiment (1) of an optical cross-connect device according to the present invention.

FIG. 23 shows an embodiment (1) of the optical cross-connect device according to the present invention. This embodiment corresponds to the conceptual arrangement (1) of the optical cross-connect device shown in FIG. 3. In this embodiment, a fiber switching-type optical cross-connect device is provided using a 76*76 light switch 10 accommodating 76 pieces of input/output optical fiber and 176 waves, which are multiplexed in the optical fibers.

Figure 3:
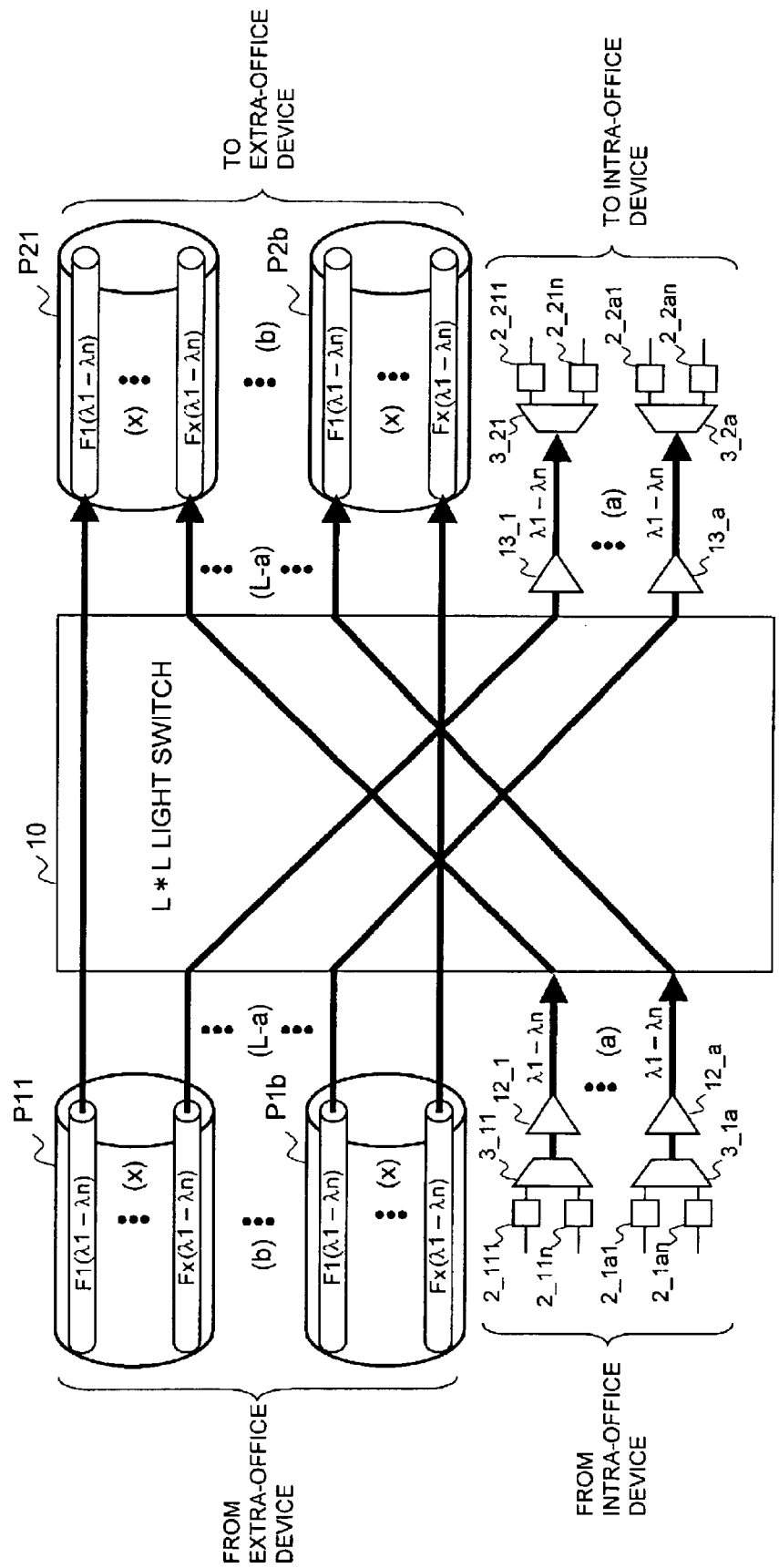
FIG. 3 is a block diagram showing a conceptual arrangement (1) of an optical cross-connect device according to the present invention.

In this case, the number of light signals to be inserted from the intra-office device 1 in FIG. 3 and the number of light signals to be branched to the intra-office device 1 are "a"=15. Therefore the number of inter-office fibers is L−a=76−15= 61. The other aspects are the same as the case of FIG. 3.

Figure 4:
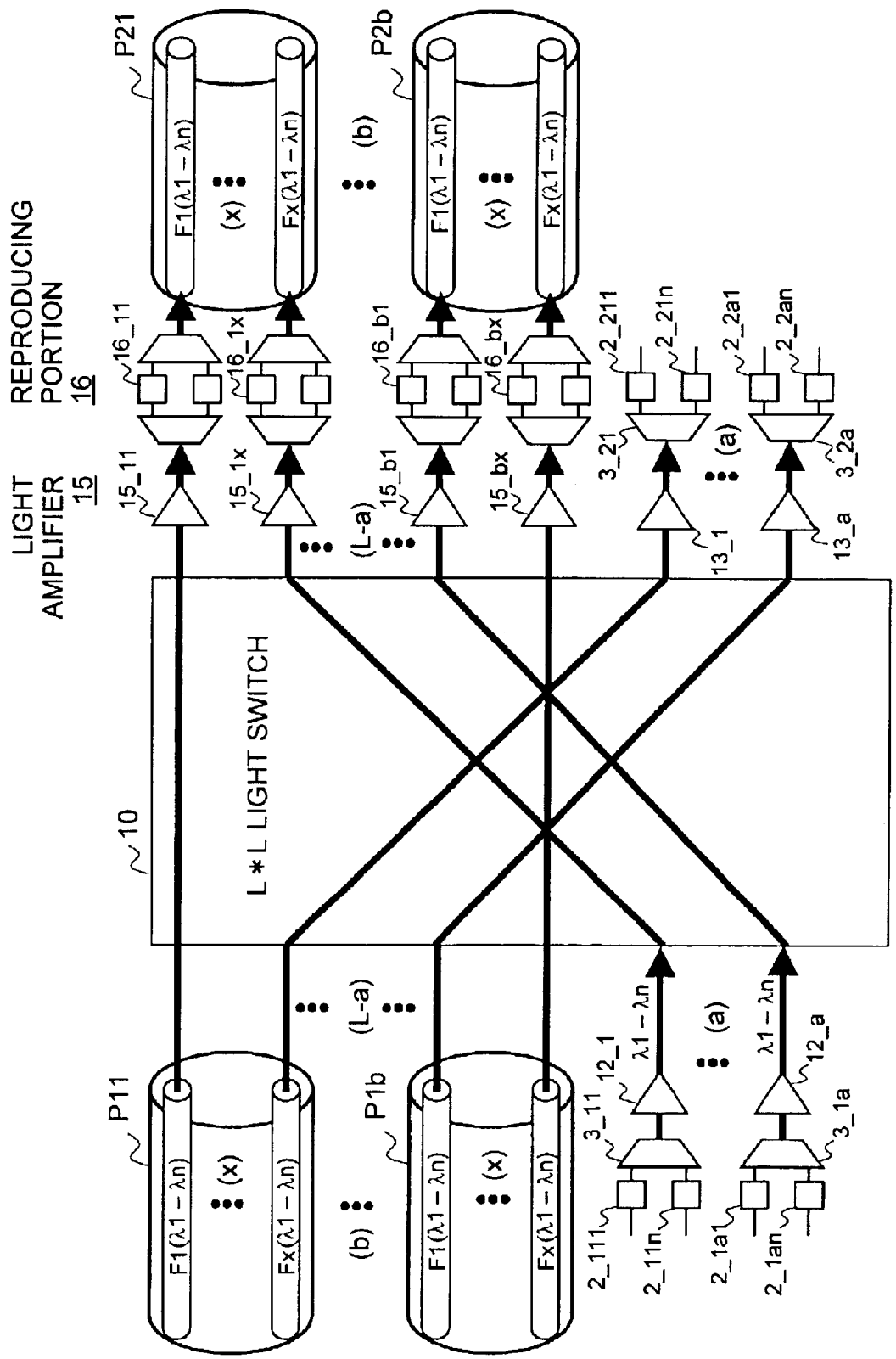
FIG. 4 is a block diagram showing a conceptual arrangement (2) of an optical cross-connect device according to the present invention.
Figure 24:
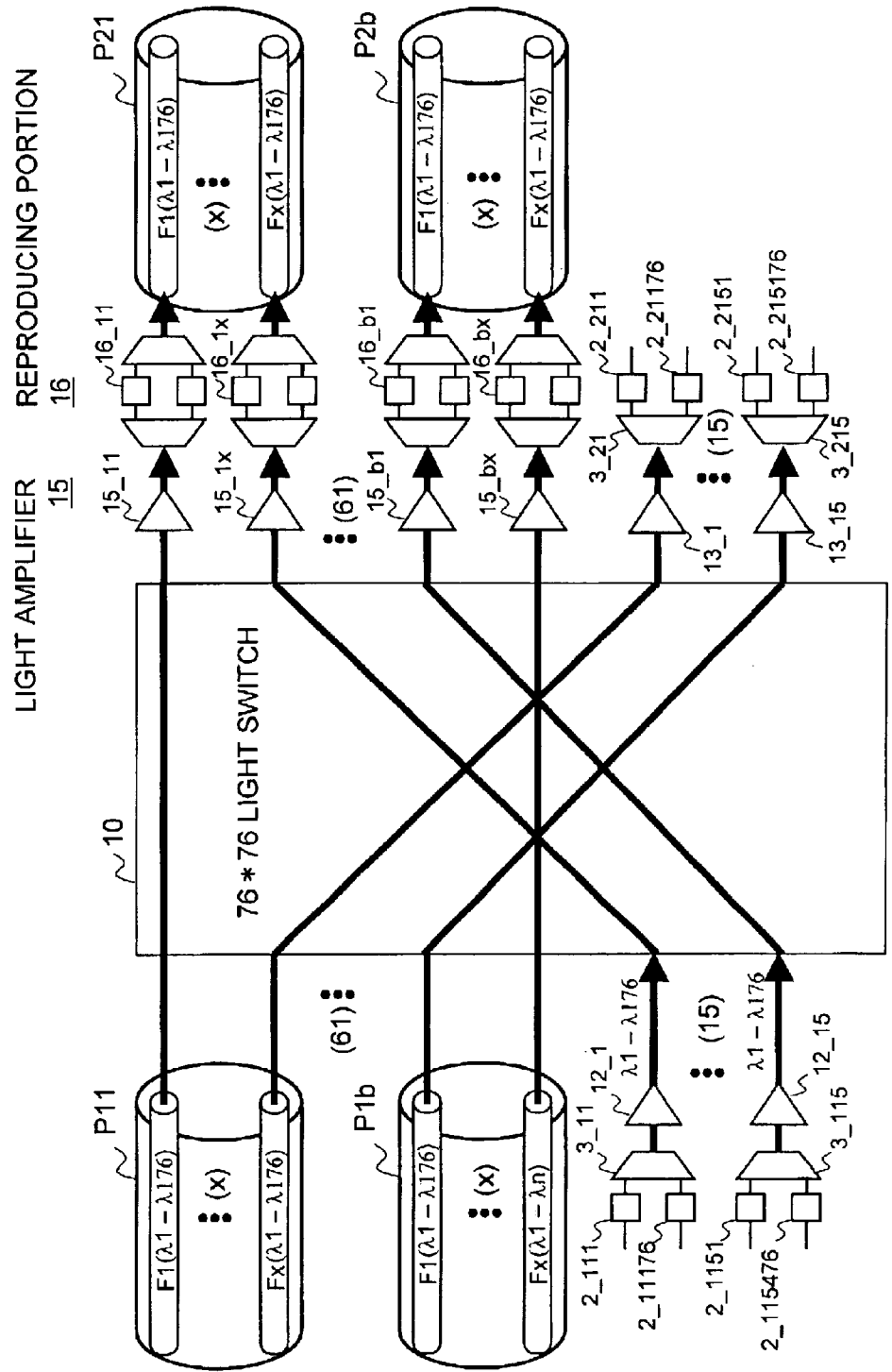
FIG. 24 is a block diagram showing an embodiment (2) of an optical cross-connect device according to the present invention.

FIG. 24 shows an embodiment (2) of the optical cross-connect device according to the present invention. This embodiment corresponds to the conceptual arrangement (2) of the optical cross-connect device shown in FIG. 4. In this embodiment, a fiber switching-type optical cross-connect device with an intensified light signal reproducing function is composed of a 76*76 light switch 10, 61 units of light amplifiers 15 installed at the output side optical fibers, and 61 units of reproducing portions 16 (composed of 61 wave demultiplexers, 10736 units of reproducers, and 61 units of wave multiplexers).

Figure 5:
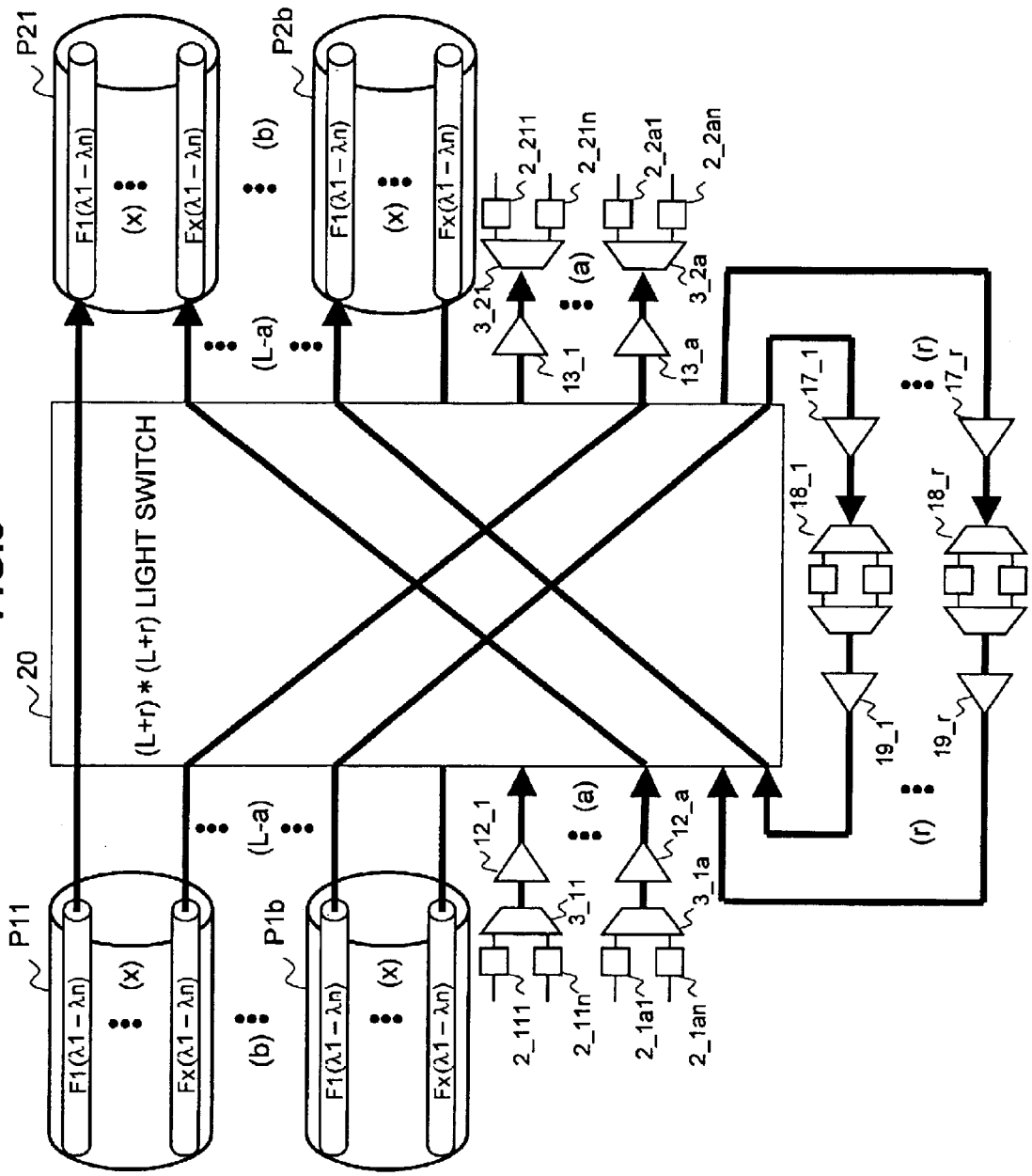
FIG. 5 is a block diagram showing a conceptual arrangement (3) of an optical cross-connect device according to the present invention.
Figure 25:
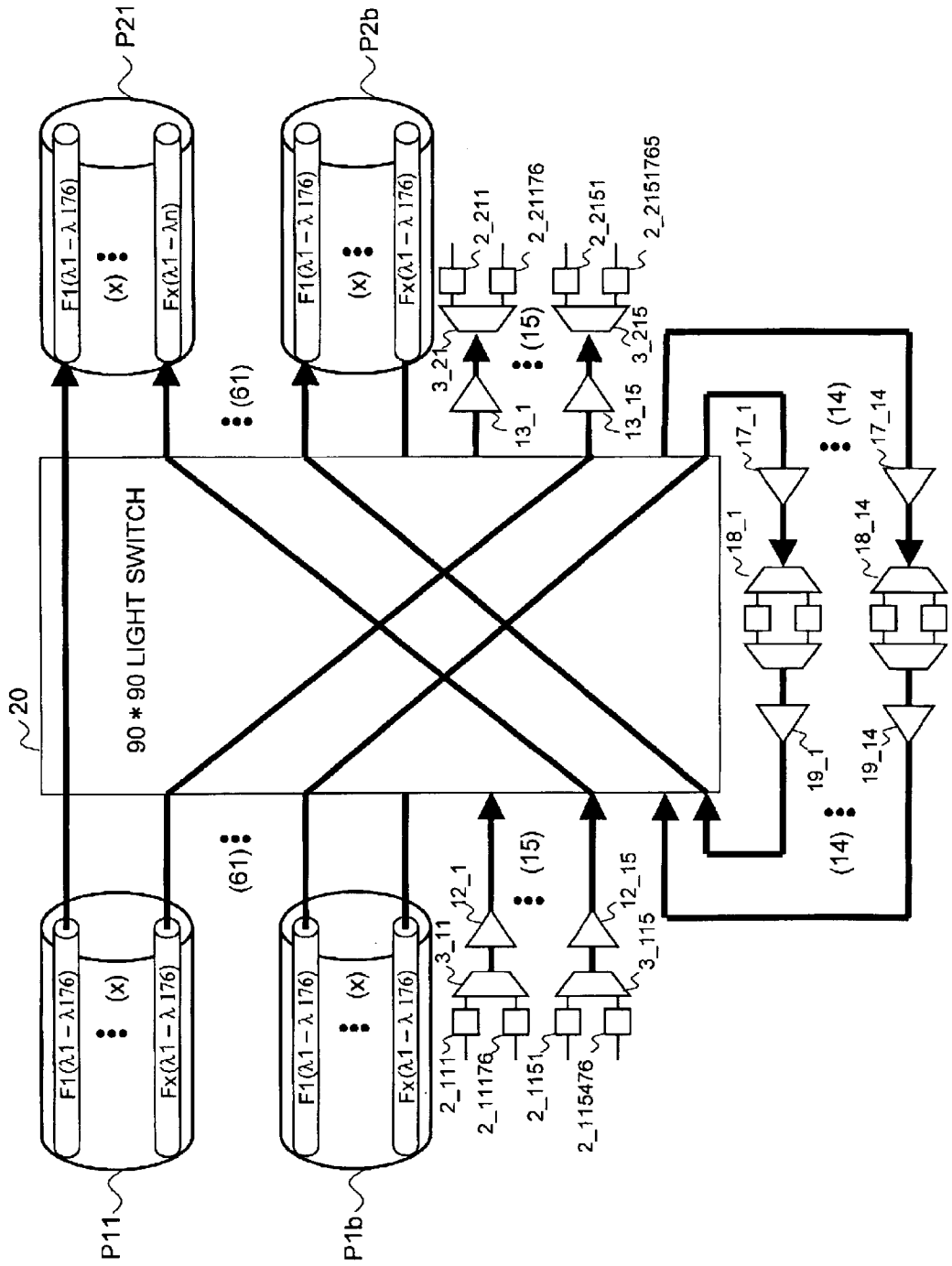
FIG. 25 is a block diagram showing an embodiment (3) of an optical cross-connect device according to the present invention.

FIG. 25 shows an embodiment (3) of the optical cross-connect device according to the present invention. This embodiment corresponds to the conceptual arrangement (3) of the optical cross-connect device shown in FIG. 5. In this embodiment, a fiber switching-type optical cross-connect device with an intensified light signal reproducing function is shown, which is composed of a 90*90 light switch 20, wherein the number of input/output side optical fibers is a+b=76, the number of wavelengths for an optical fiber is "n"=176 waves, and the number of optical fibers requiring reproduction out of the inter-office input side optical fibers is "r"=14, 28 units of light amplifiers 17 and 19 forming the light signal reproducing means, and 14 units of reproducing portions (composed of 14 wave multiplexer/demultiplexers and 2464 reproducers) 18 provided in the routing path.

Figure 6:
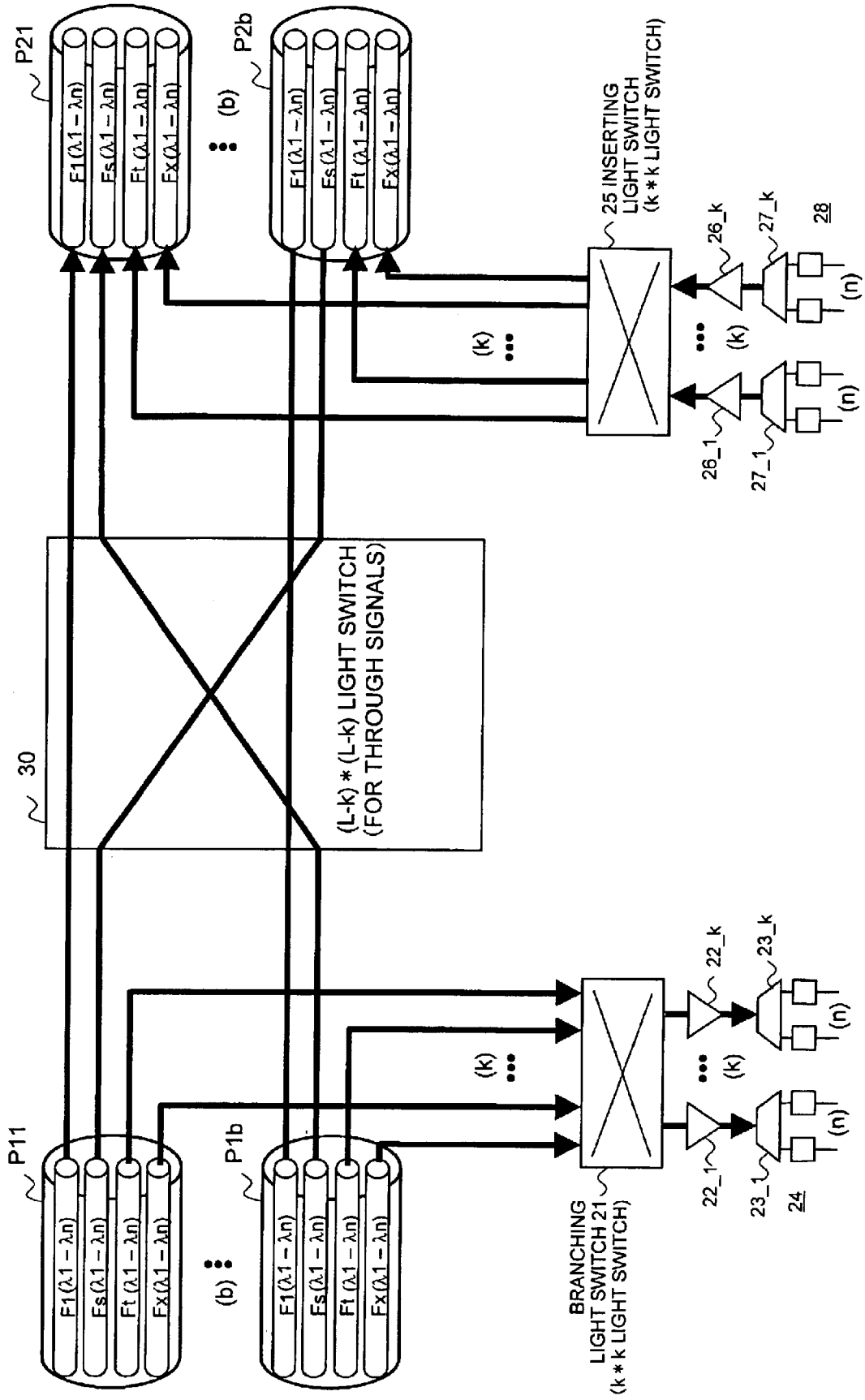
FIG. 6 is a block diagram showing a conceptual arrangement (4) of an optical cross-connect device according to the present invention.
Figure 26:
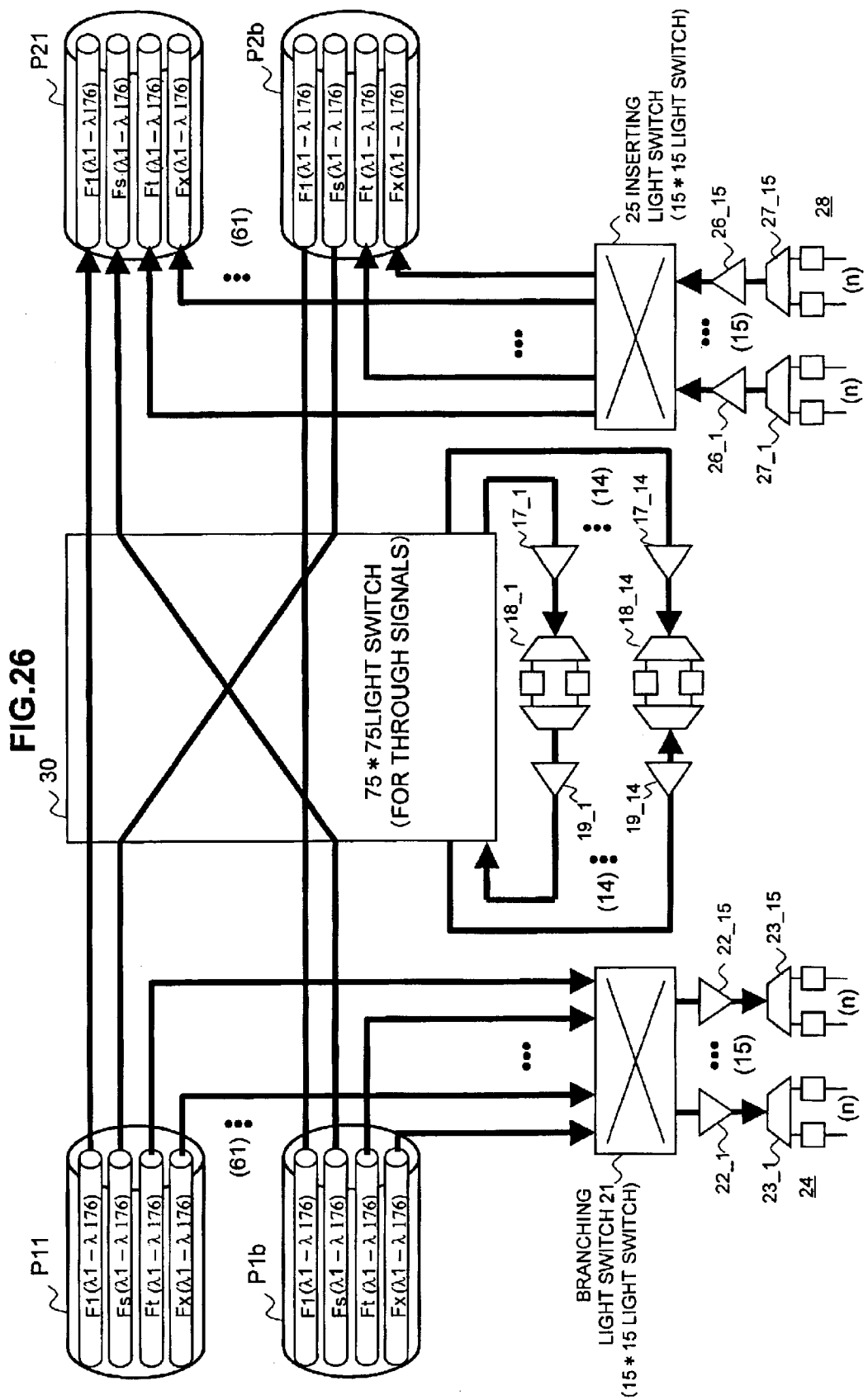
FIG. 26 is a block diagram showing an embodiment (4) of an optical cross-connect device according to the present invention.

FIG. 26 shows an embodiment (4) of the optical cross-sectional device according to the present invention. This embodiment corresponds to the conceptual arrangement (4) of the optical cross-connect device shown in FIG. 6. However, the light signal reproducing means is provided in the routing path, just like FIG. 25. In this embodiment, a fiber switching-type optical cross-connect device is composed of a 75*75 light switch 10, to be used as the light switch 10 for through light signals, and the 15*15 light switches 21 and 25 for insertion/branching purposes.

Figure 7:
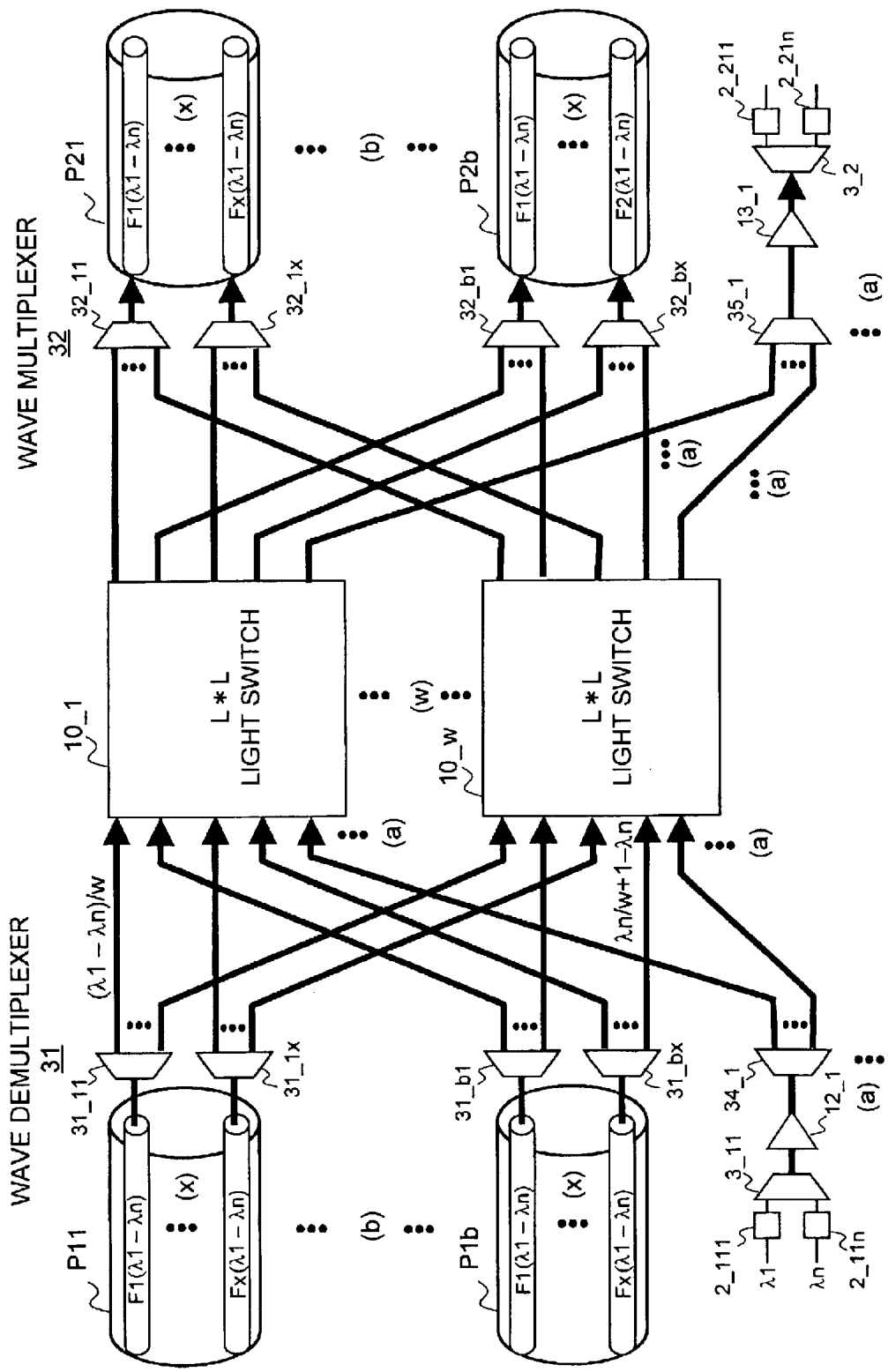
FIG. 7 is a block diagram showing a conceptual arrangement (5) of an optical cross-connect device according to the present invention.
Figure 27:
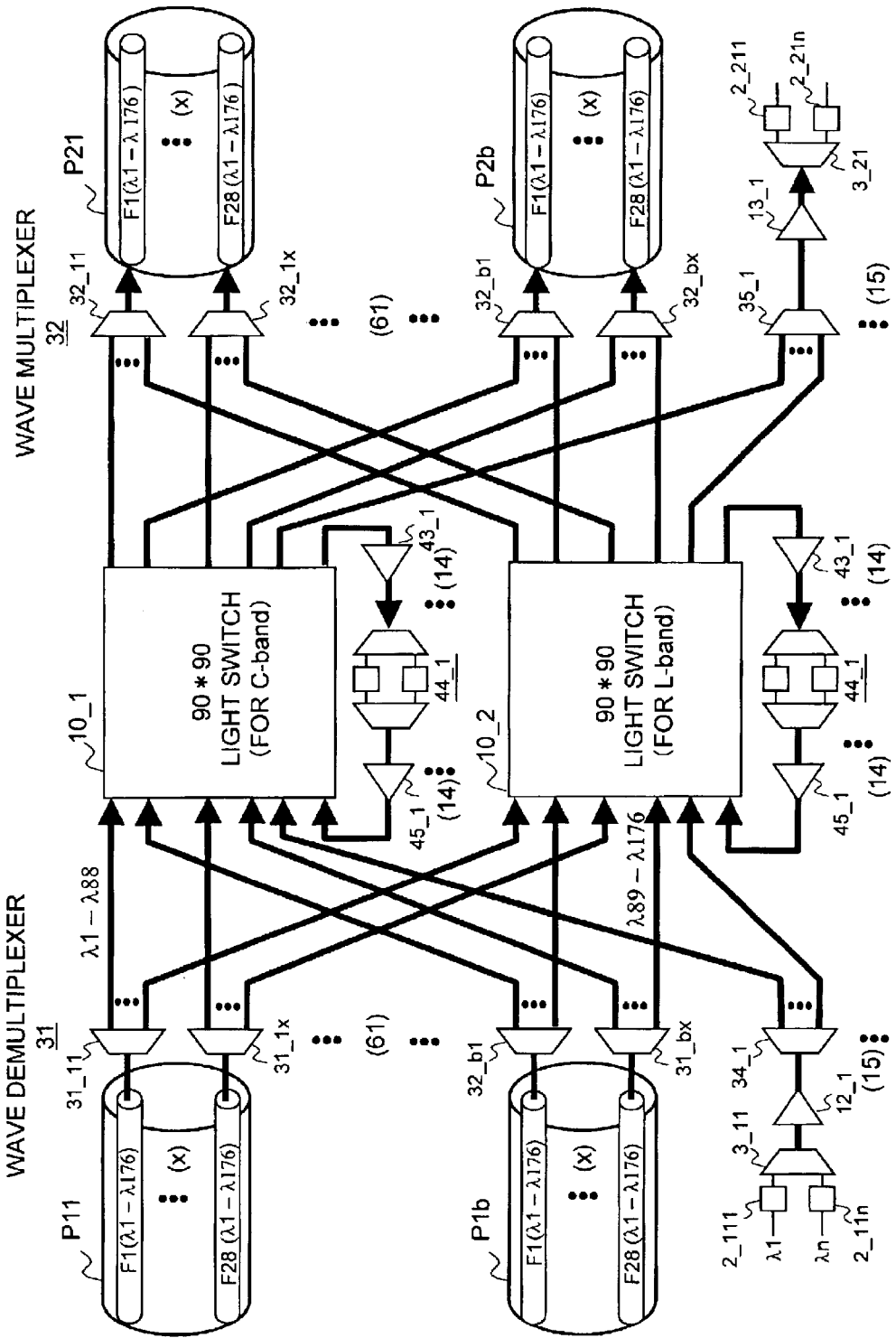
FIG. 27 is a block diagram showing an embodiment (5) of an optical cross-connect device according to the present invention.

FIG. 27 shows an embodiment (5) of the optical cross-connect device according to the present invention. This embodiment corresponds to the conceptual arrangement (5) of the optical cross-connect device shown in FIG. 7. In this embodiment, two 90*90 light switches 10_1 and 10_2 are provided for "w"=2 wavelength bands, C-band and L-band, out of 176 waves of wavelengths, and the light signal reproducing means are provided in the routing paths respectively, just like FIGS. 25 and 26. In these routing paths, a fiber switching-type optical cross-connect is composed of 56 (14×4=56) units of light amplifiers and 28 units of reproducing portions (including 2464 reproducers).

Figure 8:
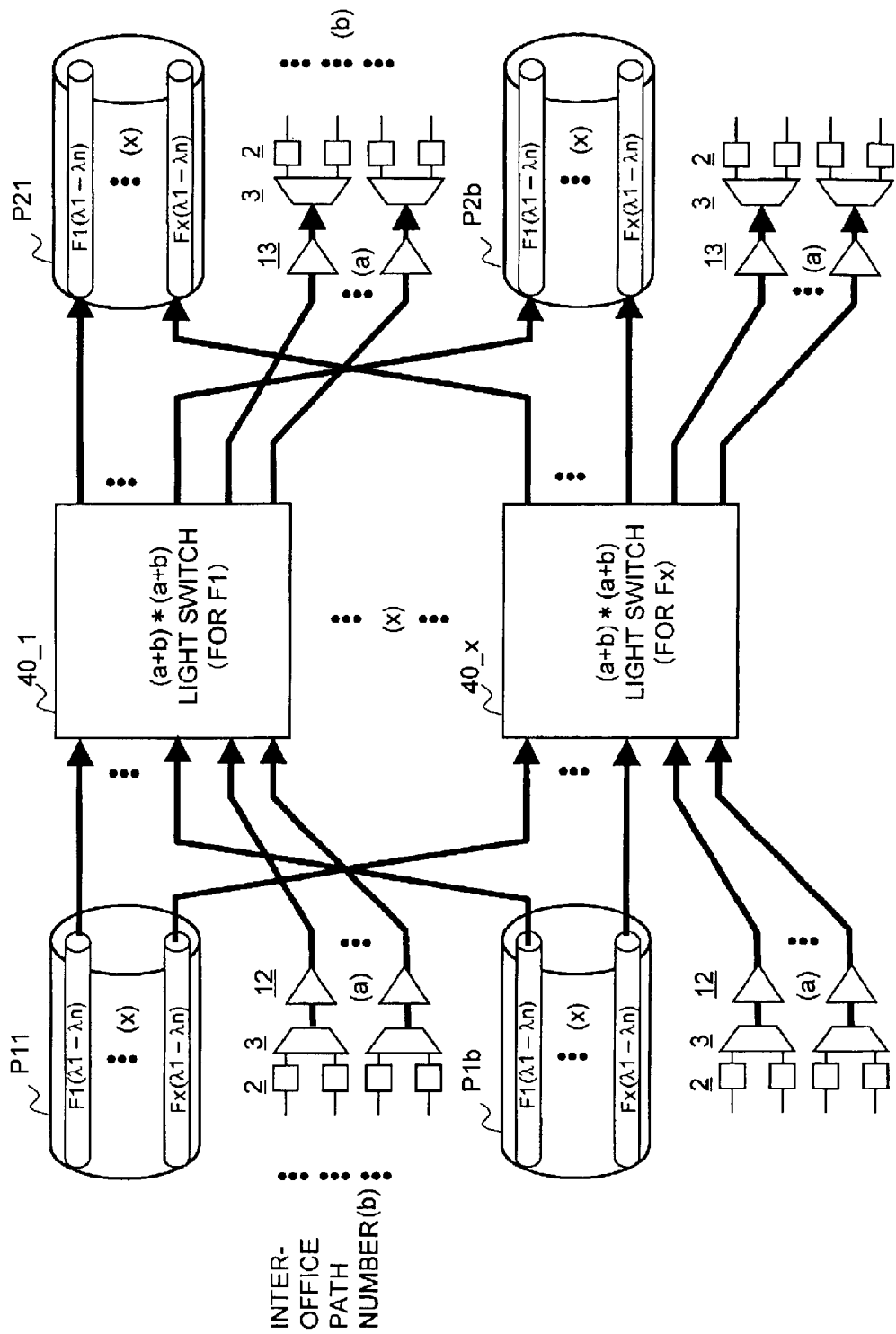
FIG. 8 is a block diagram showing a conceptual arrangement (6) of an optical cross-connect device according to the present invention.
Figure 28:
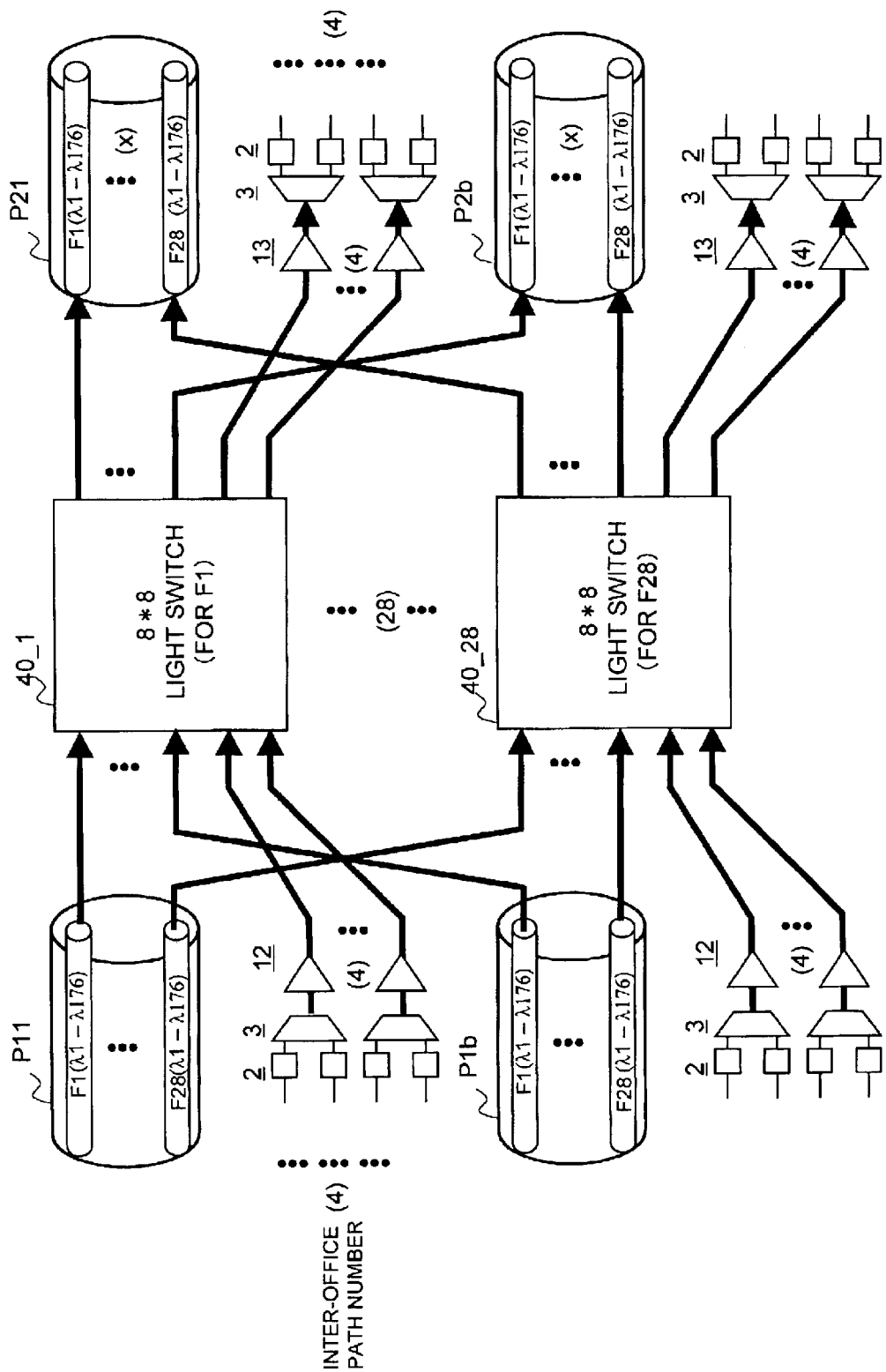
FIG. 28 is a block diagram showing an embodiment (6) of an optical cross-connect device according to the present invention.

FIG. 28 shows an embodiment (6) of the optical cross-connect device according to the present invention. This embodiment corresponds to the conceptual arrangement (6) of the optical cross-connect device shown in FIG. 8. In this embodiment, a fiber switching-type optical cross-connect device is comprised of 28 units of 8*8 light switches 40_1–40_28, where the number of inter-office paths (number of adjacent nodes) is "b"=4, the number of fibers to be accommodated in each path is "x"=28, and the number of office transmission lines to be connected to each path is "a"=4.

Figure 9:
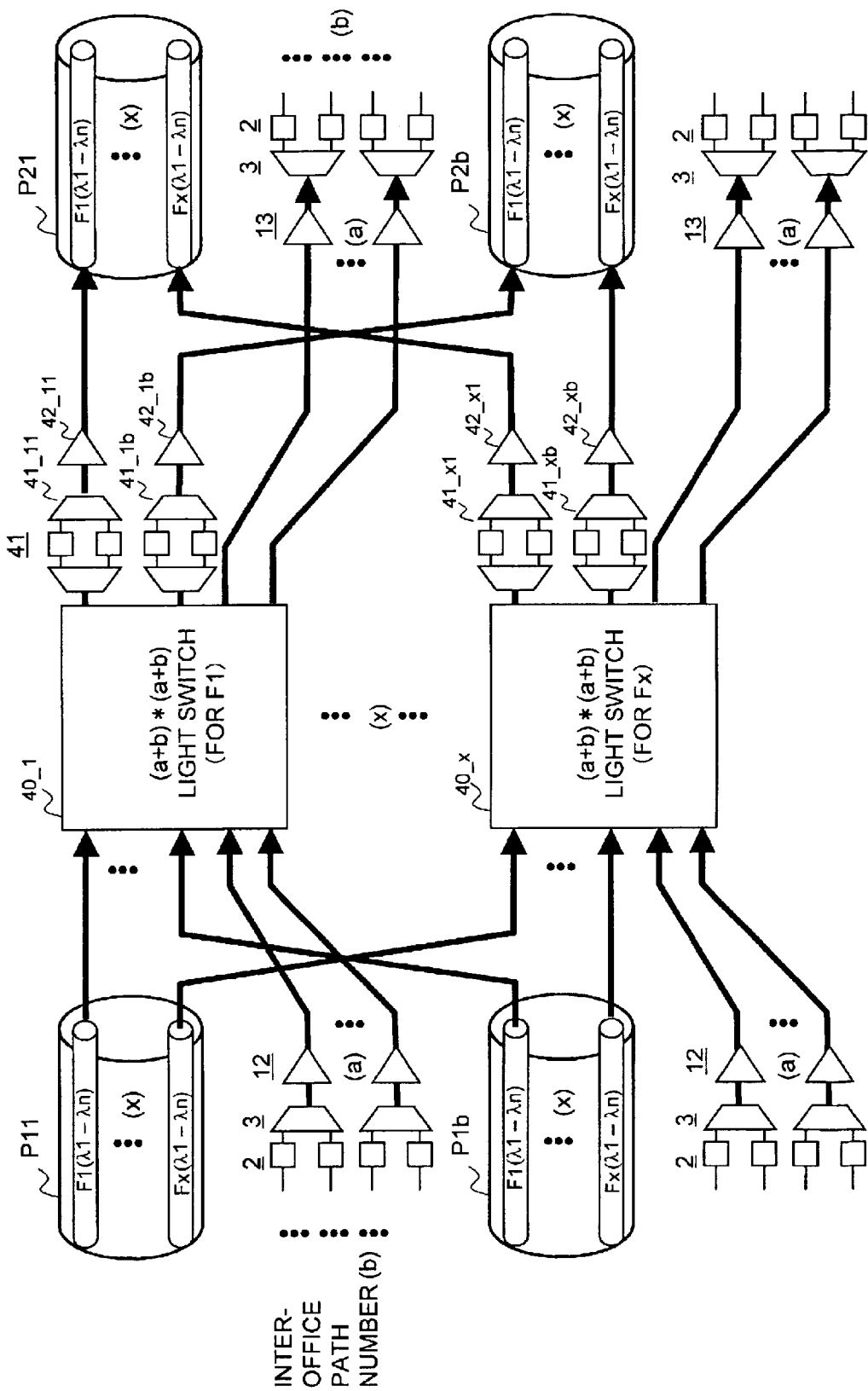
FIG. 9 is a block diagram showing a conceptual arrangement (7) of an optical cross-connect device according to the present invention.
Figure 29:
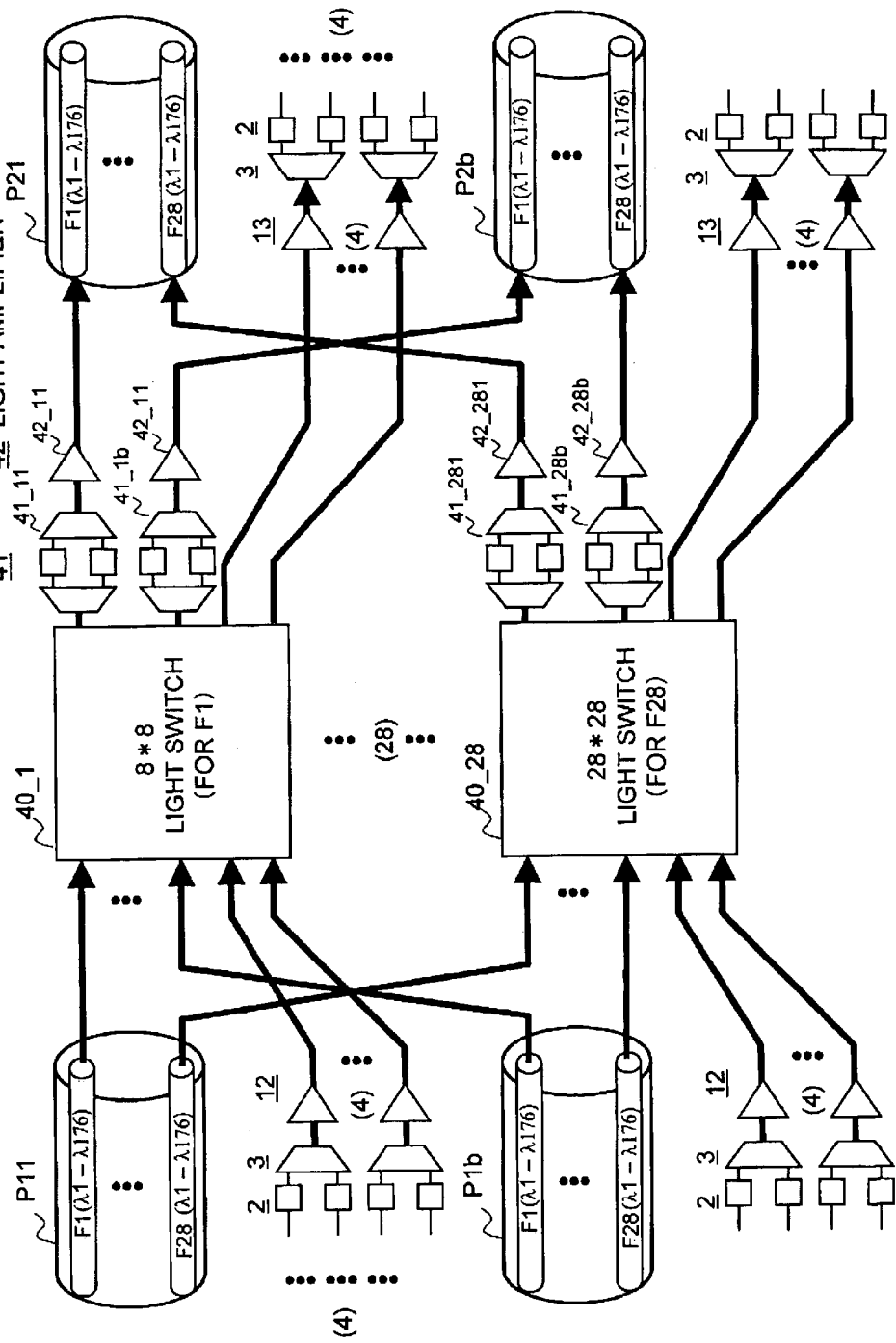
FIG. 29 is a block diagram showing an embodiment (7) of an optical cross-connect device according to the present invention.

FIG. 29 shows an embodiment (7) of the optical cross-connect device according to the present invention. This embodiment corresponds to the conceptual arrangement (7) of the optical cross-connect device shown in FIG. 9. In this embodiment, a fiber switching-type optical cross-connect device is composed of the reproducing portion 41, which includes 112 units of wave multiplexer/demultiplexers and 19712 units of reproducers shown in FIG. 9, 112 units of light amplifiers 42, and 28 units of 8*8 light switches, in addition to the arrangement shown in FIG. 28.

Figure 10:
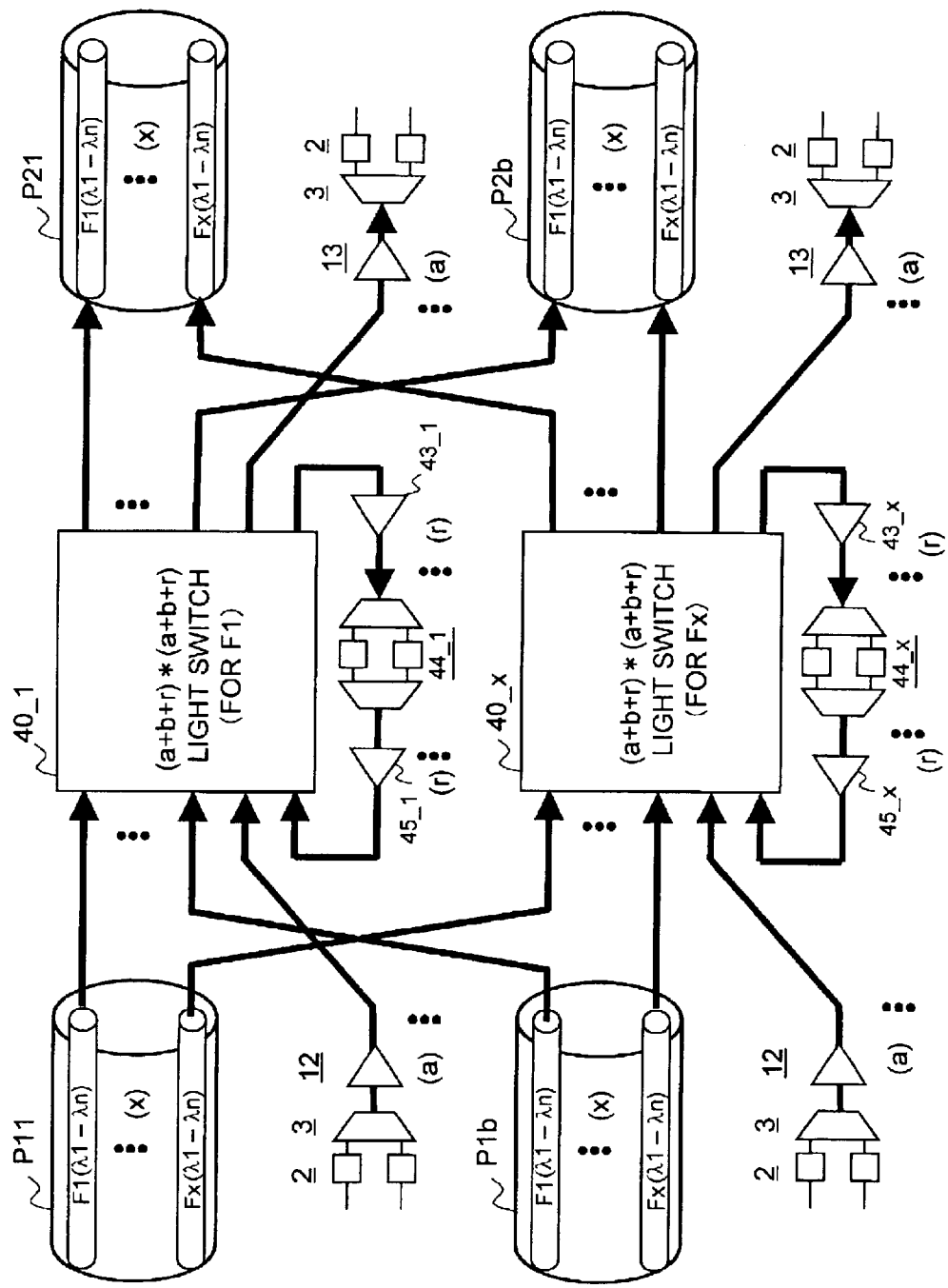
FIG. 10 is a block diagram showing a conceptual arrangement (8) of an optical cross-connect device according to the present invention.
Figure 30:
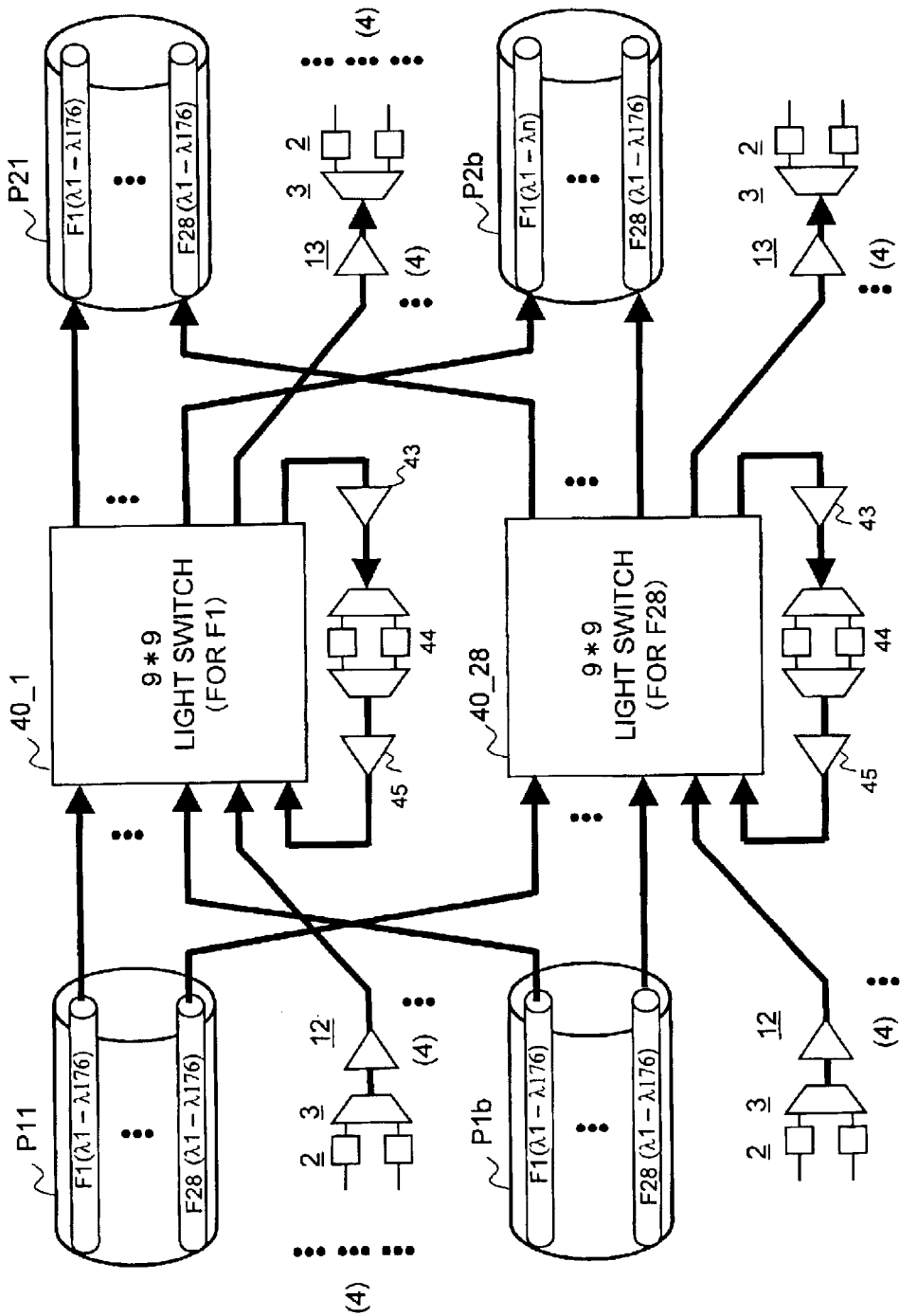
FIG. 30 is a block diagram showing an embodiment (8) of an optical cross-connect device according to the present invention.

FIG. 30 shows an embodiment (8) of the optical cross-connect device according to the present invention. This embodiment corresponds to the conceptual arrangement (8) of the optical cross-connect device shown in FIG. 10. In this embodiment, assuming "a"=4, "b"=4, and "r"=1 in FIG. 10, the light signal reproducing means composed of 28 units of 9*9 light switches 40_1–40_28, 14 units of wavelength multiplexer/demultiplexers, 28 light amplifiers, and 2464 reproducers are used in the routing path, thereby composing a fiber switching-type optical cross-connect device.

Figure 11:
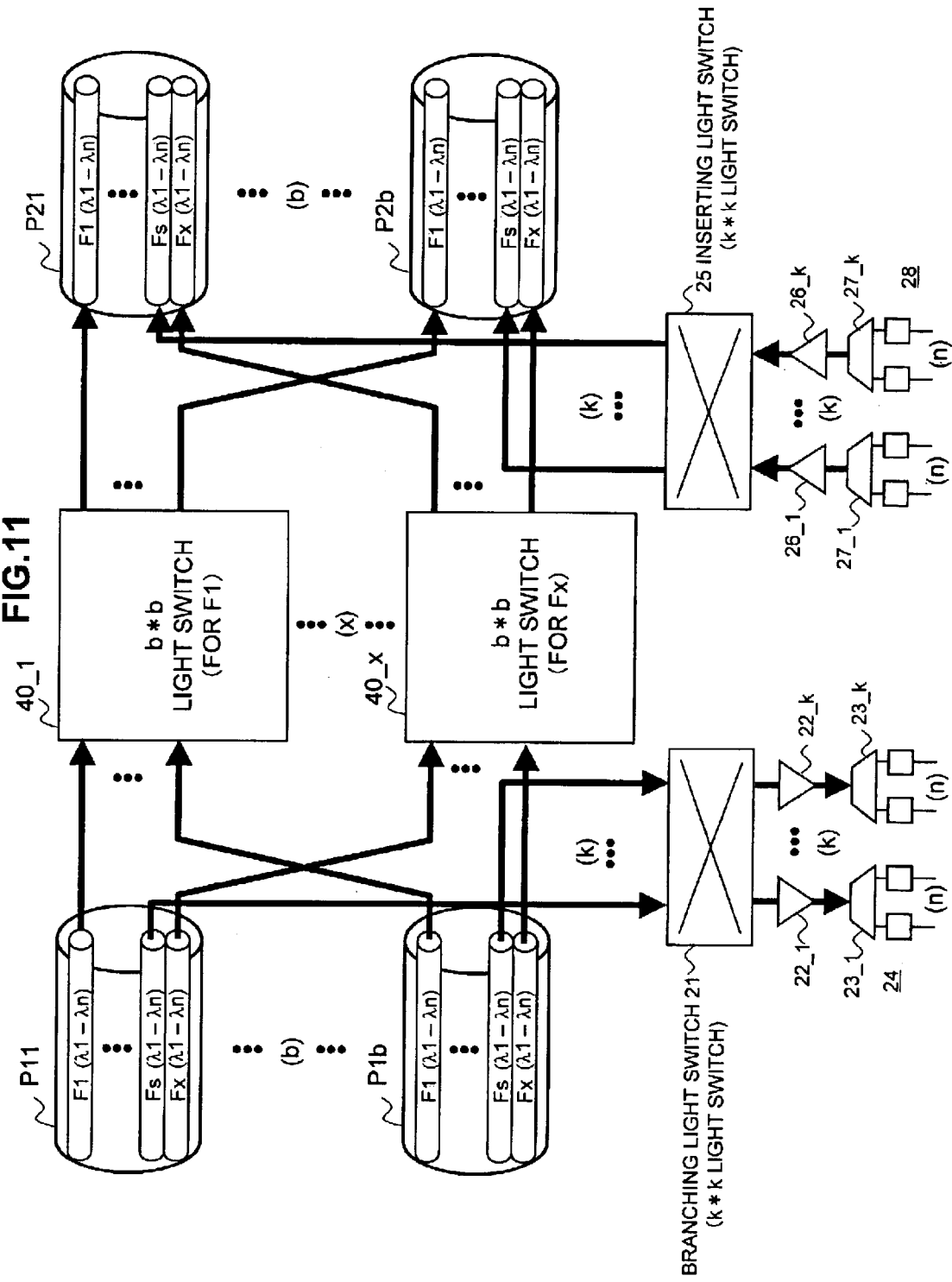
FIG. 11 is a block diagram showing a conceptual arrangement (9) of an optical cross-connect device according to the present invention.
Figure 31:
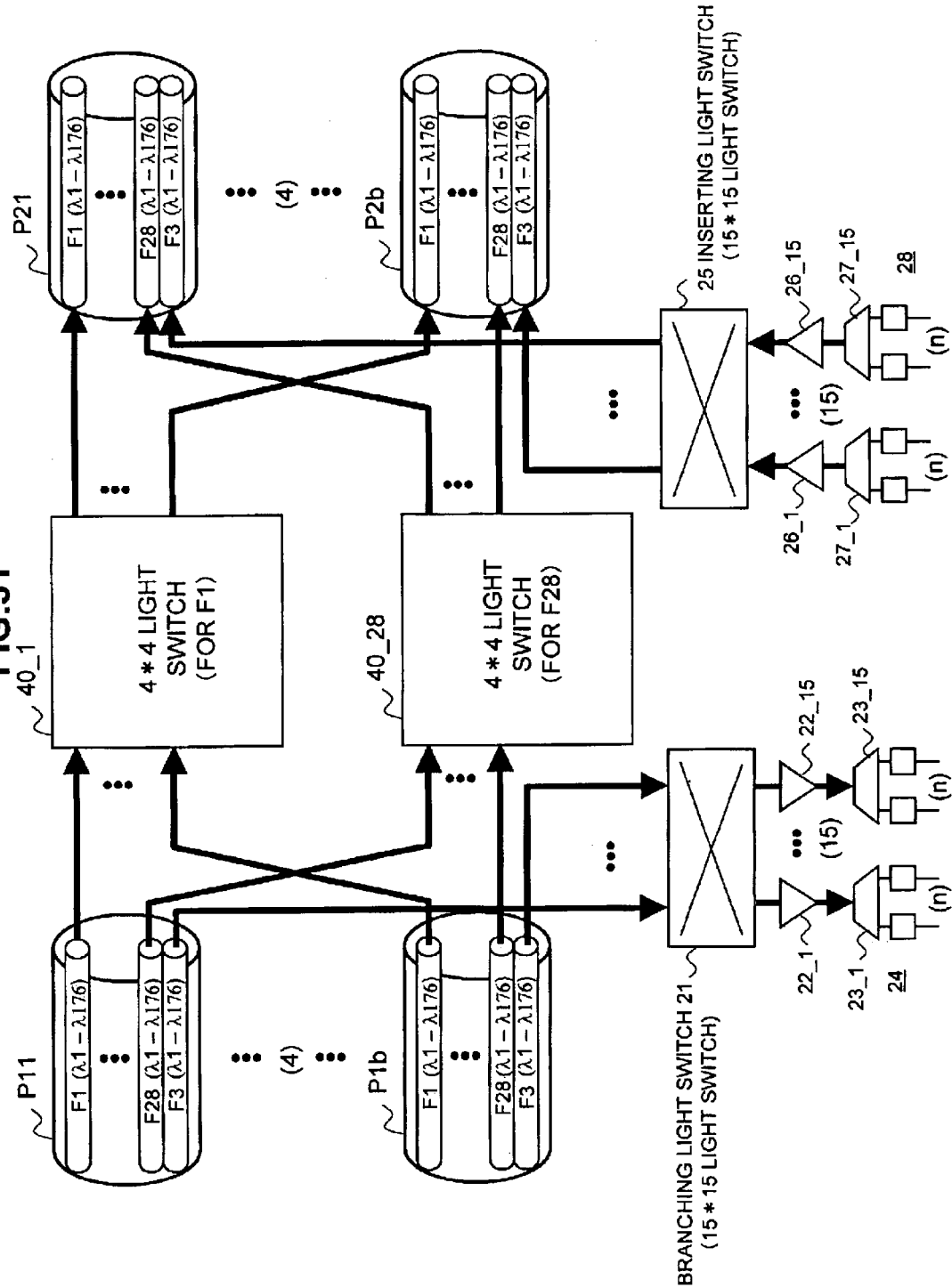
FIG. 31 is a block diagram showing an embodiment (9) of an optical cross-connect device according to the present invention.

FIG. 31 is an embodiment (9) of the optical cross-connect device according to the present invention. This embodiment corresponds to the conceptual arrangement (9) of the optical cross-connect device shown in FIG. 11. In this embodiment, assuming "b"=4, "x"=28, and "k"=15 in FIG. 11, 28 units of the 4*4 light switches 40_1–40_28, and 2 units of the 15*15 light switches 21 and 25 for insertion/branching purposes are used, thereby composing a fiber switching-type optical cross-connect device.

Figure 12:
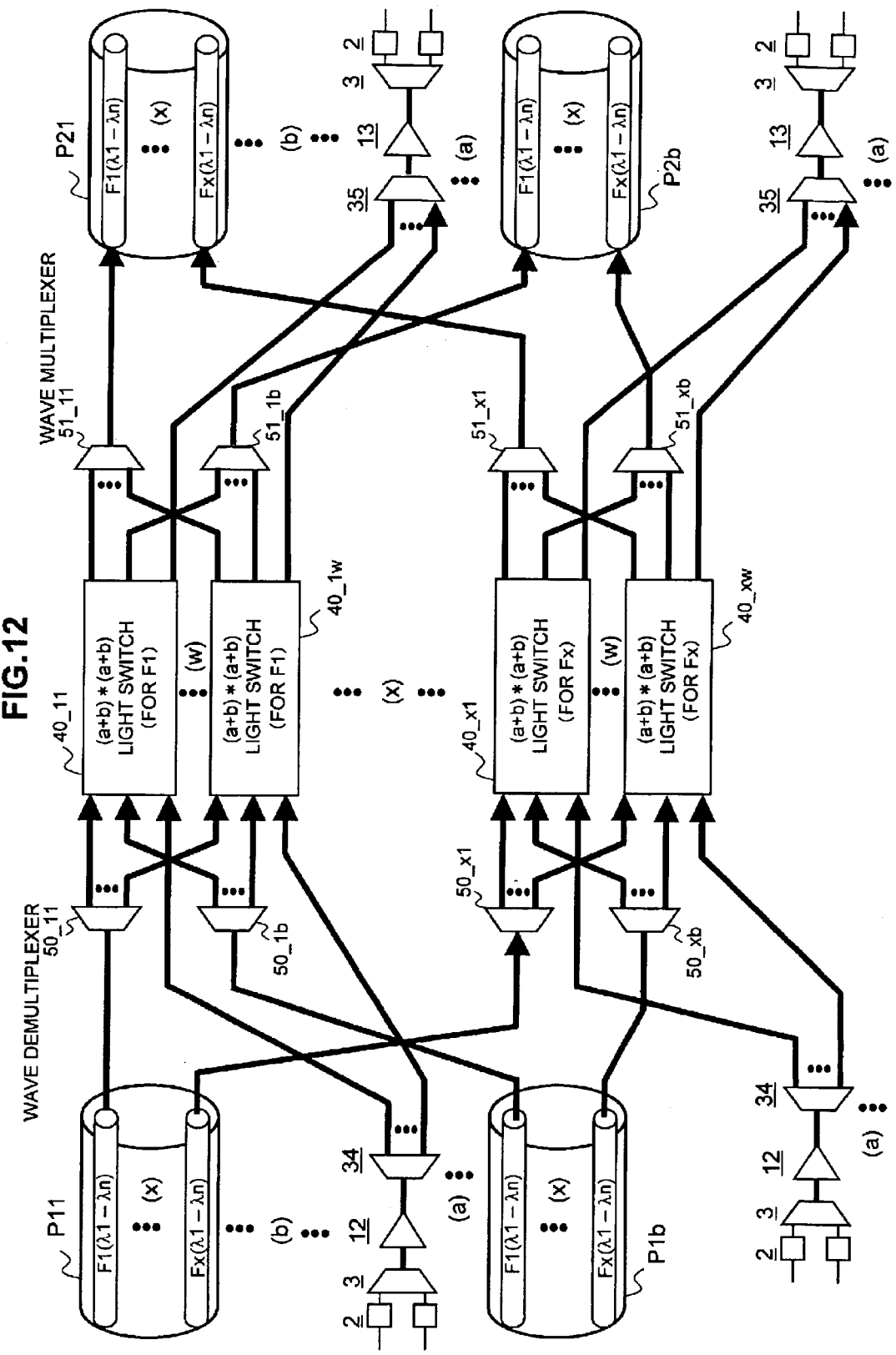
FIG. 12 is a block diagram showing a conceptual arrangement (10) of an optical cross-connect device according to the present invention.
Figure 32:
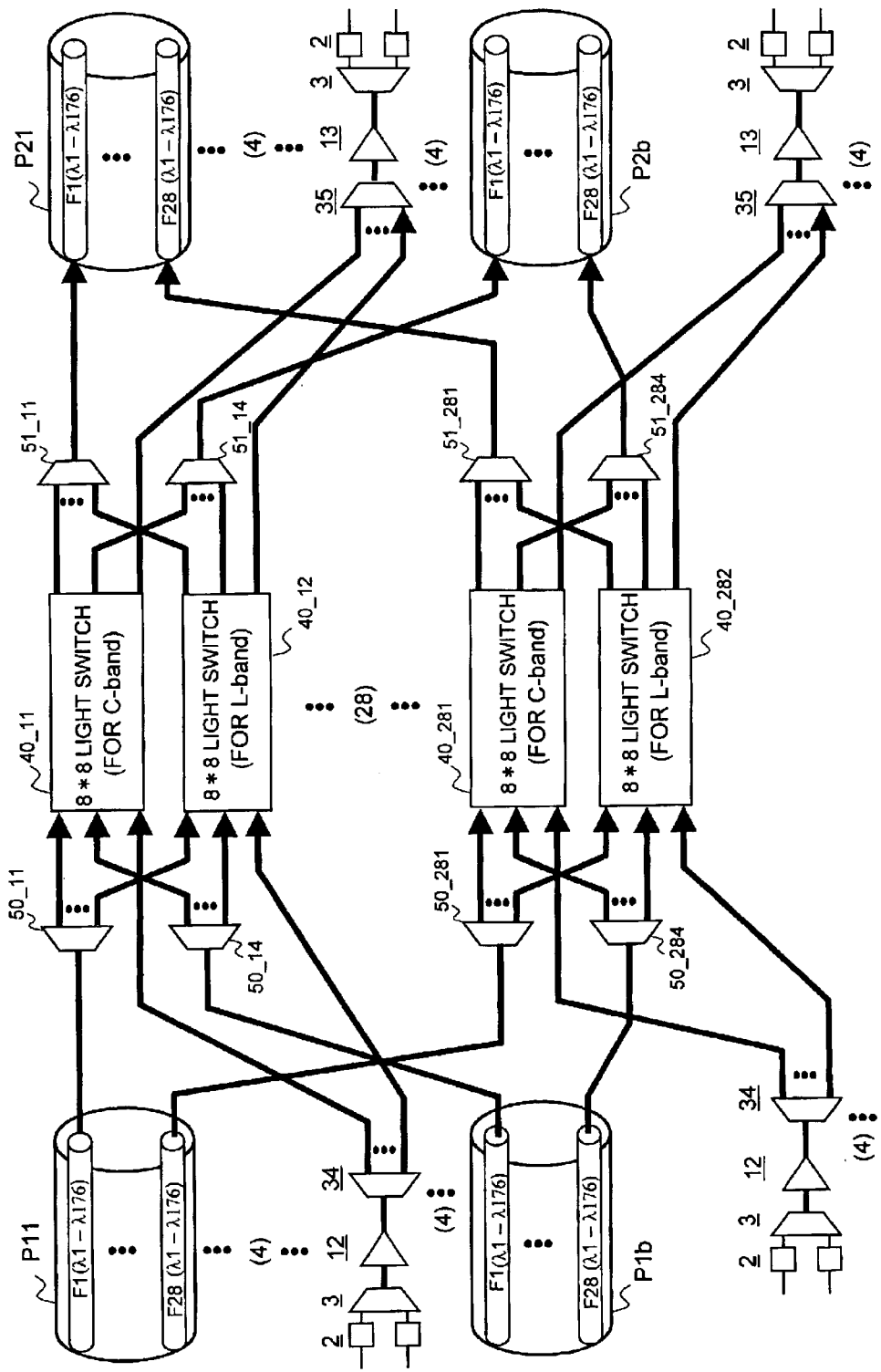
FIG. 32 is a block diagram showing an embodiment (10) of an optical cross-connect device according to the present invention.

FIG. 32 is an embodiment (10) of the optical cross-connect device according to the present invention. This embodiment corresponds to the conceptual arrangement (10) of the optical cross-connect device shown in FIG. 12. In this embodiment, assuming "a"=4, "b"=4, and "x"=28 in FIG. 12, 28 units of the light switches 40_11–40_281 for the 8*8 C-band, 28 units of the light switches 40_12–40_282 for the 8*8 L-band, and 112 units of the C-band and the L-band wave multiplexer/demultiplexers 50 and 51 are used, thereby composing a fiber switching-type optical cross-connect device.

Figure 33:
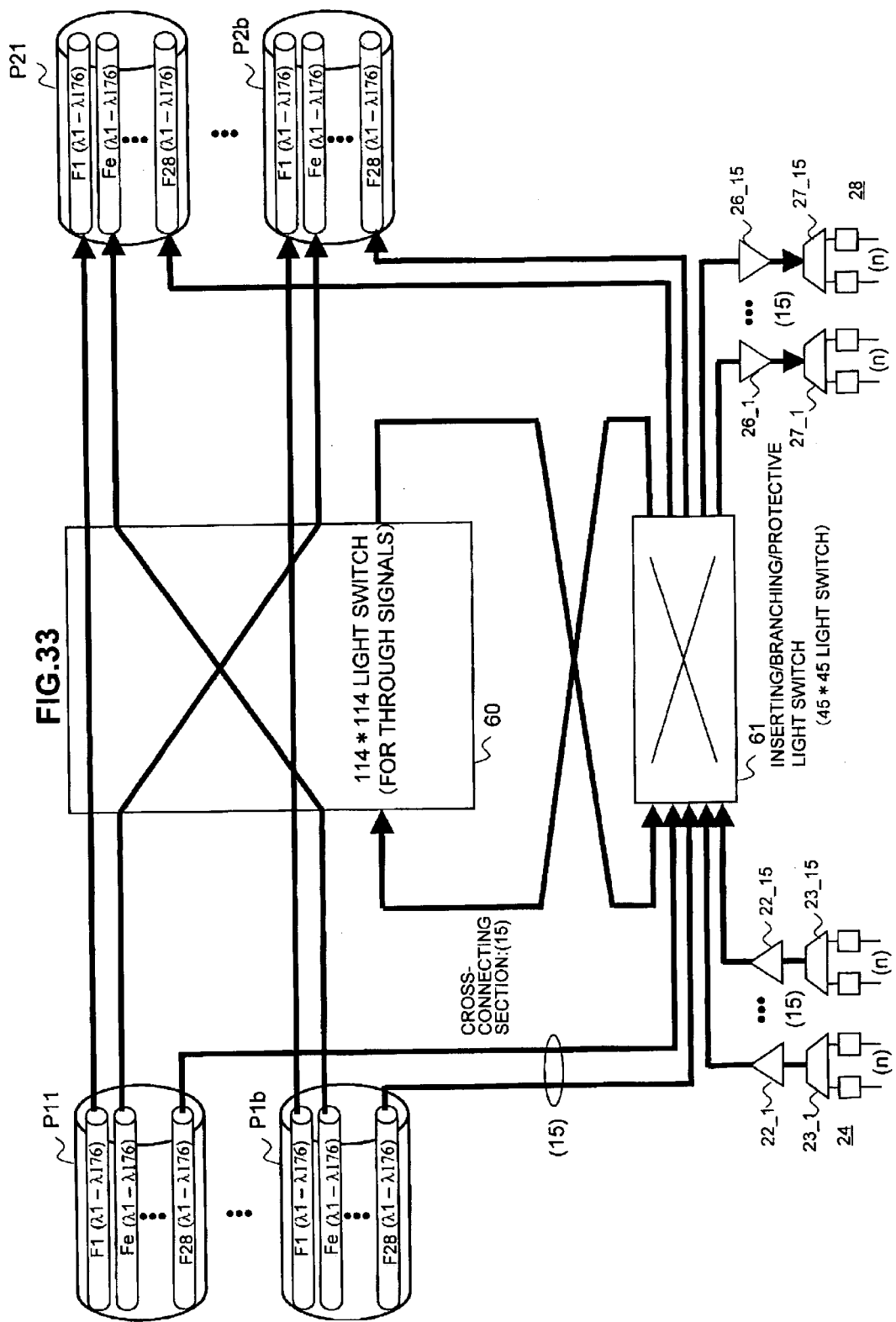
FIG. 33 is a block diagram showing an embodiment (11) of an optical cross-connect device according to the present invention.

FIG. 33 is an embodiment (11) of the optical cross-connect device according to the present invention. This embodiment corresponds to the conceptual arrangement (11) of the optical cross-connect device shown in FIG. 13. In this embodiment, assuming "L"=114, "k"=15, and "p"=15, the 114*114 light switch 60 for through light signals, and the 45*45 light switch 61 for insertion/branching/protective are used, thereby composing the fiber switching-type optical cross-connect device enabling a fiber switching-type fault recovery.

Figure 34B:
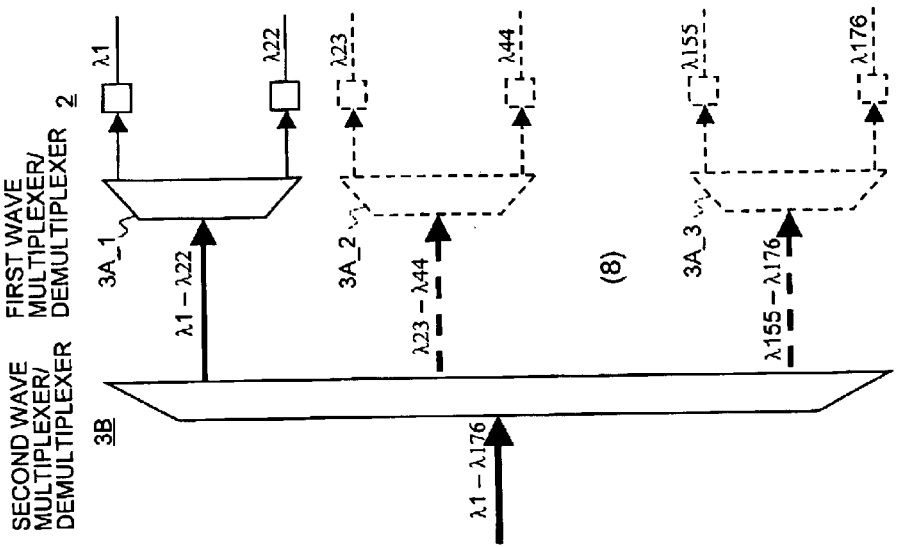
FIGS. 34A and 34B are block diagrams showing an embodiment of the wave multiplexer/demultiplexer used for the present invention.
Figure 34A:
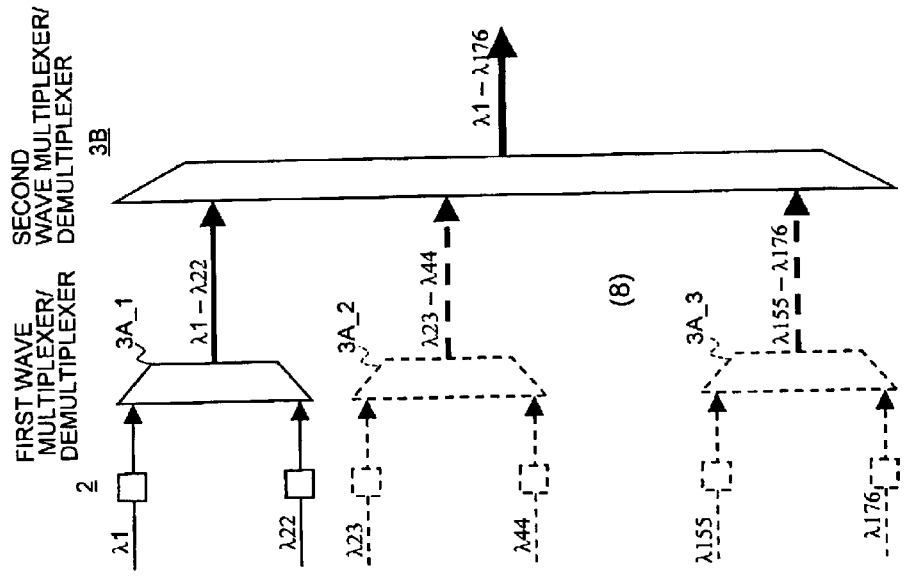

FIGS. 34A and 34B show an embodiment of the wave multiplexer/demultiplexer shown in FIGS. 14A and 14B. In this embodiment, for the wave multiplexer/demultiplexer to multiplex/demultiplex at the intra-office device side, the first wave multiplexer/demultiplexer 3A is provided to multiplex each wave into 22 waves or to demultiplex the 22 waves into each wave, and the second wave multiplexer/demultiplexer 3B for multiplexing/demultiplexing by 22 waves in advance is used.

FIG. 35 shows an embodiment (12) corresponding to the conceptual arrangement (12) shown in FIG. 15. In this embodiment, the light switch 10 receives 91 threads of light input signal in total, i.e. 76 threads of light signal from working optical fibers F1–Fx in the paths P11–P1*b* and 15 light insertion signals from the light amplifiers 12_1–12_15 composing the light amplifier 12.

On the output side of the light switch 10, 91 threads of light output signal are divided into 76 threads of light signal outputted to the working optical fibers F1–Fx in the paths P21–P2*b* on the output side and 15 threads of light signal to the light amplifiers 13_1–13_15 composing the light amplifier 13. Accordingly, the light switch is a 91*91 light switch.

Also, the protective-signal light switch 100 inputs, on the input side, 53 threads of light signal in total, i.e. 38 threads of light signal of the protective optical fibers Fx+1–Fy in the paths P11–P1*b* and 15 threads of light insertion signal from the light amplifiers 12_1–12_15.

Similarly, on the output side of the light switch 100, 53 threads of light output signal are divided into 38 threads of light signal in total outputted to protective optical fibers Fx+1–Fy in the paths P21–P2*b* and 15 threads of light branch signal to the light amplifiers 13_1–13_15. Accordingly, the protective-signal light switch 100 is a 53*53 light switch.

As a result, when a fault occurs in the example of FIG. 35, the light output signal of the protective optical fiber Fy in the path P11 is transmitted to the light amplifier 13_1 as a light branch signal by the routing operation of the light switch 100. The light insertion signal from the light amplifier 12_15 is transmitted to the protective optical fiber Fy in the path P21, thereby enabling a connection which avoids the fault.

FIG. 36 shows an embodiment (13) of the optical cross-connect device according to the present invention corresponding to the conceptual arrangement (13) shown in FIG. 16.

This embodiment is different from the embodiment (12) in FIG. 35 in that 15 threads of light output signal are provided from the light switch 20 to the protective-signal light switch 200, 15 threads of light output signal from the protective-signal switch 200 are provided to the light switch 20, and the light insertion signals from the light amplifier 12 and the light branch signals to the light amplifier 13 are respectively inputted/outputted to/from the light switch 200.

Accordingly, the light switch 20 is a 76+15+15=106*106 working-signal light switch, and the protective-signal light switch 200 is a 38+15=53*53 protective-signal light switch.

In the embodiment (13), the operation during a fault is performed through the light switch 200. Namely, in the example of FIG. 36, the light insertion signal from the light amplifier 12_15 is provided to the light switch 200 through the light switch 20, and is further provided from this light switch 200 to the protective optical fiber Fx+1 in the path P21.

Also, the light output signal of the protective optical fiber Fx+1 in the path P11 is provided to the light switch 20 through the light switch 200, and is transmitted to the light amplifier 13_1 as a light branch signal based on the routing operation (also based on the control of the optical network management device). The other connection route of the signals at the light switch 20 is the same as that of the normal operation.

Figure 37:
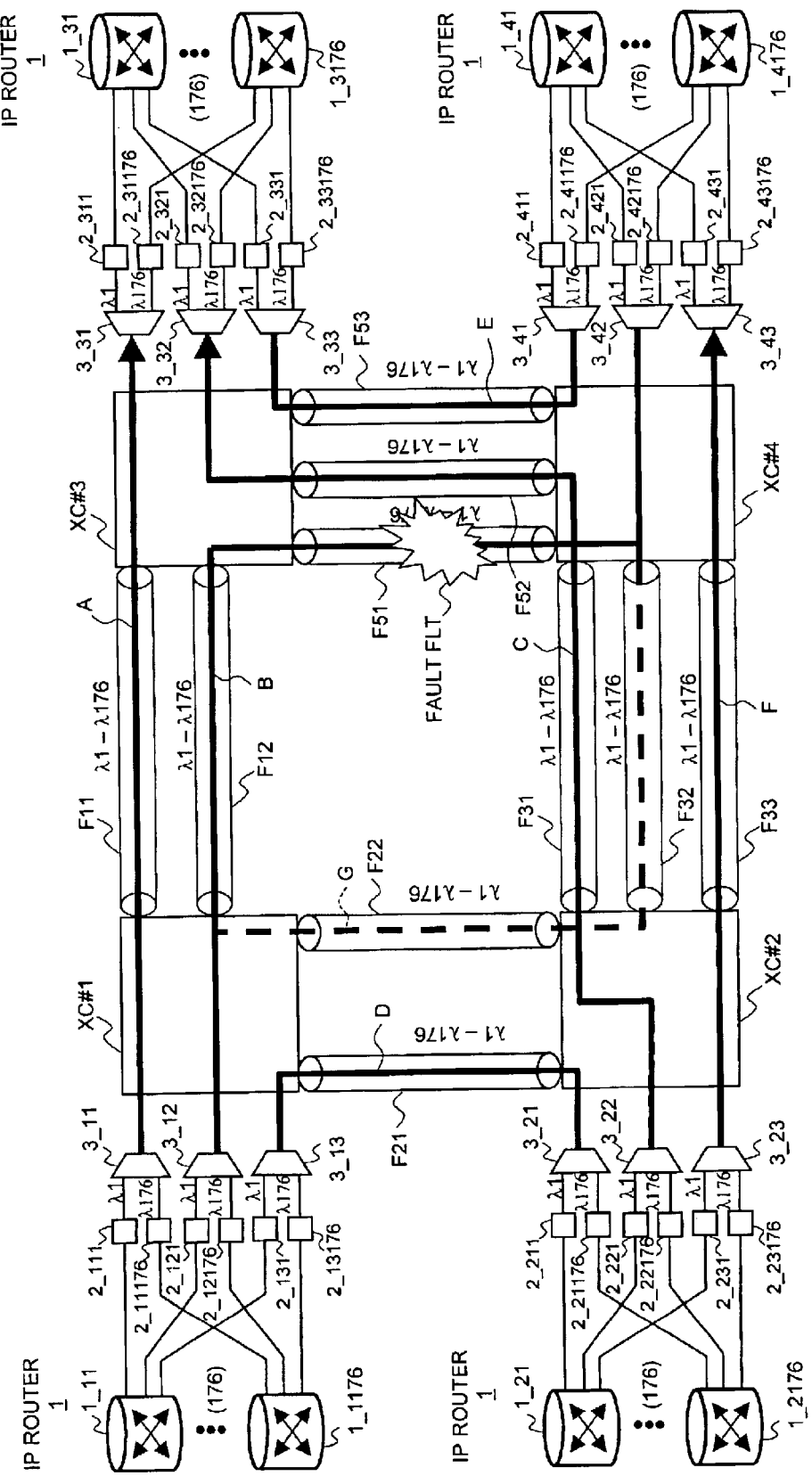
FIG. 37 is a block diagram showing the operation example (4 nodes) for fault recovery of an optical network according to the present invention.

FIG. 37 shows an embodiment when the wavelength multiplexed light signals where n=176 are transmitted in the optical fibers F11–F53 respectively in FIG. 17. This is an example when a transmission line fault FLT occurs to the lights signals to be routed from the optical cross-connect device XC#1 to the optical cross-connect device XC#4, and fault is recovered by using a protective transmission line on another route.

Figure 38A:
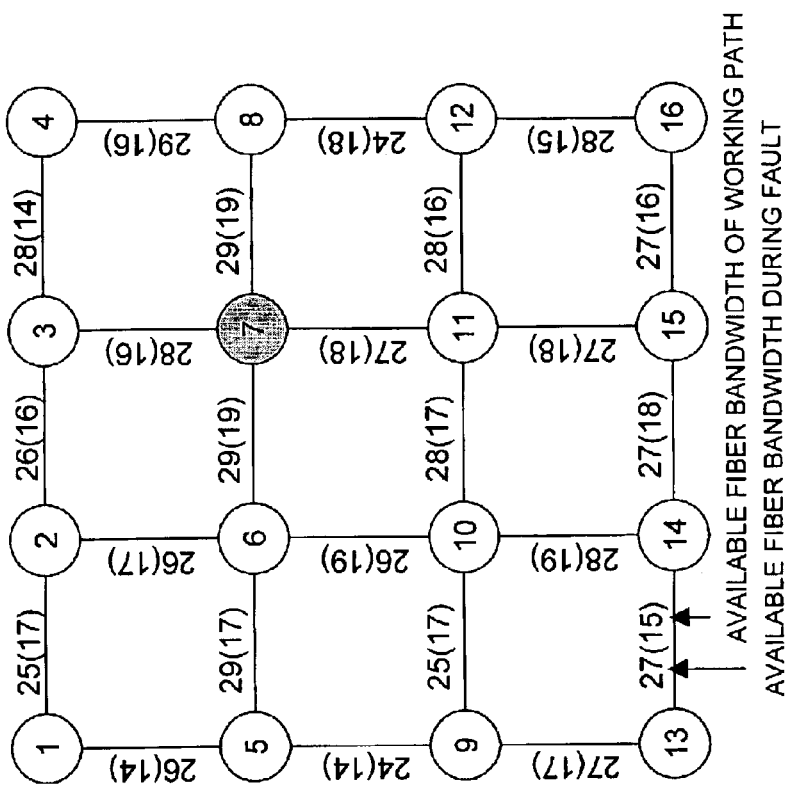
FIGS. 38A and 38B are diagrams showing an evaluation example of the number of required fibers in an optical network according to the present invention.
Figure 38B:
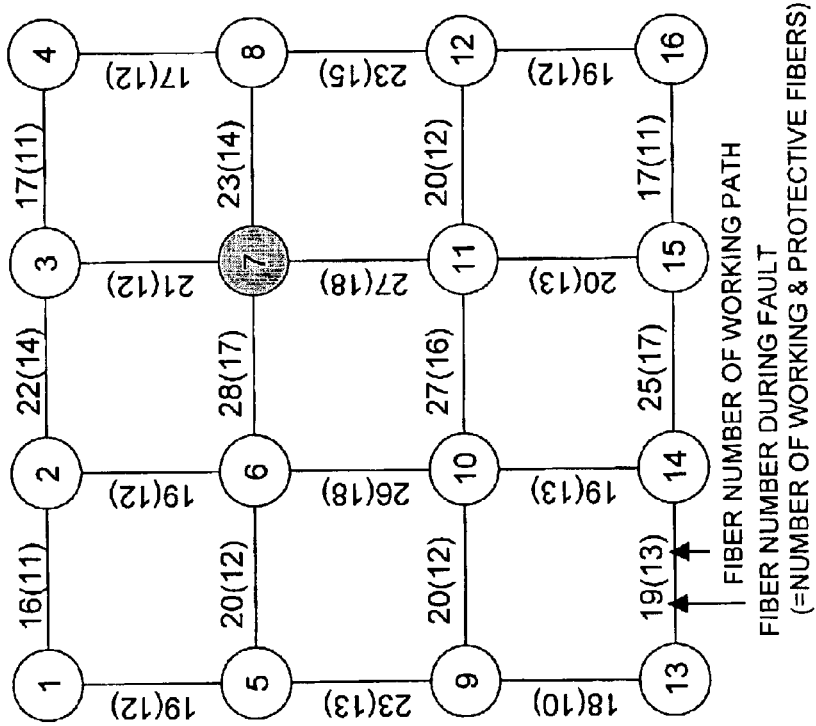
Figure 40:
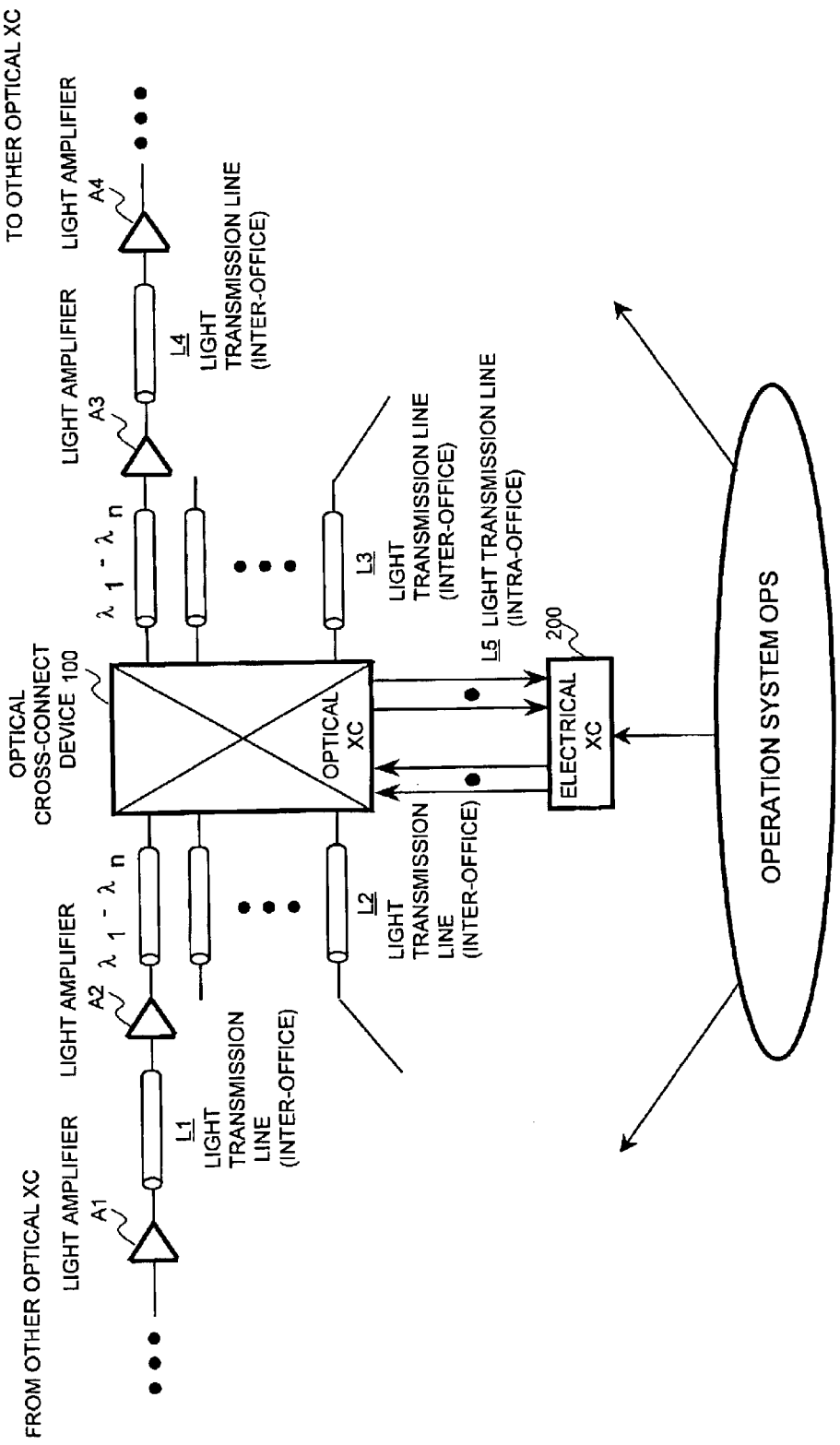
FIG. 40 is a block diagram showing an arrangement of a general optical network.
Figure 41:
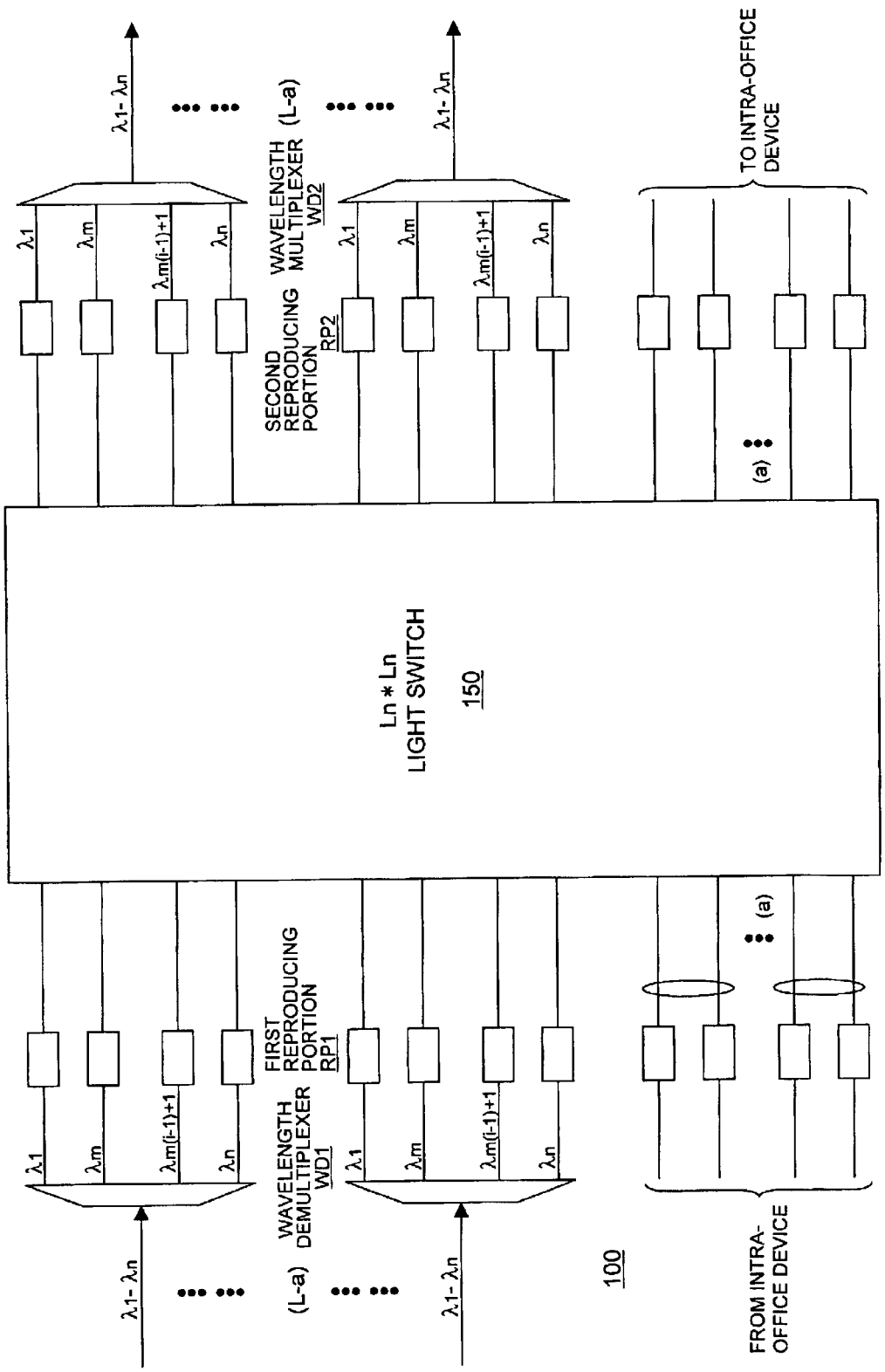
FIG. 41 is a block diagram showing a prior art wavelength switching-type optical cross-connect device.
Figure 42:
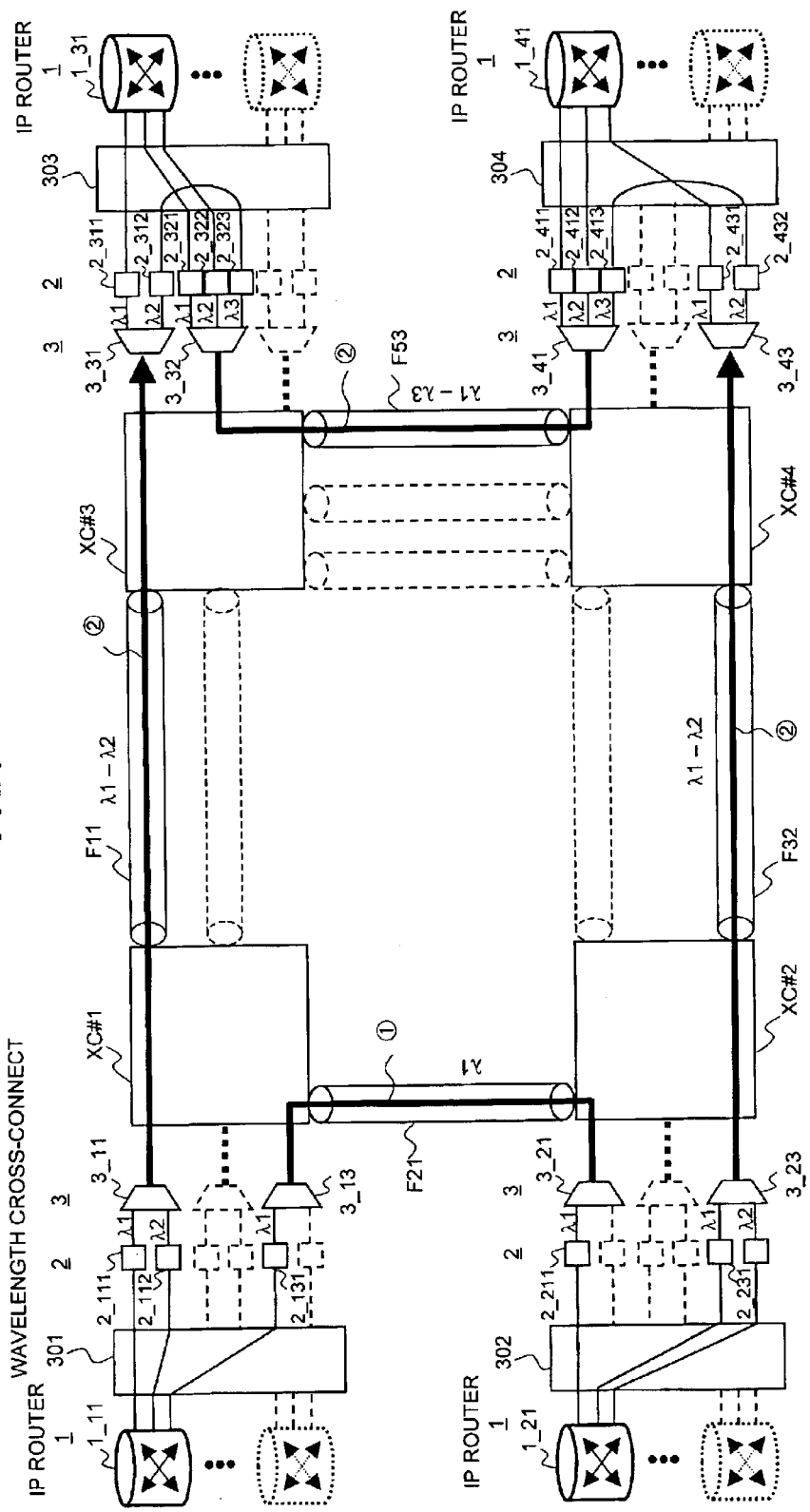
FIG. 42 is a block diagram showing an arrangement of a prior art optical network.
Figure 43:
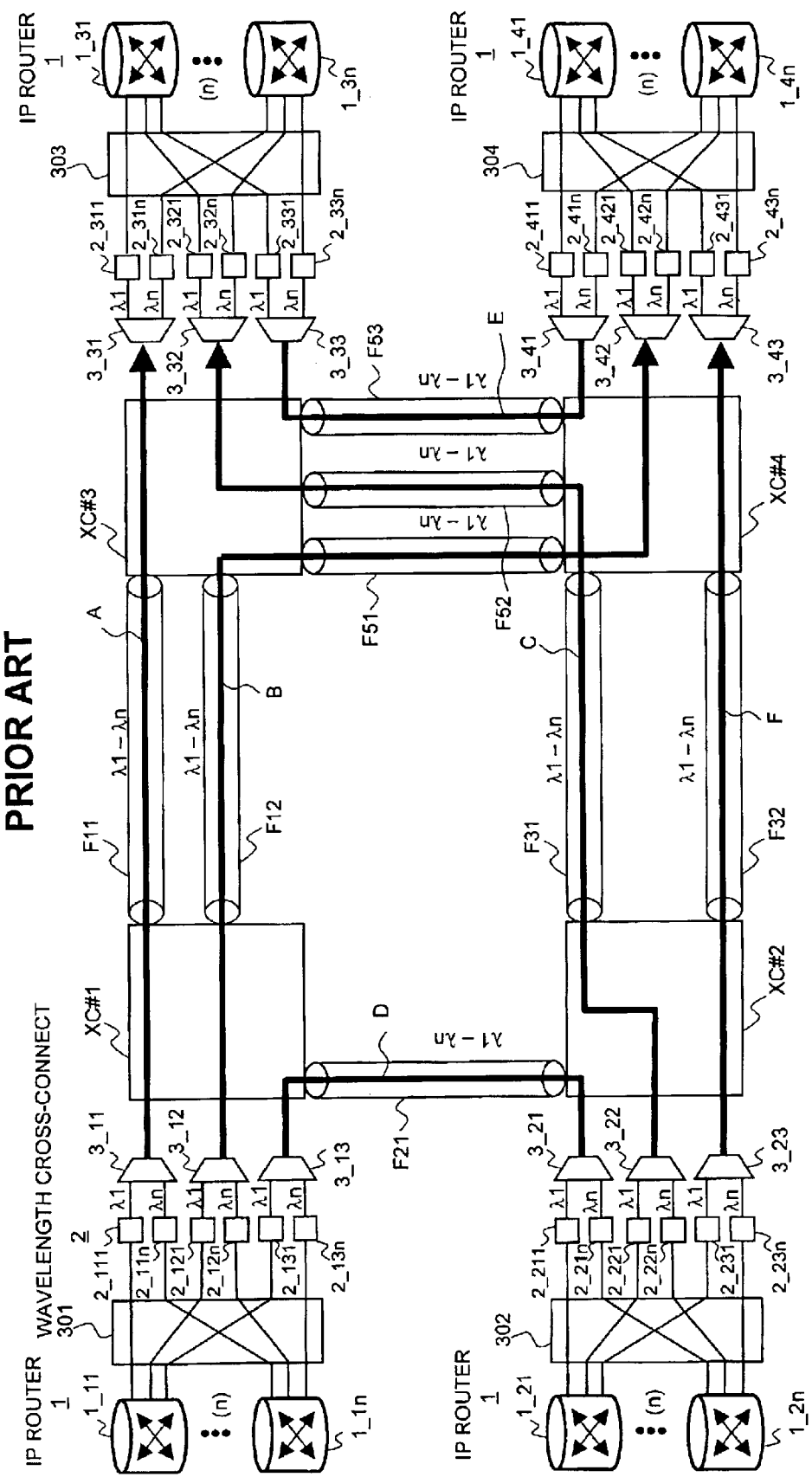
FIG. 43 is a block diagram showing an operation example of a prior art optical network (for expanded traffic)

FIGS. 38A and 38B show an example when the number of required fibers are evaluated for the example of the fault recovery operation of the optical network in FIG. 37. FIG. 38A shows an evaluation example of the number of required fibers when a non-blocking type light switch, shown in FIG. 3, is used, and FIG. 38B shows the case when a path switching-type, used in FIG. 8 for example, is used.

In this example, the number of optical cross-connect devices (nodes) is set to 16, and the number of required fibers is determined according to a known optimum path search algorithm.

In the case of the example (of 4 nodes) in FIG. 19, the numbers of optical fibers between each optical cross-connect device are 1, 2, 2, and 3, or a total of 8 pieces of fiber in a normal case as described above. When a fault occurs, the number of optical fibers are 2, 2, 3, and 3, or a total of 10 pieces of fiber. FIGS. 38A and 38B are the case when this example is applied to 16 optical cross-connect devices.

Figure 44:
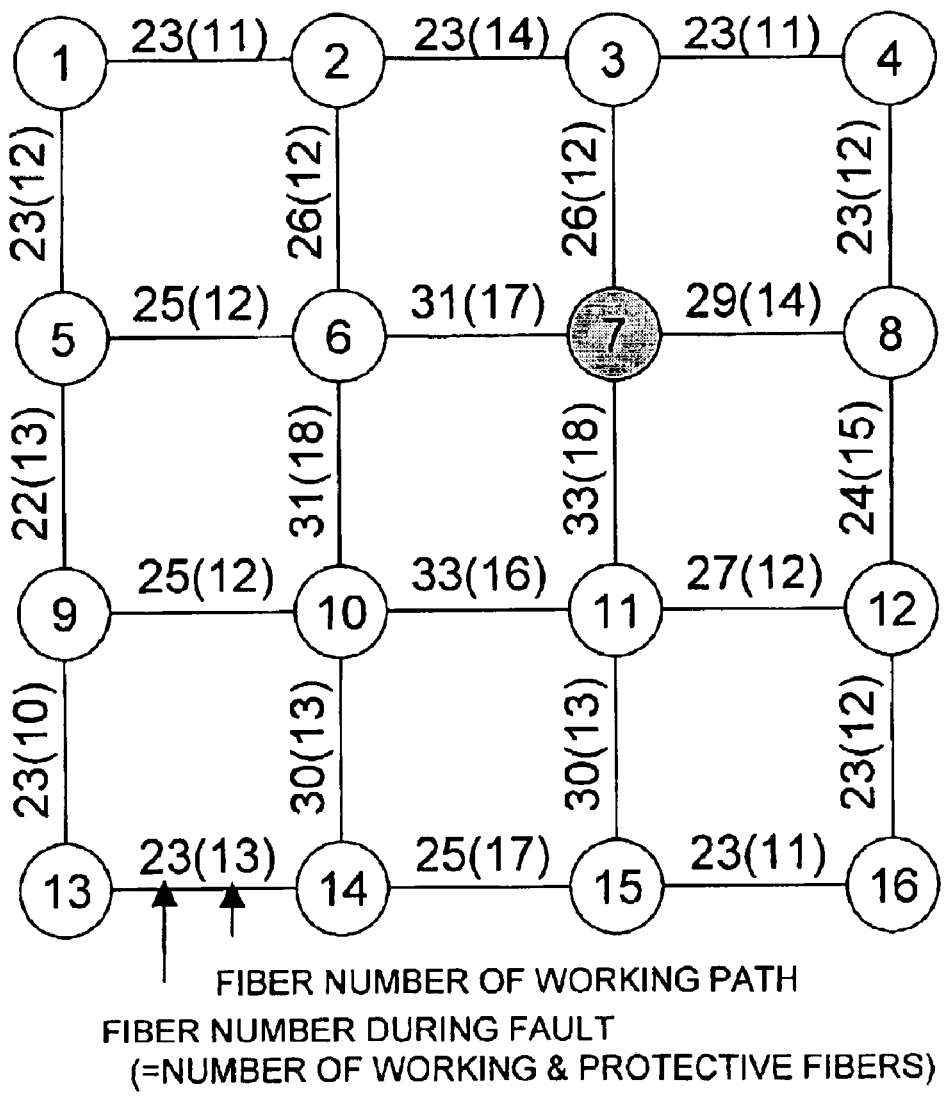
FIG. 44 is a diagram showing an evaluation example (16 nodes) of the number of required fibers according to a prior art.

As the comparison with the evaluation example of the number of required fibers evaluated for a conventional case in FIG. 44 shows, the number of fibers in use and protection (shown in ( )) has decreased considerably in the present invention.

As described above, an optical cross-connect device and an optical network according to the present invention comprises: a combination of any two of "a" units of wave multiplexers for multiplexing "n" waves of light signals directly received from an intra-office device to be transferred to a same destination, "L–a" threads of transmission lines each for transmitting an n-wave-multiplexed light signal, and "a" units of wave demultiplexers for demultiplexing the n-wave-multiplexed light signals bound for the same destination; and an L*L light switch for selecting the combination for transmitting the light signals to the same destination. Therefore, effects shown in FIG. 39 are achieved.

In other words, FIG. 39 shows a switch size of a light switch required for the prior art and the present invention when the optical network is constructed with 16 nodes, as shown in FIGS. 38A and 38B. In the case of a prior art wavelength switching-type optical cross-connect device (wavelength XC), a 13376*13376 light switch was required, or a 2640*2640 light switch was required even if a wavelength switching-type and fiber switching-type cross-connect devices are combined, while in the case of the present invention, a flexible optical network can be constructed merely by using a 76*76 light switch.

Also, in the optical cross-connect device according to the present invention, a protective light transmission line is provided, and a protective-signal light switch is provided for selecting a combination of any two of the protective transmission line, the wave multiplexer, and the demultiplexer, thereby improving a fault avoidance degree when a fault of an optical fiber occurs, compared with the case where only working optical fibers exist.

In this way, according to the present invention, light signals bound for the same destination are collectively accommodated and an optical network is constructed by fiber switching-type optical cross-connect devices, for the purposes of downsizing light switches, thereby greatly contributing to performance improvements of the optical transfer system.

What we claim is:

1. An optical cross-connect device conspiring:

a combination of any two of "a" units of wave multiplexers for multiplexing "n" waves of light signals directly received from an intra-office device to be transferred to a same destination, "L–a" threads of transmission lines each for transmitting an n-wave-multiplexed light signal, and "a" units of wave demultiplexers for demultiplexing the n-wave-multiplexed light signals bound for the same destination; and an L*L light switch for selecting the combination for transmitting the light signals to the same destination.

2. The optical cross-connect device as claimed in claim 1 wherein the combination includes the combination of the transmission lines.

3. The optical cross-connect device as claimed in claim 2, further comprising a routing path for reproducing light signals in the light switch, the routing path being connected to only a transmission line requiring a light signal reproduction, among input side transmission lines and output side transmission lines of the light switch.

4. The optical cross-connect device as claimed in claim 3 wherein supposing that a wavelength band demultiplexed is "w", "w*x" units of light switches are provided, a number of paths connecting to another office or another node accommodating the transmission lines is "b" and a number of the wave multiplexers is "a", a number is assigned to a transmission line of each path, and the transmission lines with a same number are branched and routed to "w*x" units of (a+b)*(a+b) light switches.

5. The optical cross-connect device as claimed in claim 3 wherein the light switch comprises a (L–k+p)*(L–k+p) light switch, and the device further comprises:

"k+p" (where "p" indicates a number of protective transmission lines) threads of transmission lines connected from the input side transmission line of the light switch to an intra-office device, "k" threads of transmission lines connected from an intra-office device to another office, and a (2k+p)*(2k+p) light switch for accommodating "p" threads of cross-connection transmission lines for connecting the protective transmission lines to the inter-office device, and the (L–k+p)*(L–k+p) light switch routes light signals for connecting an inter-office input transmission line to an inter-office output transmission line and light signals for connecting the protective transmission line to the intra-office device.

6. The optical cross-connect device as claimed in claim 1 wherein the light switch comprises a non-blocking type for switching an arbitrary input side transmission line to an arbitrary output side transmission line.

7. The optical cross-connect device as claimed in claim 6 wherein "w" units of the light switches are provided for each wavelength band, and the device comprises:

a wave demultiplexer for demultiplexing input light signals bound for the same destination transferred from the transmission line into "n/w" waves to be inputted to the light switches; and a wave multiplexer for multiplexing output light signals bound for the same destination to be transferred from the light switches to the transmission line;

the respective "a" units of the wave demultiplexers and the wave multiplexers being distributively connected to the light switches.

8. The optical cross-connect device as claimed in claim 7 wherein the light switch comprises a (L−k+p)*(L−k+p) light switch, and the device further comprises:

"k+p" (where "p" indicates a number of protective transmission lines) threads of transmission lines connected from the input side transmission line of the light switch to an intra-office device, "k" threads of transmission lines connected from an intra-office device to another office, and a (2k+p)*(2k+p) light switch for accommodating "p" threads of cross-connection transmission lines for connecting the protective transmission lines to the intra-office device, and the (L−k+p)*(L−k+p) light switch routes light signals for connecting an inter-office input transmission line to an inter-office output transmission line and light signals for connecting the protective transmission line to the intra-office device.

9. The optical cross-connect device as claimed in claim 6 wherein supposing that the light switch is a first light switch a second light switch for branching a part of input light signals bound for the same destination respectively transferred from the transmission line as a substitute for the wave multiplexer and the wave demultiplexer, and a third light switch for inserting light signals into a part of output light signals bound for the same destination to be transferred to the transmission line are used, and the first light switch allows the input light signals bound for the same destination other than the branched light signals to pass therethrough as the output light signals.

10. The optical cross-connect device as claimed in 6 wherein the light switch comprises a (L−k+p)*(L−k+p) light switch, and the device further comprises:

"k+p" (where "p" indicates a number of protective transmission lines) threads of transmission lines connected from the input side transmission line of the light switch to an intra-office device, "k" threads of transmission lines connected from an intra-office device to another office, and a (2k+p)*(2k+p) light switch for accommodating "p" threads of cross-connection transmission lines for connecting the protective transmission lines to the intra-office device, and the (L−k+p)*(L−k+p) light switch routes light signals for connecting an inter-office input transmission Line to an inter-office output transmission line and light signals for connecting the protective transmission line to the intra-office device.

11. The optical cross-connect device as claimed in claim 1, further comprising means for reproducing light signals on an input side of the wave multiplexer, an output side of the wave demultiplexer, or between the light switch and at least one of an input side transmission line and an output side transmission line thereof.

12. The optical cross-connect device as claimed in claim 11 wherein the means for reproducing the light signals are composed of a series circuit of a wave demultiplexer, a reproducer, and a wave multiplexer.

13. The optical cross-connect device as claimed in claim 12 wherein supposing that the light switch is a first light switch, a second light switch for branching a part of input light signals bound for the same destination respectively transferred from the transmission line as a substitute for the wave multiplexer and the wave demultiplexer, and a third light switch for inserting light signals into a part of output light signals bound for the same destination to be transferred to the transmission line are used, and the first light switch allows the input light signals bound for the same destination other than the branched light signals to pass therethrough as the output light signals.

14. The optical cross-connect device as claimed in claim 11 wherein supposing that the light switch is a first light switch, a second light switch for branching a part of input light signals bound for the same destination respectively transferred from the transmission line as a substitute for the wave multiplexer and the wave demultiplexer, and a third light switch for inserting light signals into a part of output light signals bound for the same destination to be transferred to the transmission line are used, and the first light switch allows the input light signals bound for the same destination other than the branched light signals to pass therethrough as the output light signals.

15. The optical cross-connect device as claimed in claim 11 wherein supposing that a wavelength baud demultiplexed is "w", "w*x" units of light switches are provided, a number of paths connecting to another office or another node accommodating the transmission lines is "b" and a number of the wave multiplexers is "a", a number is assigned to a transmission line of each path, and the transmission lines with a same number are branched and routed to "w*x" units of (a+b)*(a+b) light switches.

16. The optical cross-connect device as claimed in claim 11 wherein the light switch comprises a (L−k+p)*(L−k+p) light switch, and the device further comprises:

"k+p" (where "p" indicates a number of protective transmission lines) threads of transmission lines connected from the input side transmission line of the light switch to an intra-office device, "k" threads of transmission lines connected from an intra-office device to another office, and a (2k+p)*(2k+p) light switch for accommodating "p" threads of cross-connection transmission lines for connecting the protective transmission lines to the intra-office device, and the (L−k+p)*(L−k+p) light switch routes light signals for connecting an inter-office input transmission line to an inter-office output transmission line and light signals for connecting the protective transmission line to the intra-office device.

17. The optical cross-connect device as claimed in claim 1 wherein a light amplifier is inserted between the light switch and at least one of the wave multiplexer and the wave demultiplexer.

18. The optical cross-connect device as claimed in claim 17 wherein supposing that the light switch is a first light switch, a second light switch for branching a part of input light signals bound for the same destination respectively transferred from the transmission line as a substitute for the wave multiplexer and the wave demultiplexer, and a third light switch for inserting light signals into a part of output light signals bound for the same destination to be transferred to the transmission line are used, and the first light switch allows the input light signals bound for the same destination other than the branched light signals to pass therethrough as the output light signals.

19. The optical cross-connect device as claimed in claim 17 wherein supposing that a wavelength band demultiplexed is "w", "w*x" units of light switches are provided, a number of paths connecting to another office or another node accommodating the transmission lines is "b" and a number of the wave multiplexers is "a", a number is assigned to a transmission line of each path, and the transmission lines with a same number are branched and routed to "w*x" units of (a+b)*(a+b) light switches.

20. The optical cross-connect device as claimed in claim 17 wherein the light switch comprises a (L−k+p)*(L−k+p) light switch, and the device further comprises:

"k+p" (where "p" indicates a number of protective transmission lines) threads of transmission lines connected from the input side transmission line of the light switch to an intra-office device, "k" threads of transmission line connected from an intra-office device to another office, and a (2k+p)*(2k+p) light switch for accommodating "p" threads of cross-connection transmission lines for connecting the protective transmission lines to the intra-office device, and the (L−k+p)*(L−k+p) light switch routes light signals for connecting an inter-office input transmission line to an inter-office output transmission line and light signals for connecting the protective transmission line to the intra-office device.

21. The optical cross-connect device as claimed in claim 1, wherein supposing that the light switch is a first light switch, a second light switch for branching a part of input light signals bound for the same destination respectively transferred from the transmission line as a substitute for the wave multiplexer and the wave demultiplexer, and a third light switch for inserting light signals into a part of output light signals bound for the same destination to be transferred to the transmission line are used, and the first light switch allows the input light signals bound for the same destination other than the branched signals to pass therethrough as the output light signals.

22. The optical cross-connect device as claimed in claim 1 wherein the light switch comprises a transmission line switching-type.

23. The optical cross-connect device as claimed in claim 22 wherein supposing that a wavelength band demultiplexed is "w", "w*x" units of light switches are provided, a number of paths connecting to another office or another node accommodating the transmission lines is "b" and a number of the wave multiplexers is "a", a number is assigned to a transmission line of each path, and the transmission lines with a same number are branched and routed to "w*x" units of (a+b)*(a+b) light switches.

24. The optical cross-connect device as claimed in claim 1 wherein supposing that a wavelength band demultiplexed is "w", "w*x" units of light switches are provided, a number of paths connecting to another office or another node accommodating the transmission lines is "b" and a number of the wave multiplexers is "a", a number is assigned to a transmission line of each path, and the transmission lines with a same number are branched and routed to "w*x" units of (a+b)*(a+b) light switches.

25. The optical cross-connect device as claimed in claim 24 wherein "w" units of the light switches are provided for each wavelength band, and the device comprises:

a wave demultiplexer for demultiplexing input light signals bound for the same destination transferred from the transmission line into "n/w" waves to be inputted to the light switches; and a wave multiplexer for multiplexing output light signals bound for the same destination to be transferred from the light switches to the transmission line;

the respective "a" units of the wave demultiplexers and the wave multiplexers being distributively connected to the light switches.

26. The optical cross-connect device as claimed in claim 24 wherein the light switch comprises a (L−k+p)*(L−k+p) light switch, and the device further comprises:

"k+p" (where "p" indicates a number of protective transmission lines) threads of transmission lines connected from the input side transmission line of the light switch to an intra-office device, "k" threads of transmission lines connected from an intra-office device to another office, and a (2k+p)*(2k+p) light switch for accommodating "p" threads of cross-connection transmission lines for connecting the protective transmission lines to the intra-office device, and the (L−k+p)*(L−k+p) light switch routes light signals for connecting an inter-office input transmission line to an inter-office output transmission line and light signals for connecting the protective transmission line to the intra-office device.

27. The optical cross-connect device as claimed in claim 1 wherein the light switch comprises a (L−k+p)*(L−k+p) light switch, and the device further comprises:

"k+p" (where "p" indicates a number of protective transmission lines) threads of transmission lines connected from the input side transmission line of the light switch to an intra-office device, "k" threads of transmission lines connected from an intra-office device to another office, and a (2k+p)*(2k+p) light switch for accommodating "p" threads of cross-connection transmission lines for connecting the protective transmission lines to the intra-office device, and the (L−k+p)*(L−k+p) light switch routes light signals for connecting an inter-office input transmission line to an inter-office output transmission line and light signals for connecting the protective transmission line to the intra-office device.

28. The optical cross-connect device as claimed in claim 1 wherein the wave demultiplexer and the wave multiplexer respectively demultiplexes and multiplexes waves by "m" waves in a plurality of stages.

29. The optical cross-connect device as claimed in claim 1, further comprising a (a+q)*(a+q) protective-signal light switch for selecting a combination of any two of a protective transmission line, the wave multiplexer, and the wave demultiplexer, the transmission line including "q" threads of protective transmission lines in addition to the (L−a) threads of transmission lines.

30. The optical cross-connect devices claimed in claim 1, further comprising a (q+r)*(q+r) protective-signal light switch for inputting "r(rv a)" threads of output signal from the light switch which can be connected to the wave multiplexer by the light switch and for outputting "r" threads of input signal to the light switch which can be connected to the wave demultiplexer by the light switch, the transmission line including "q" threads of protective transmission lines in addition to the (L−a) threads of transmission lines and making a connection between the protective transmission lines possible.

31. An optical network comprising optical cross-connect devices as claimed in claim 1.

32. The optical network as claimed in claim 31 wherein when a transmission line fault occurs, each optical cross-connect device receives a fault notification, and switches over to a different protective transmission line predetermined to take a shortest path different from that of the working transmission line in order to perform a fault recovery.

* * * * *

UNITED STATES PATENT AND TRADEMARK OFFICE
CERTIFICATE OF CORRECTION

PATENT NO. : 6,842,554 B2
APPLICATION NO. : 10/419952
DATED : January 11, 2005
INVENTOR(S) : Tetsuya Nishi et al.

It is certified that error appears in the above-identified patent and that said Letters Patent is hereby corrected as shown below:

In the drawings:
    Fig. 14B, change "FFIRST" TO --FIRST--.

Column 20, line 54, change "inter-office" to --intra-office--.
Column 21, line 26, after "switch" (second occurrence), insert --,--.
Column 21, line 37, before "6" insert --claim--.
Column 21, line 50, change "Line" to --line--.
Column 22, line 21, change "baud" to --band--.
Column 23, line 10, change "line" to --lines--.
Column 23, line 29, insert --light-- before "signals".
Column 24, line 44, change "devices claimed" to --device as claimed--.
Column 24, line 46, change "r(rv a)" to --r(r$\leq$ a)--.

Signed and Sealed this

Fifteenth Day of January, 2008

JON W. DUDAS
*Director of the United States Patent and Trademark Office*